(12) United States Patent
Yamagishi

(10) Patent No.: US 6,630,949 B1
(45) Date of Patent: *Oct. 7, 2003

(54) IMAGE PROCESSING SYSTEM AND INFORMATION PROCESSING APPARATUS

(75) Inventor: Yoichi Yamagishi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/536,796

(22) Filed: Sep. 29, 1995

Related U.S. Application Data

(62) Division of application No. 08/159,562, filed on Dec. 1, 1993, now abandoned.

(30) Foreign Application Priority Data

| Dec. 1, 1992 | (JP) | 4-321912 |
| Dec. 3, 1992 | (JP) | 4-324263 |
| Dec. 3, 1992 | (JP) | 4-324268 |

(51) Int. Cl.[7] .......................... H04N 5/225; H04N 9/04
(52) U.S. Cl. ...................... 348/207.99; 348/211.2
(58) Field of Search .................. 348/207, 373, 348/374, 375, 376, 14, 14.01, 14.11, 211, 207.99, 211.2; 455/550, 566, 569; 396/301; 358/906

(56) References Cited

U.S. PATENT DOCUMENTS

| 4,375,914 A | * | 3/1983 | Miller et al. ................ 396/424 |
| 4,485,400 A | * | 11/1984 | Lemelson et al. ............. 348/14 |
| 4,507,689 A | | 3/1985 | Kozumi et al. .............. 360/331 |
| 4,853,733 A | | 8/1989 | Watanabe et al. ........... 354/412 |
| 4,853,773 A | | 8/1989 | Hibino et al. |
| 4,856,045 A | * | 8/1989 | Hoshina ................... 348/14.01 |
| 4,928,300 A | * | 5/1990 | Ogawa et al. ................ 348/14 |
| 5,034,804 A | | 7/1991 | Sasaki et al. ............... 358/335 |
| 5,040,068 A | * | 8/1991 | Parulski et al. ............. 348/376 |
| 5,086,345 A | | 2/1992 | Nakane et al. .............. 358/335 |
| 5,091,787 A | | 2/1992 | Watanabe et al. ........... 348/232 |
| 5,111,498 A | * | 5/1992 | Guichard et al. ............. 348/14 |
| 5,191,601 A | * | 3/1993 | Ida et al. ................. 348/14.01 |
| 5,231,501 A | | 7/1993 | Sakai ....................... 348/231 |
| 5,325,187 A | | 6/1994 | Kubo et al. ................ 348/692 |
| 5,341,171 A | * | 8/1994 | Mori et al. ................. 348/373 |
| 5,359,427 A | | 10/1994 | Sato |
| 5,438,359 A | | 8/1995 | Aoki ....................... 348/207 |
| 5,475,441 A | | 12/1995 | Parulski et al. ............. 348/552 |
| 5,675,358 A | * | 10/1997 | Bullock et al. ............. 345/115 |
| 5,777,691 A | | 7/1998 | Kubo et al. ................ 348/718 |

FOREIGN PATENT DOCUMENTS

| JP | 59-61379 | 4/1984 |
| JP | 61-223914 | 10/1986 |
| JP | 62-150987 | 7/1987 |

(List continued on next page.)

OTHER PUBLICATIONS

ASCII (Monthly magazine of Home & Office Computer Science): Sep. 1992, pp. 226–227.

NEC Technical Journal, vol. 42, No. Mar. 1982, pp. 58–64.

*Primary Examiner*—Aung S. Moe
(74) *Attorney, Agent, or Firm*—Fitzpatrick, Cella, Harper & Scinto

(57) ABSTRACT

An image processing system is disclosed, wherein a demountable image pickup apparatus comprises operating means such as a keyboard, a portable computer having control means that is a CPU, image pickup means, and program storage means, which is a ROM or RAM, for storing programs to be run by the control means, and wherein imaging is effected with the image pickup apparatus mounted on an information processing apparatus.

74 Claims, 39 Drawing Sheets

FOREIGN PATENT DOCUMENTS

| | | | | |
|---|---|---|---|---|
| JP | 62-125927 | 8/1987 | | |
| JP | 63-271217 | 11/1988 | | |
| JP | 63-195417 | 12/1988 | | |
| JP | 01-129315 | 5/1989 | | |
| JP | 01-171156 | 12/1989 | | |
| JP | 1176168 | * 12/1989 | ………. | H04N/5/225 |
| JP | 02-055337 | 4/1990 | | |
| JP | 02-140712 | 5/1990 | | |
| JP | 02-159888 | 6/1990 | | |
| JP | 02-270475 | 11/1990 | | |
| JP | 02-291784 | 12/1990 | | |
| JP | 03-000472 | 1/1991 | | |
| JP | 03-018174 | 1/1991 | | |
| JP | 03-55655 | 3/1991 | | |
| JP | 03-104393 | 5/1991 | | |
| JP | 03-104394 | 5/1991 | | |
| JP | 03-108963 | 5/1991 | | |
| JP | 03-109890 | 5/1991 | | |
| JP | 03-144861 | 6/1991 | | |
| JP | 04-053340 | 2/1992 | | |
| JP | 04-070898 | 3/1992 | | |
| JP | 04-097665 | 3/1992 | | |
| JP | 04-039854 | 6/1992 | | |
| JP | 04-052139 | 8/1992 | | |
| JP | 04-241569 | 8/1992 | | |
| JP | 04-295886 | 10/199 | | |

* cited by examiner

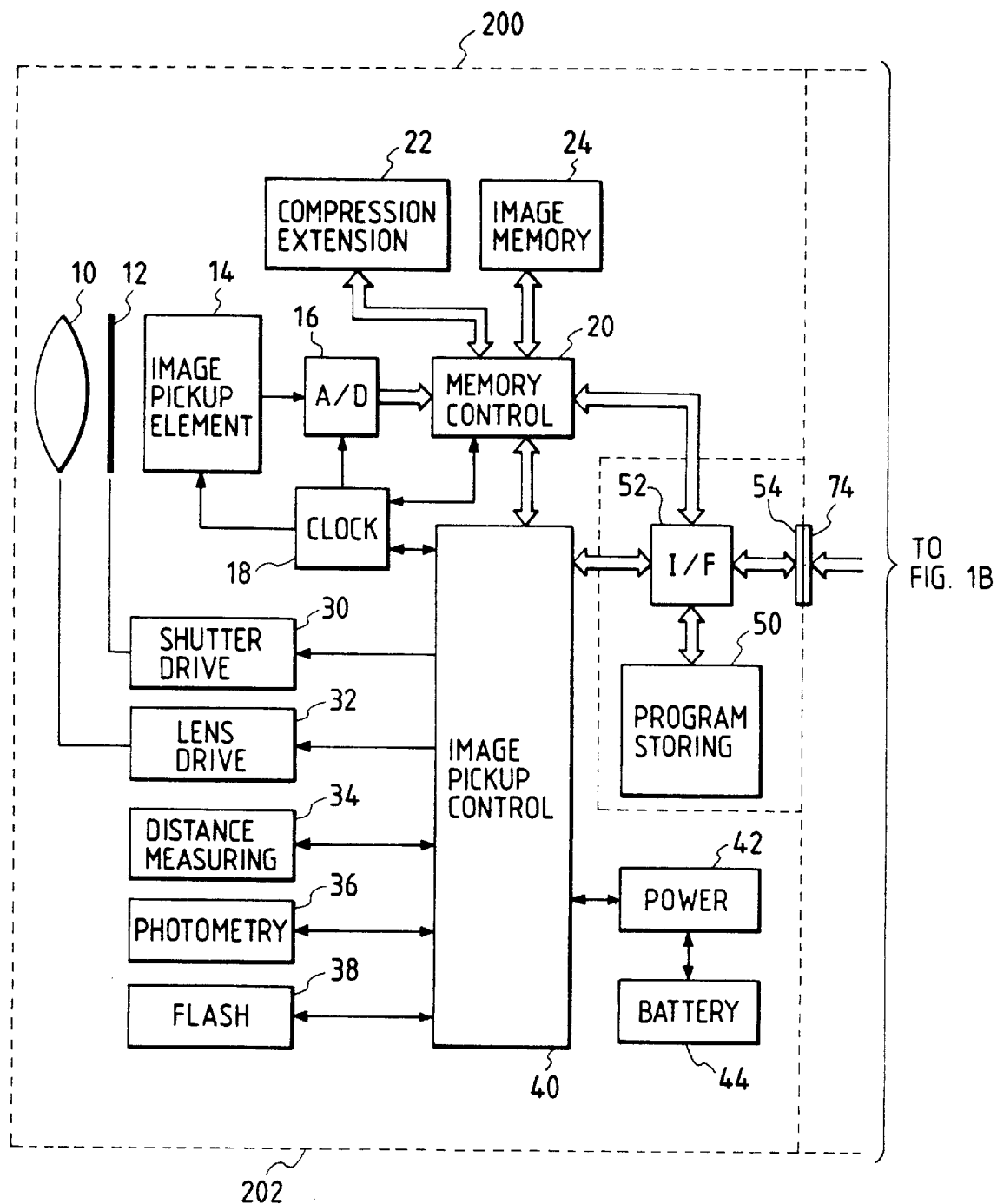

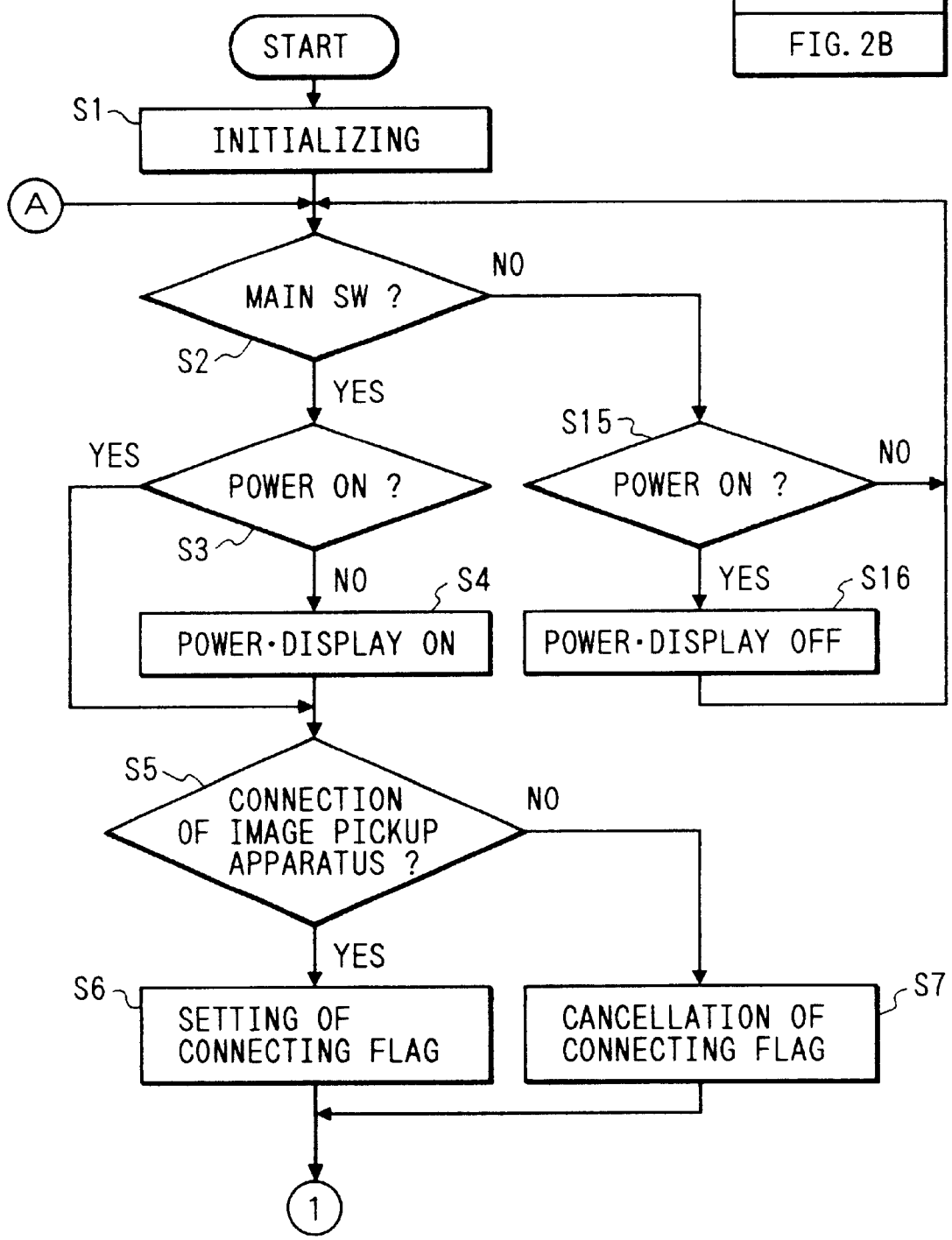

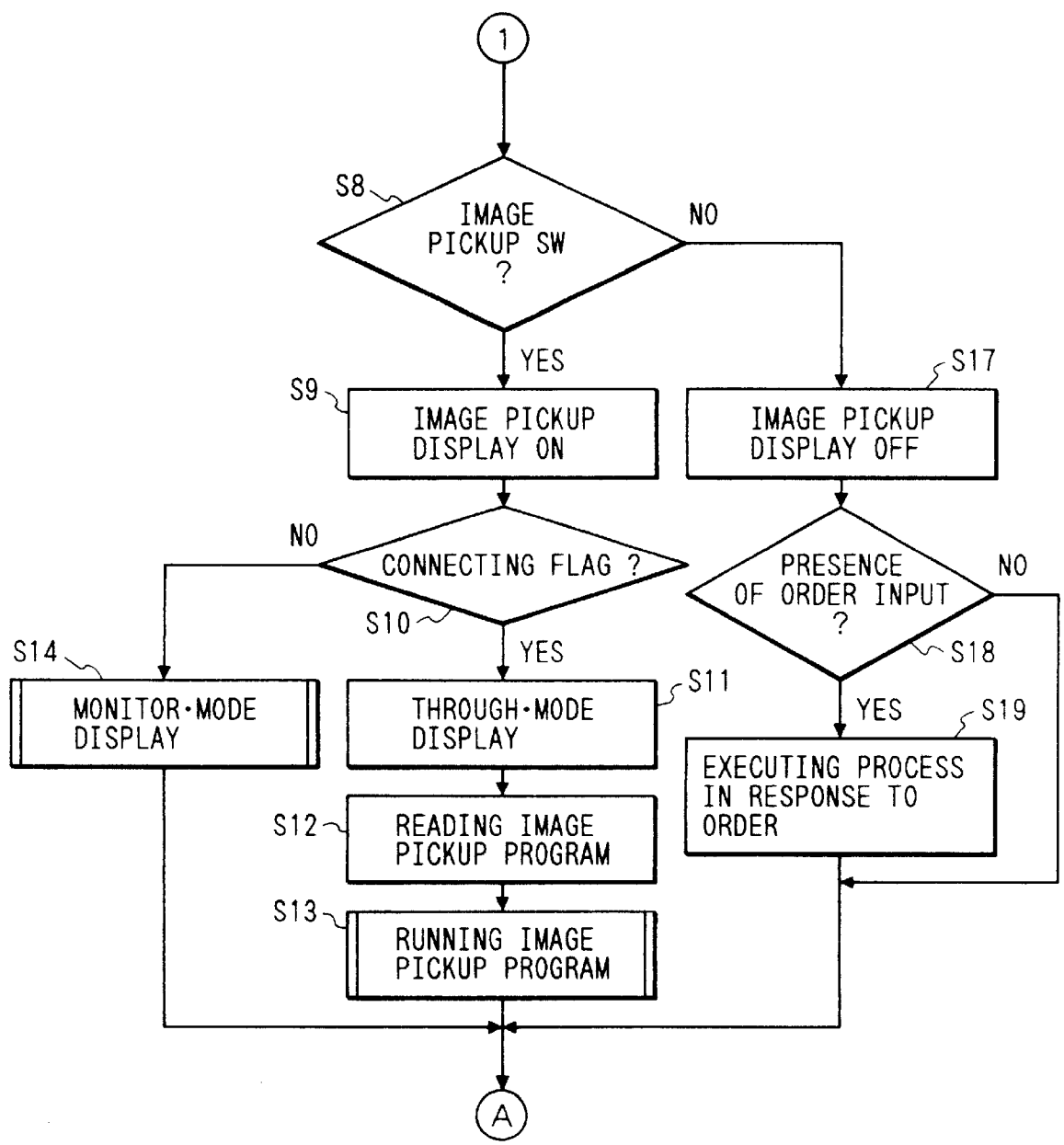

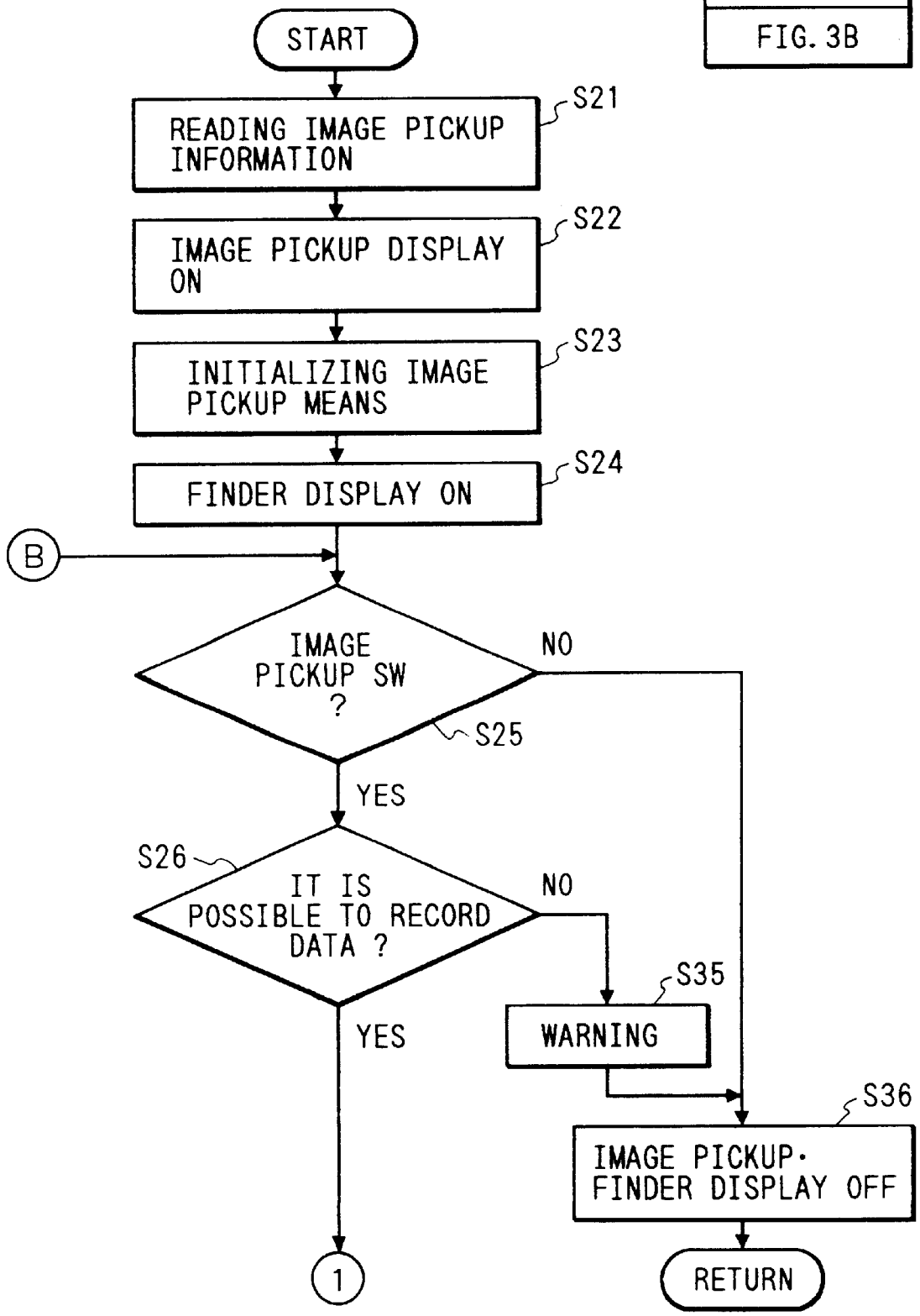

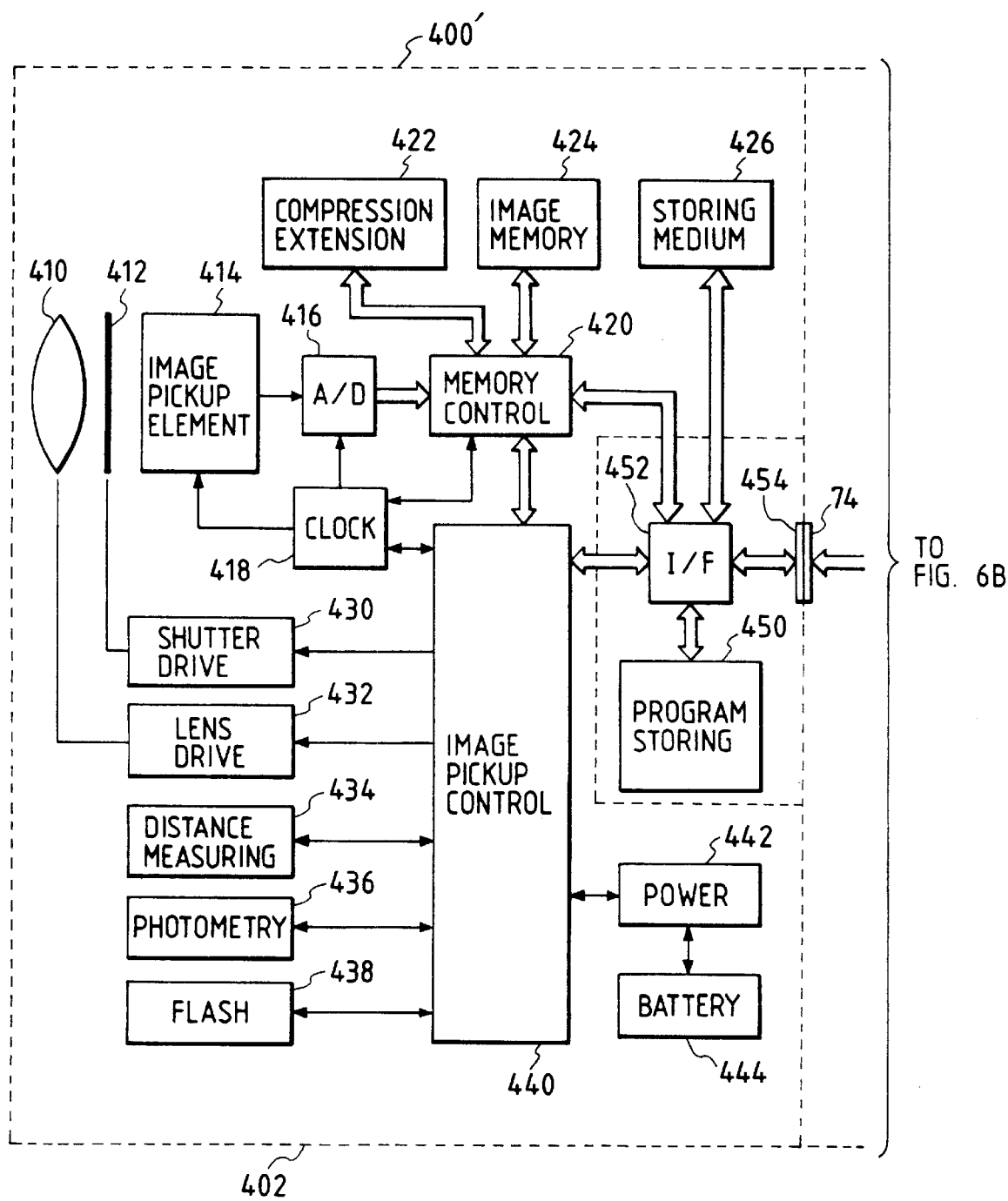

| FIG. 7A |
| FIG. 7B |

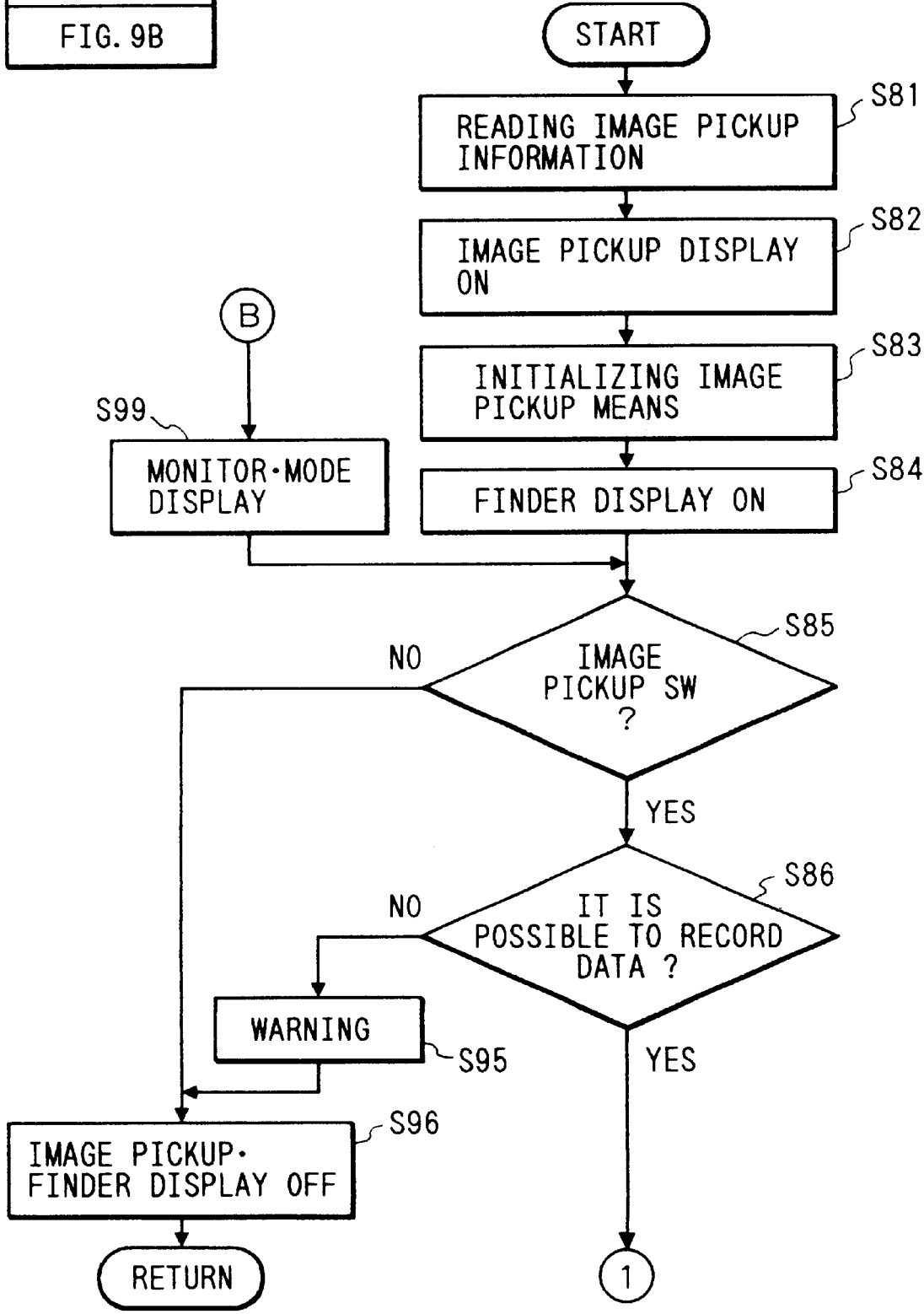

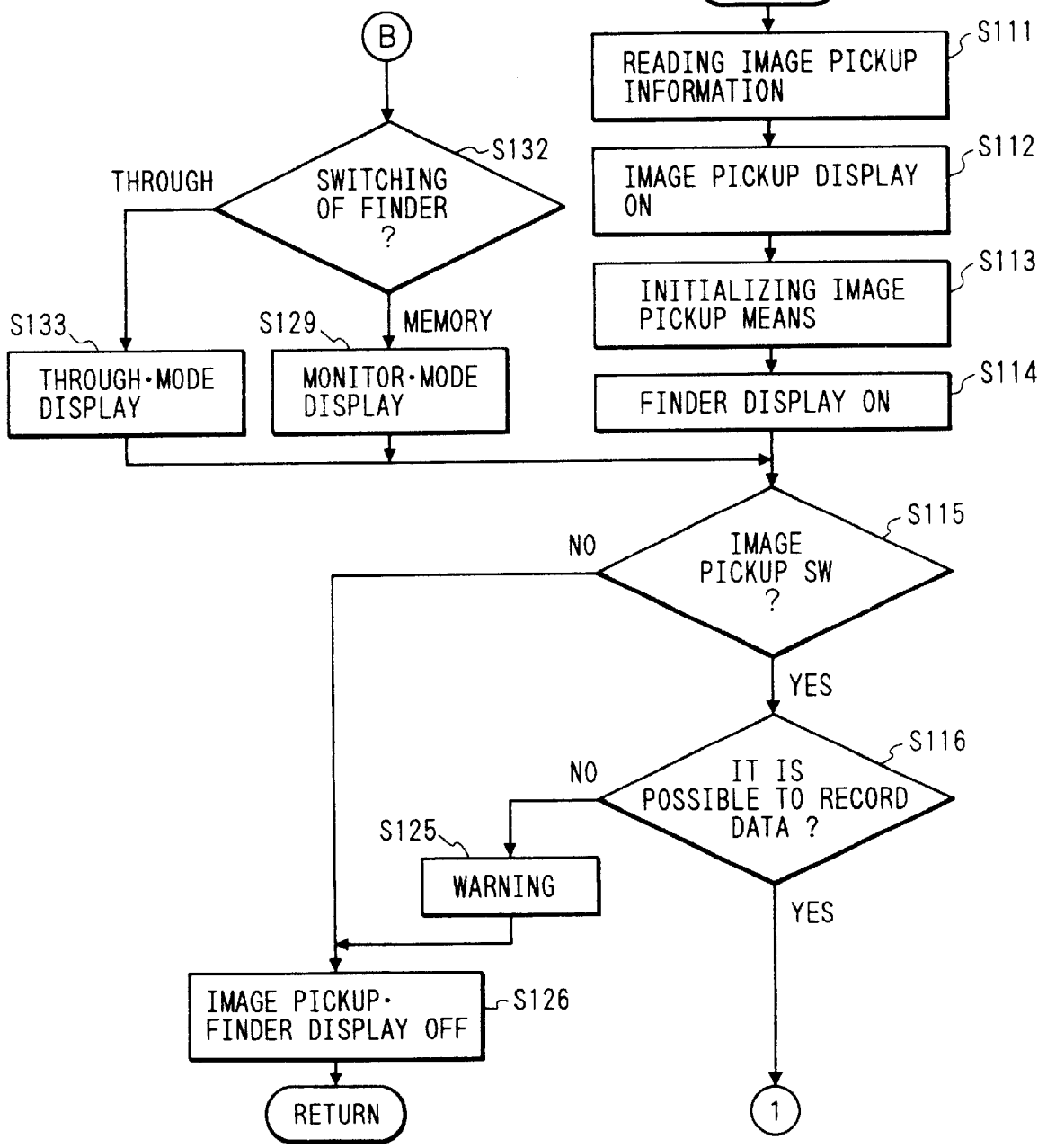

| FIG. 15A | FIG. 15B |

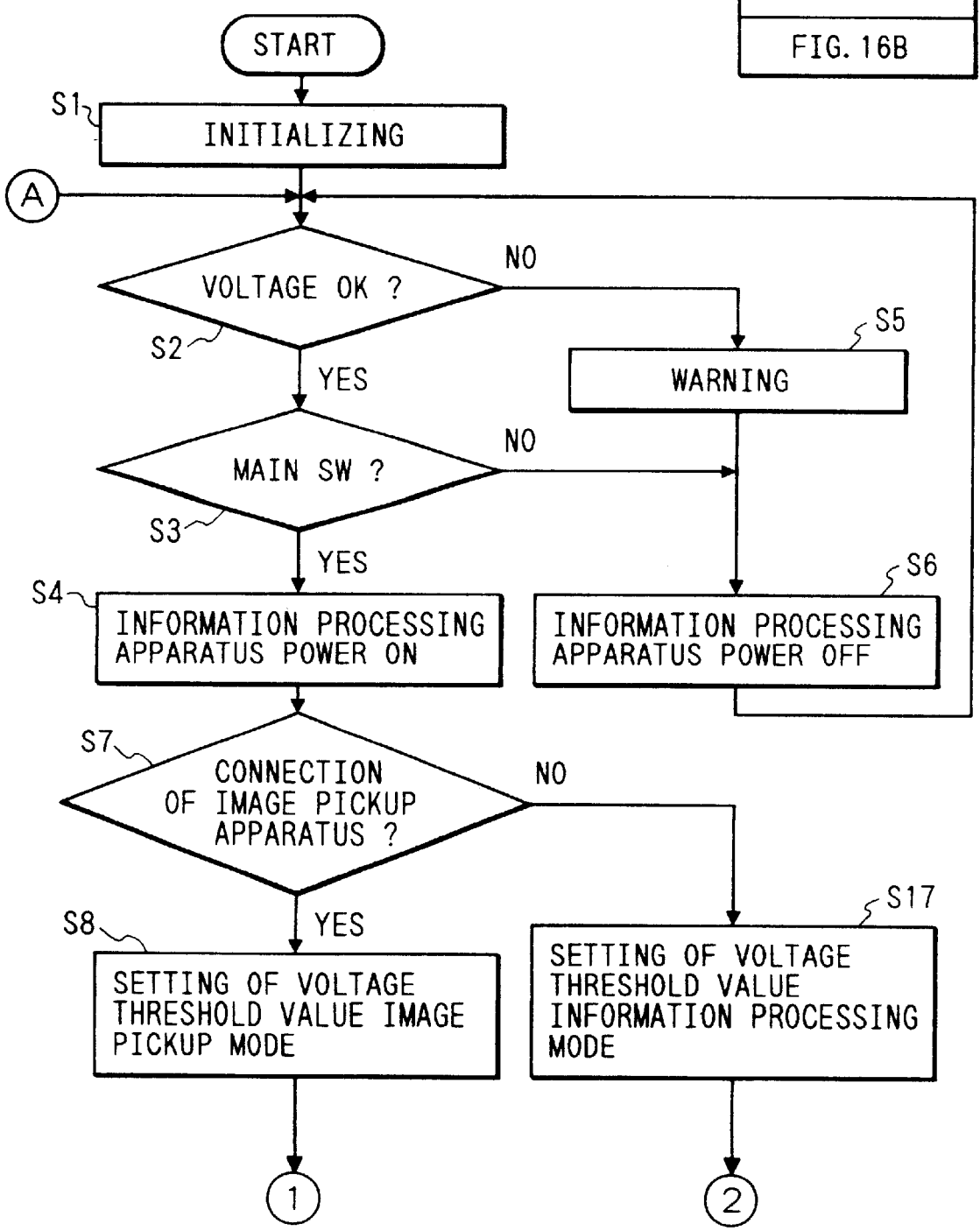

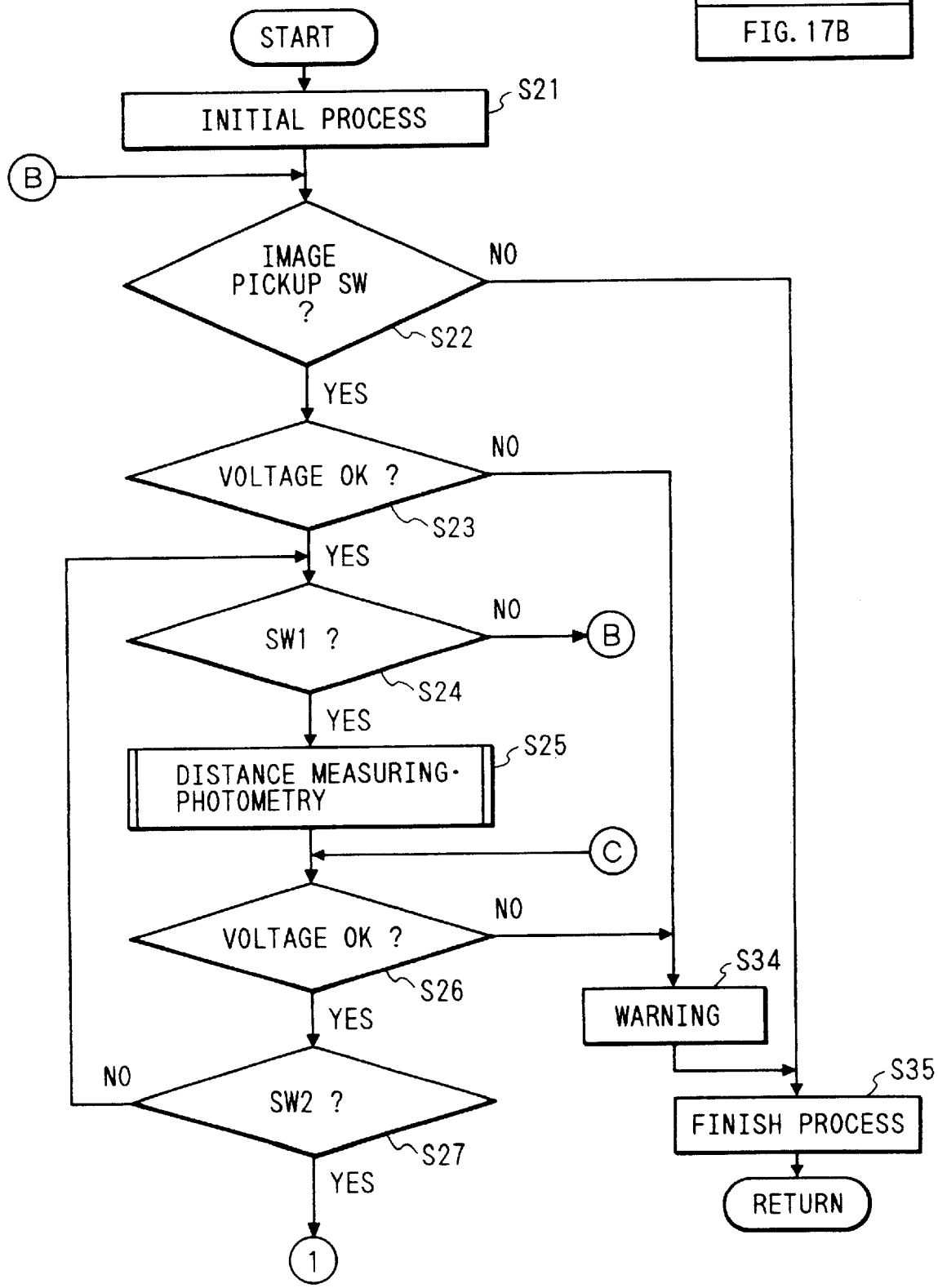
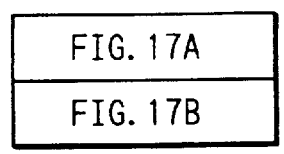
FIG. 17A
FIG. 17

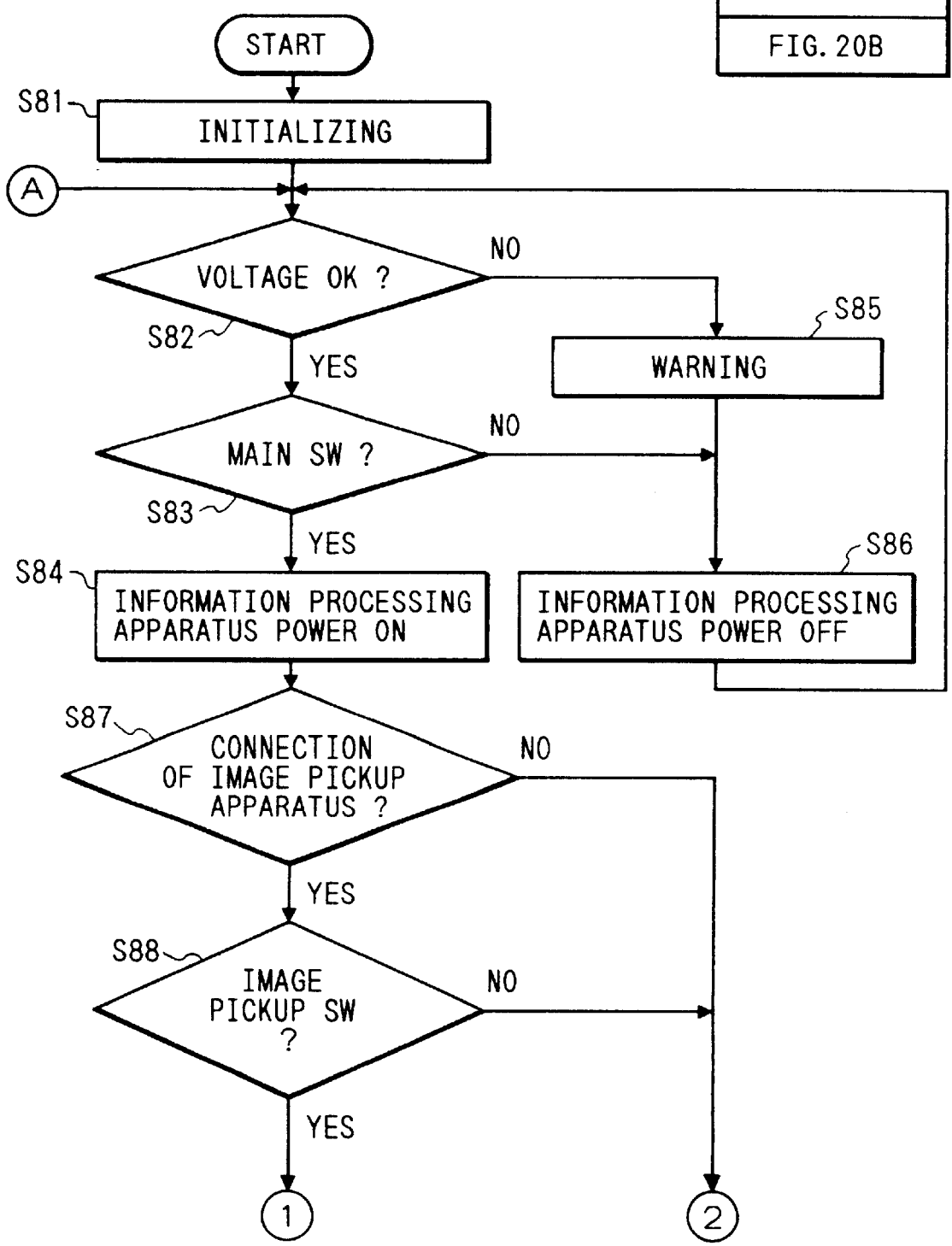

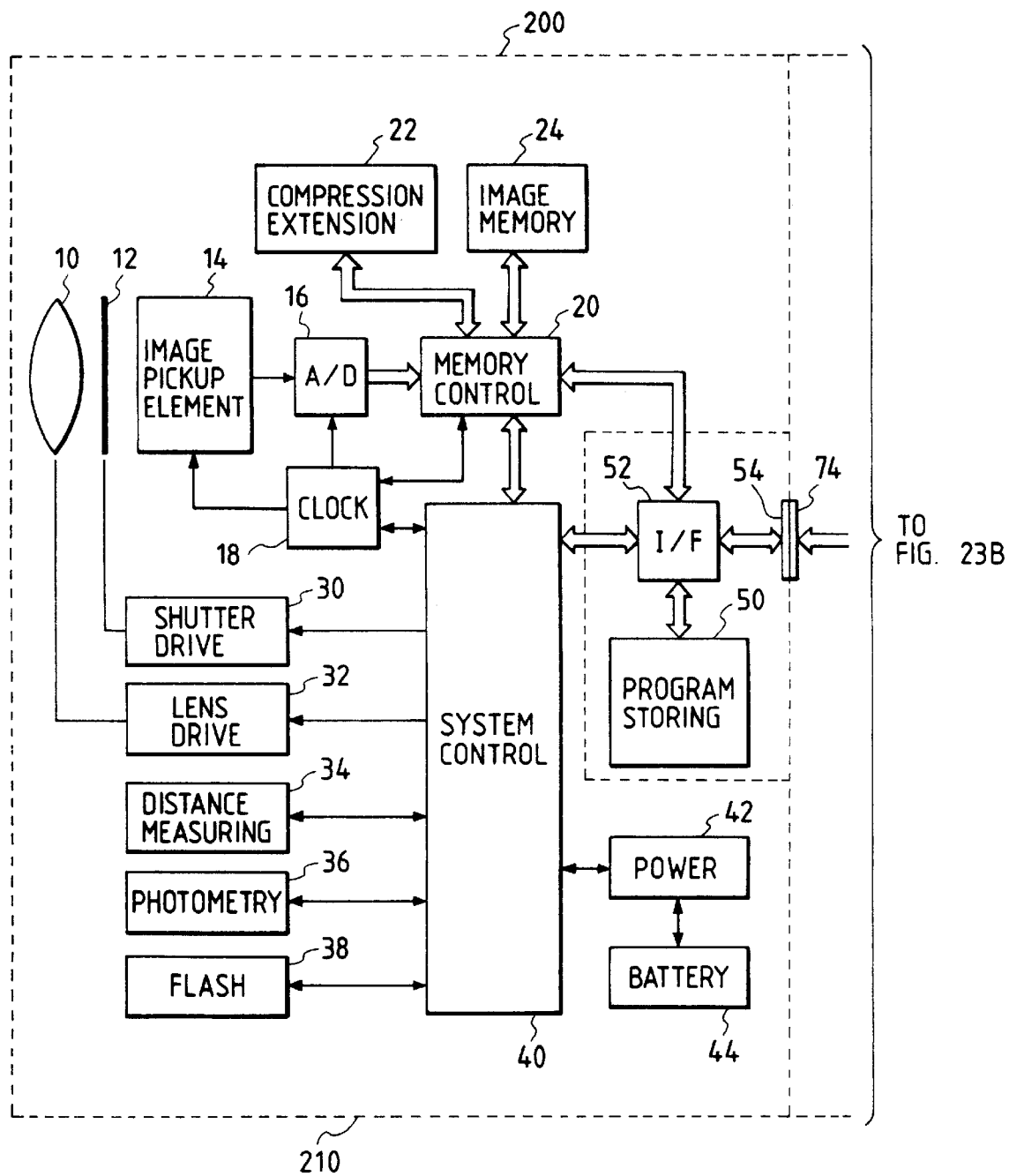

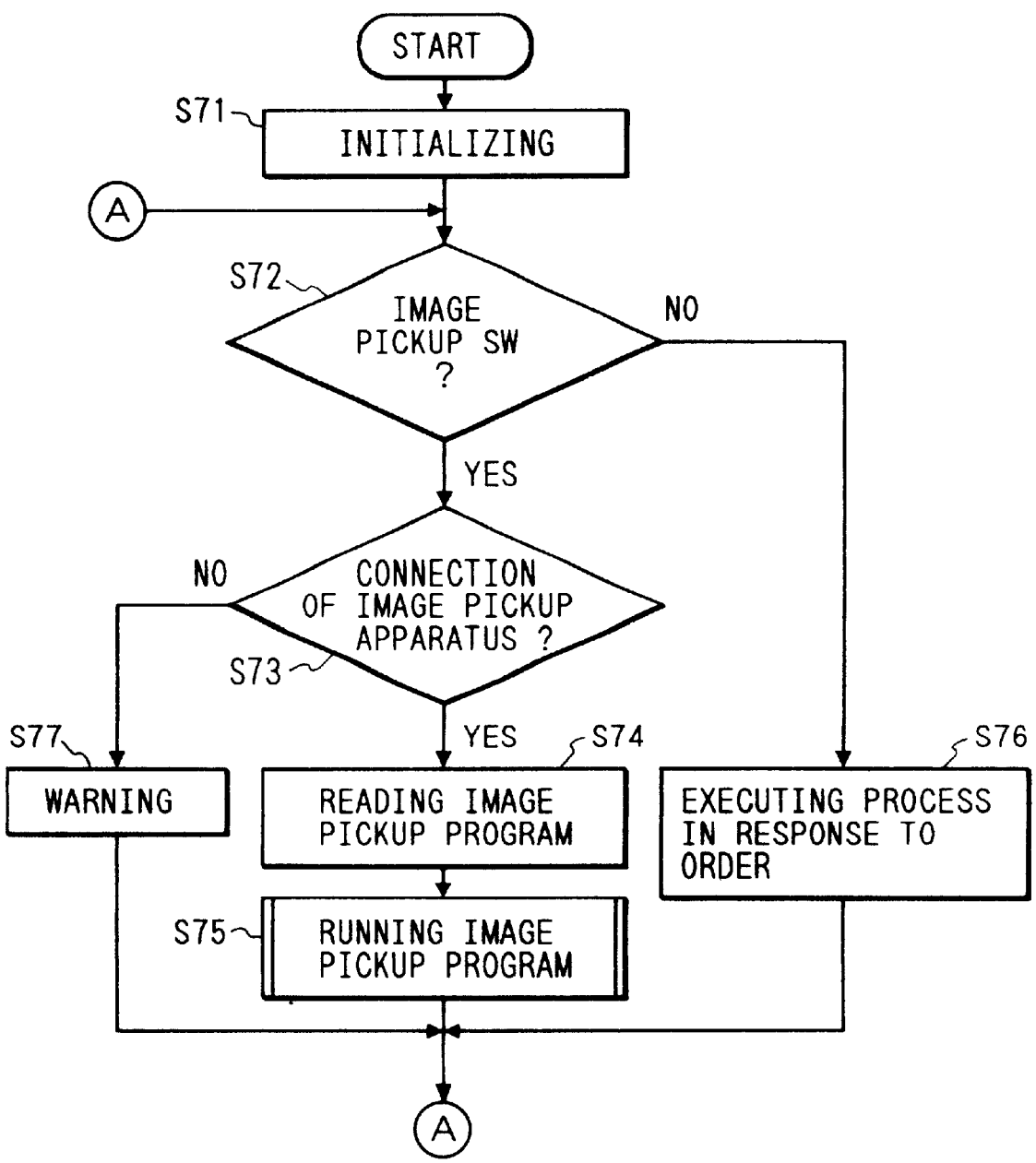

IMAGE PROCESSING SYSTEM AND INFORMATION PROCESSING APPARATUS

This application is a division of Ser. No. 08/159,562 filed Dec. 1, 1993 now abandoned.

BACKGROUND OF THE INVENTION

1. Field of the Invention

The present invention relates to an image processing system for photographing an image and an information processing system.

2. Related Background Art

In the past, electronic still cameras capable of recording still images on a recording medium such as a memory card having solid-state memory elements have been put on the market. Electronic pocketbooks and portable computers, for which memory cards can be used, have also been commercialized. For inputting an image to a portable computer or the like, an image photographed using an electronic still camera is recorded in a memory card and then the card is inserted into the portable computer so that the image is read out.

However, in the foregoing method of recording an image photographed by an electronic still camera on a memory card and inserting the card into a portable computer for image reading, many steps must be taken for photogaphy. Moreover, both the electronic still camera and portable computer must be carried bout. This is very inconvenient.

According to the present invention, an information processing apparatus and an image pickup apparatus have easy-to-use configurations.

SUMMARY OF THE INVENTION

An object of the present invention is to provide an image processing system and information processing system for solving all or part of the aforesaid problems.

Another object of the present invention is to provide a user-friendly image processing system, information processing apparatus, and image pickup apparatus.

In an effort to accomplish the foregoing objects, an image processing system is disclosed as a preferred embodiment of the present invention. The image processing system comprises an information processing apparatus including operating means for entering information, processing means for processing and outputting information entered at the operating means, and an interface for connecting an external apparatus, and an image pickup apparatus detachable from the interface, including image pickup means for picking up an object image, and storage means for storing programs one of which is run by the processing means to operate the image pickup means.

Another object of the present invention is to provide an image processing system, information processing apparatus, and image pickup apparatus that permit expanded periods of use.

Yet another object of the present invention is to provide an information processing apparatus and a system including the information processing apparatus that are preferable for implementing novel image pickup facilities therein.

Other objects and features of the present invention will be apparent from the embodiments and drawings below.

BRIEF DESCRIPTION OF THE DRAWINGS

FIG. 2, is comprised of FIGS. 2A and 2B showing flowcharts of a main routine in this embodiment;

FIG. 27 is a flowchart of a main routine in still another embodiment.

DETAILED DESCRIPTION OF THE PREFERRED EMBODIMENTS

An embodiment of the present invention will be described with reference to the drawings.

Figure 1B:
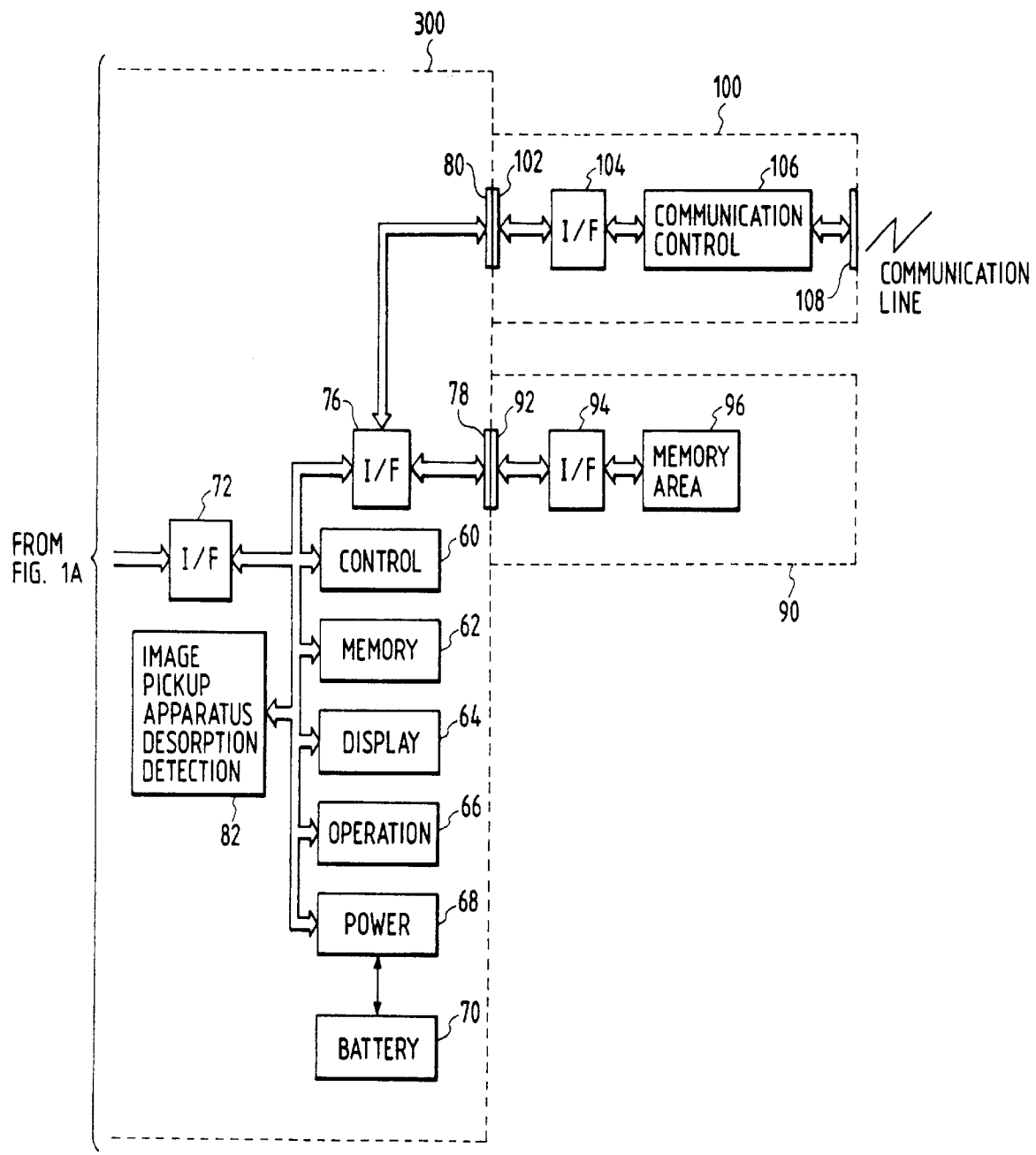
FIG. 1 is comprised of FIGS. 1A and 1B showing block diagrams of a configuration of an embodiment of the present invention.

In FIGS. 1A and 1B, reference numeral 200 denotes an image pickup apparatus and 300 denotes an information processing apparatus.

The image pickup apparatus 200 comprises image pickup means 202, program storage means 50, an interface 52, and a connector 54.

Reference numeral 50 denotes program storage means for storing programs each describing imaging for the image pickup means 202. The stored programs are run by the information processing apparatus 300. 52 denotes an interface for providing the interface with the information processing apparatus 300. 54 denotes a connector for use in transferring a data signal or a control signal to or from the information processing apparatus 300 and supplying power to the program storage means 50.

The configuration of the image pickup means 202 will be described below.

Reference numeral 10 denotes a lens array. 12 denotes a shutter having a capability of a diaphragm. 14 denotes an image pickup element for converting an optical image into an electric signal. 16 denotes an A/D converter for converting analog output of the image pickup element 14 into a digital signal. 18 denotes a clock circuit for supplying a clock signal or a control signal to the image pickup element 14, A/D converter 16, memory control circuit 20, and D/A converter 36. The clock circuit 18 is controlled by a memory control circuit 20 and an image pickup control circuit 40. 22 denotes an image compression/extension circuit for compressing or extending data by performing adaptive discrete cosine transformation (ADCT) or the like. 24 denotes an image memory.

Reference numeral 20 denotes a memory control circuit for controlling the clock circuit 18, image compression/extension circuit 22, and image memory 24. Data provided by the A/D converter 16 is written in the image memory 24 via the memory control circuit 20.

For image compression, data is read from the image memory 24, compressed by the image compression/extension circuit 22, and then written in the image memory 24. For image extension, data is read from the image memory 24, extended by the image compression/extension circuit 22, and then written in the image memory 24.

Reference numeral 30 denotes a shutter drive circuit for driving the shutter 12. 32 denotes a lens drive circuit for driving a focusing lens in the lens array 10. 34 denotes a distance measuring circuit for measuring a distance to an object. 36 denotes a photometry circuit for metering a brightness level of an object. 38 denotes a flash. 40 denotes an image pickup control circuit for controlling the whole of the image pickup means.

Reference numeral 42 denotes a power circuit. 44 denotes a battery. The power circuit 42 comprises a battery detector, a DC—DC converter, and a switch for selecting a block to be energized. The power circuit 42 detects the presence or absence of the battery 44, the type of the battery 44, and an amount of power remaining in the battery 44, controls the DC—DC converter according to the results of detection and an instruction sent from the image pickup control circuit 40, and supplies a required voltage to each component for a required time interval.

The image pickup control circuit 40 causes the lens drive circuit 32 to drive the focusing lens in the lens array 10 according to the result of measurement performed by the distance measuring circuit 34 and thus controls the lens array 10 so that the lens array 10 comes into focus. Based on the result of photometry performed by the photometry circuit 36, the image pickup control circuit 40 determines the time interval of keeping the shutter 12 open using the shutter drive circuit 30 so as to provide an optimal magnitude of exposure.

The configuration of the information processing apparatus 300 will be described below.

Reference numeral 60 denotes control means for controlling the whole information processing apparatus 300. 62 denotes memory means for storing programs and variables for performing the operations, which will be described later, of the control means 60. 64 denotes a display means for displaying characters, images, and voice required with the run of a program in the control means 62; such as, a liquid crystal display unit or a loudspeaker. 66 denotes operating means for use in entering a variety of operational commands to be sent to the control means 60.

Reference numeral 68 denotes a power circuit. 70 denotes a battery. The power circuit 68 comprises a battery detector, a DC—DC converter, and a switch for selecting a block to be energized. The power circuit 68 detects the presence or absence of the battery 70, the type of the battery 70, and an amount of power remaining in the battery 70, controls the DC—DC converter according to the result of detection and the instruction sent from the control means 60, and then supplies required voltages for a required time interval.

Reference numeral 72 denotes an interface for providing the interface with the image pickup apparatus 200. 74 denotes a connector for use in transferring a data signal and a control signal to or from the image pickup apparatus 200 and supplying power to an interface 52 and the program storage means 50.

Reference numeral 76 denotes a recording medium 90 such as a hard disk or a memory card, or an interface for providing the interface with communication means 100. 78 denotes a connector for use in transferring a data signal and a control signal to or from the recording medium 90 and supplying power to the recording medium. 90. 80 denotes a connector for use in transferring a data signal and a control signal to or from the communication means 100 and supplying power to the communication means 100.

Reference numeral 82 denotes an image pickup apparatus detachment detecting means for detecting the detachment of the image pickup apparatus 200 from the information processing apparatus 300 using a mechanical, electrical, or optical method.

Reference numeral 90 denotes a recording medium such as a hard disk or a memory card. 92 denotes a connector for use in transferring a data signal or a control signal to or from the information processing apparatus 300 and receiving power. 94 denotes an interface for providing the interface with the information processing apparatus 300. 96 denotes a recording area for use in recording an image signal.

Reference numeral 100 denotes a communication means for communicating with external equipment over a communication line. 102 denotes a connector for use in transferring a data signal and a control signal to or from the information processing apparatus 300 and receiving power. 104 denotes an interface for providing the interface with the information processing apparatus 300. 106 denotes a communication control circuit for controlling the communication with external equipment. The communication control circuit controls communication according to the protocol of a layer to be connected by running a predetermined program, and converts, inversely converts, modulates, and demodulates data. 108 denotes a connector for use in transferring a data signal and a control signal to or from external equipment over a communication line. The use of the connector 108 permits transmission or other communication to or from external equipment directly or over a communication line.

The connectors 78, 80, 92, 102, and 108 can convey not only electric signals but also other various signals such as mechanical, optical, and acoustic signals. Needless to say, there is no problem in a configuration having pluralities of interfaces 76, connectors 78, connectors 80, recording media 90, and communication means 100, or in a configuration in which both or either of the recording medium 90 and communication means 100 is united with the information processing apparatus 300.

Referring to FIGS. 2A, 2B, 3A, 3B, 4, and 5, the operation of the first embodiment will be described. FIGS. 2A and 2B are a flowchart of a main routine in this embodiment.

When the power supply of the information processing apparatus 300 is turned on or when a new battery is loaded therein, the control means 60 resets flags and control variables, and runs a control program stored in an area of the memory means 62; such as, in operating system (S1). By running the control program, the control means 60 receives a signal from a main switch in the operating means 66.

When the main switch in the operating means 66 is off (S2), the control means 60 determines whether the power circuit 68 is in a power-off state in which power is supplied only to the smallest possible block to be energized or in a power-on state in which power is also supplied to the display means 64 (S15). If the power circuit 68 is in the power-on state, the control means 60 quits the display screen on the display means 64 and places the power circuit 68 in the power-off state (S16). The control means 60 then waits until the main switch in the operating means 66 is pressed (S2).

If the main switch in the operating means 66 is on (S2), the control means 60 determines whether the power circuit 68 is in the power-off state or power-on state (S3). If the power circuit 68 is not in the power-on state, the control means 60 places the power circuit 68 in the power-on state, and produces a predetermined necessary display screen on the display means 64 using characters, numerals, and pictures such as an icon so as to receive information entered at the operating means 66.

The control means 60 uses the image pickup apparatus detachment detecting mean is 82 to determine whether the image pickup apparatus 200 is connected to the information processing apparatus 300 (S5). Depending on whether the image pickup apparatus 200 is connected or not, the control means 60 sets (S6) or resets (S7) an image pickup apparatus connection flag. The image pickup apparatus connection flag is stored in an internal register of the control means 60 or part of the memory means 62.

If an imaging switch in the operating means 66 is off (S8), the control means 60 quits the predetermined display screen necessary for imaging on the display means 64; that is, the display screen showing an icon for generating a trigger pulse used to start imaging or the display screen showing information independent of the image pickup apparatus, for example, a trigger switch alone (S17). The control means 60 then waits until a command is entered at the operating means 66.

After the step S17, if a command, for example, a command for use in causing the information processing apparatus to execute calculation is entered (S18), the control means 60 executes predetermined processing associated with the command for the information processing apparatus (S19). When the predetermined processing terminates, control is returned to A in the flowchart. The control means 60 produces a predetermined necessary display screen on the display means 64 using characters, numerals, and pictures such as an icon so as to receive information entered at the operating means 66. The control means 60 then waits until the main switch in the operating means 66 is pressed (S2).

When the imaging switch in the operating means 66 is on (S8), the control means 60 produces a predetermined display screen necessary for imaging (S9) on the display means 64.

The predetermined display screen necessary for imaging is, for example, a screen on the display means 64 in which an operation mode of the image pickup apparatus 200 such as a single photography mode, a continuous photography mode, or a self-timer photography mode, information concerning distance measurement or photometry, an operating state of the flash 38, an amount of power remaining in the battery 44, a shutter speed, an f-number, an exposure correction value, a gain-up state for increasing the sensitivity of the image pickup element, a use state of the image memory 24, an operating state of the compression/extension circuit 22, a recording state of the recording medium 90, the number of exposed frames, a storage capacity for exposed image data, the number of remaining frames, a storage capacity for remaining image data, and so on are indicated with characters, numerals, and pictures such as an icon. The facilities in the image pickup apparatus 200 may be displayed on the display means 64 as pictures of a release button, an electronic dial, a mode select dial, and so on in the operation unit of an ordinary camera. The pictures may be selectively entered at the operating means 66 using a pointing device such as a pen, a mouse, a trackball, a touch-sensitive panel, or a line-of-sight sensor. The display means 64 includes a viewfinder in which a through-mode display screen showing signals sent from an image pickup element continuously and a monitor-mode display screen showing a picked-up image or a recorded image are produced side by side or alternately. The monitor mode is a mode for reading an image from the image memory 24 or storage area 98, wherein an image to be displayed is selected. Owing to these facilities, the information processing apparatus 300 can be handled to achieve photography in the same manner as a camera without unnaturalness.

When the image pickup apparatus connection flag is reset (S10), the control means 60 produces a monitor-mode display screen on the display means 64 (S14). The control means 60 then returns control to the step A min the flowchart and waits until the main switch in the operating means 66 is pressed (S2).

When the image pickup apparatus connection flag is set (S10), the control means 60 produces a through-mode display screen on the display means 64 (S11). A program describing how to operate the image pickup apparatus 200 is then read from the program storage means 50, and stored in an area of the memory means 62 via the interface 52, connector 54, connector 74, and interface 72 (S12).

The control means 60 reads a program describing how to operate the image pickup apparatus 200 from the memory means 62, and runs it (S13). With the run of the program, the control means 60 produces a predetermined display screen necessary for imaging on the display means, actuates the components in the image pickup apparatus 200 sequentially in response to commands entered at the operating means 66, and thus achieves imaging.

When all the imaging operations are completed, the control means 60 terminates the execution of an imaging mode, produces the predetermined necessary display screen on the display means using characters, numerals, and pictures such as an icon so as to receive information entered at the operating means 66, and then waits until the main switch in the operating means 66 is pressed (S2).

Figure 3B:
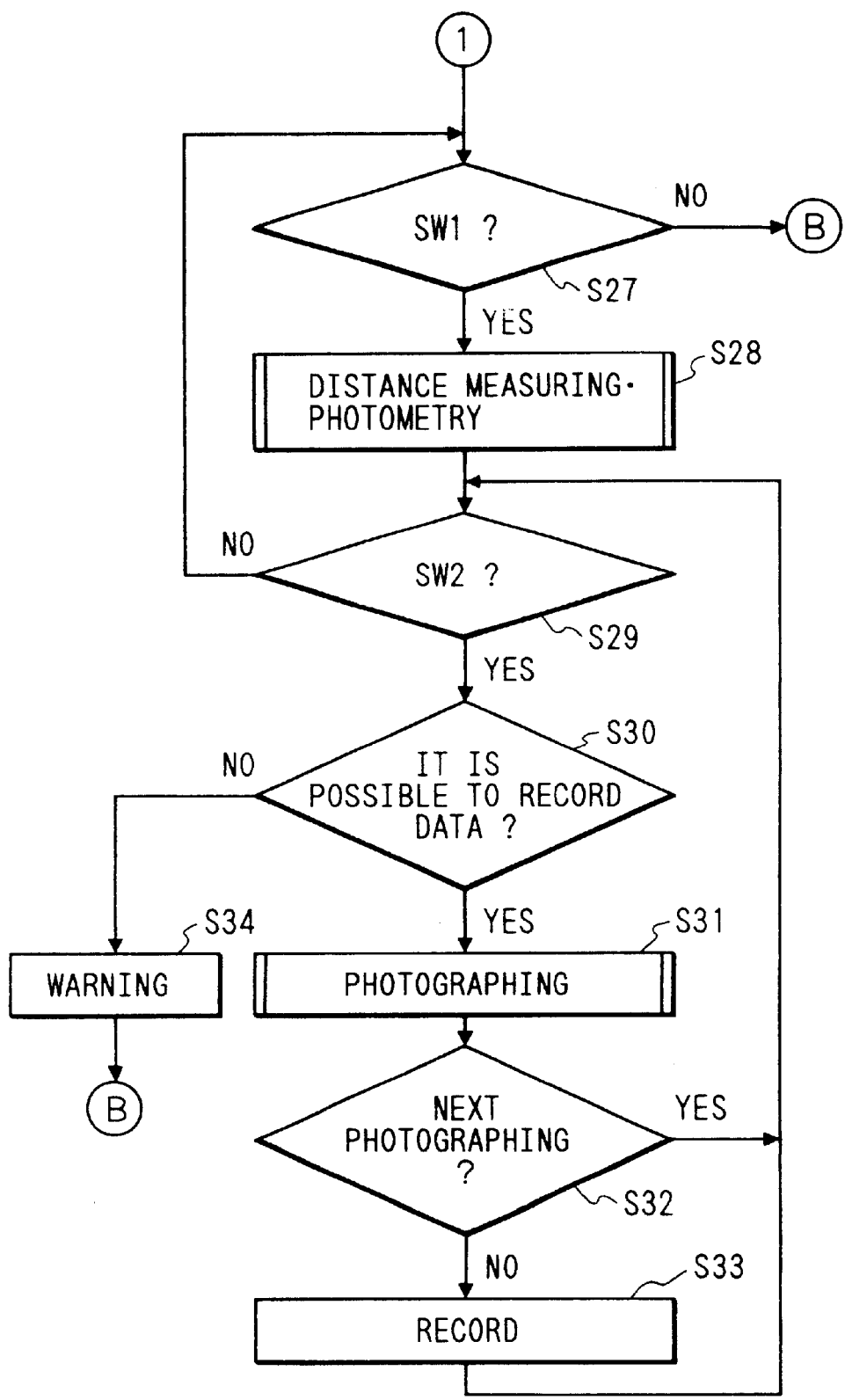
FIG. 3 is comprised of FIGS. 3A and 3B showing flowcharts of an image pickup program running routine in this embodiment.

FIGS. 3A and 3B are a detailed flowchart of the imaging program to be run at the step S13 in FIG. 2B. The description will proceed on the assumption that a data signal and a control signal are transferred between the control means 60 and image pickup control circuit 40 via the interface 72, connector 74, connector 54, and interface 52.

The control means 60 reads data (imaging information) inherent to the mounted image pickup apparatus 200; such as, a focal distance, a focal distance variable range, a range that can be designated using a guide member mode select dial on a flash, an open f-number, and a direction of compression performed by the compression/extension circuit 22 from the program stored in an area of the memory means 62 at the step S12 in FIG. 2B and written to operate the image pickup apparatus 200 (S21). According to the read imaging information, the control means 60 produces the display screen necessary for imaging on the display means 64 (S22).

The contents of the "display screen necessary for imaging" such as a position, a color, a frame, and other general items have already been displayed. At the step S9 in FIG. 2B, therefore, information inherent to the mounted image pickup apparatus 200, for example, as mentioned above, the items and numerical values dependent on the specifications and performance of the image pickup apparatus 200 are indicated with characters, numerals, and pictures such as an icon.

The control means 60 instructs the image pickup control circuit 40 to initialize the image pickup means 202. In response to the instruction, the image pickup control circuit 40 resets flags and variables, turns on the power circuit 42, and initializes the components in the image pickup means 202 (S23). By the initialization, the components are set to mean values, limit values, or any other values of controllable ranges.

The control means 60 instructs the image pickup control circuit 40 to produce a through-mode display screen. In response to the instruction, the image pickup control circuit 40 transfers an image formed on the image pickup element 12 to the information processing apparatus 300 via the A/D converter 16, memory control circuit 20, image memory 24, memory control circuit 20 again, interface 52, and connector 54. The control means 60 writes acquired image data in an internal video memory of the display means 64 via the connector 74 and interface 72, and then reads the image data to display it as a viewfinder display screen on the display means 64 (S24). Specifically, the display screen on the information processing apparatus can be used as a viewfinder.

When the imaging switch in the operating means 66 is off (S25), the control means 60 quits the imaging display screen and viewfinder display on the display means 64 (S36), and terminates the run of the imaging program (S13).

The control means 60 determines whether image data acquired by the image pickup apparatus 200 can be recorded on the memory means 62 or recording medium 90 (S26). If recording cannot be done because a recordable empty area is unavailable or no recording medium is connected, the control means 60 displays a warning on the display means 64 (S35), quits the imaging display screen and viewfinder display screen on the display means 64 (S36), and terminates the run of the imaging program (S13). When terminating the run of the image pickup program, the control means 60 instructs the image pickup control circuit 40 to terminate the operation of the image pickup means 202. The image pickup control circuit 40 executes the termination processing required for the components of the image pickup means 202, and then turns off the power circuit 42.

When an area in which image information can be recorded is available (S26), if the distance measuring/photometry switch (SW1) is turned on using the operating means 66 (S27), the control means 60 instructs the image pickup control circuit 40 to execute distance measurement and photometry. The image pickup control circuit 40 allows the distance measuring circuit 34 and photometry circuit 36 to execute distance measurement and photometry, focuses the lens array 10 at an object, and determines a shutter speed (S28). The distance measurement and photometry will be described in detail later.

The control means 60 repeats distance measurement and photometry (S28) until the distance measurement/photometry switch (SW1) and image pickup switch (SW2) are turned on using the operating means 66 (S29)

When the imaging switch (SW2) is turned on using the operating means 66 (S29), the control means 60 determines whether image data acquired by the image pickup apparatus 200 can be recorded in the memory means 62 or the recording medium 90 (S30). If recording cannot be done because a recordable empty area is unavailable or the recording medium is disconnected, the control means 60 displays a warning on the display means 64 (S34), and then waits until the imaging switch in the operating means 66 is pressed (S25).

If a recordable area is available (S30), the control means 60 instructs the image pickup control circuit 40 to execute photography. The image pickup control circuit 40 executes photography and writes image data in the image memory 24 (S31). This photography will be described in detail later.

If the next photography is performed soon (S32), control is returned to the step S29. The aforesaid sequence is repeated.

When continuous photography is not executed or the next photography is not performed because the image memory 24 is full (S32), the control means 60 instructs the image pickup control circuit 40 to execute recording. The image pickup control circuit 40 reads image data from the image memory 24, and sends the image data to the information-processing apparatus 300 via the memory control circuit 20, interface 52, and connector 54. The control means 60 writes the received image data in the memory means 62 via the connector 74 and interface 72. The control means 60 may also write the receive image data in the recording medium 90 via the interface 76 and connector 78 (S33). The control means 60 then returns control to the step S29.

If the distance measurement/photometry switch (SW1) in the operating means 66 is turned off (S27), the control means 60 waits until the imaging switch in the operating means 66 is pressed (S25).

Figure 4:
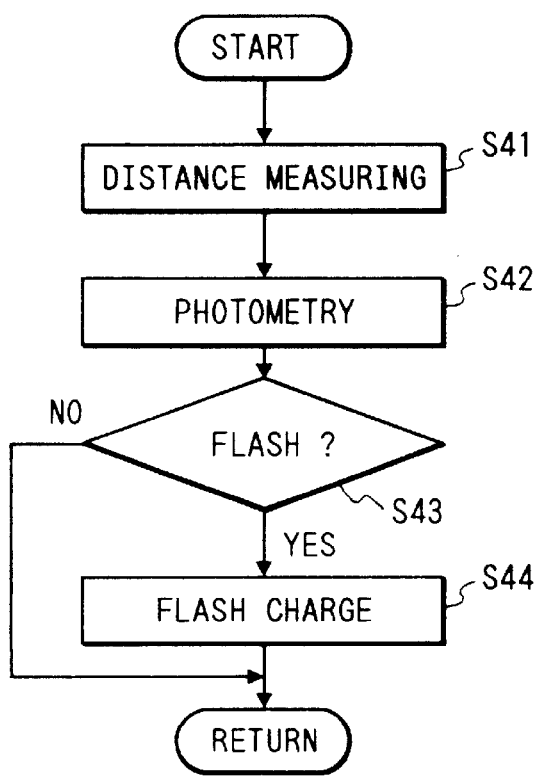
FIG. 4 is a flowchart of a distance measurement and photometry routine in this embodiment.

FIG. 4 is a detailed flowchart of the distance measurement and photometry to be executed at the step S28 in FIG. 3B. The image pickup control circuit 40 allows the distance measuring circuit 34 to measure a distance to an object, and then stores the measured data in the internal memory thereof (S41). The image pickup control circuit 40 allows the photometry means 36 to measure a brightness level of the object, and then stores the metered data in the internal memory thereof (S42). The metered value provided by the photometry circuit 36 is checked to see if the flash is needed (S43). If the flash is needed, a flash flag is set. The flash 38 is then charged (S44).

Figure 5:
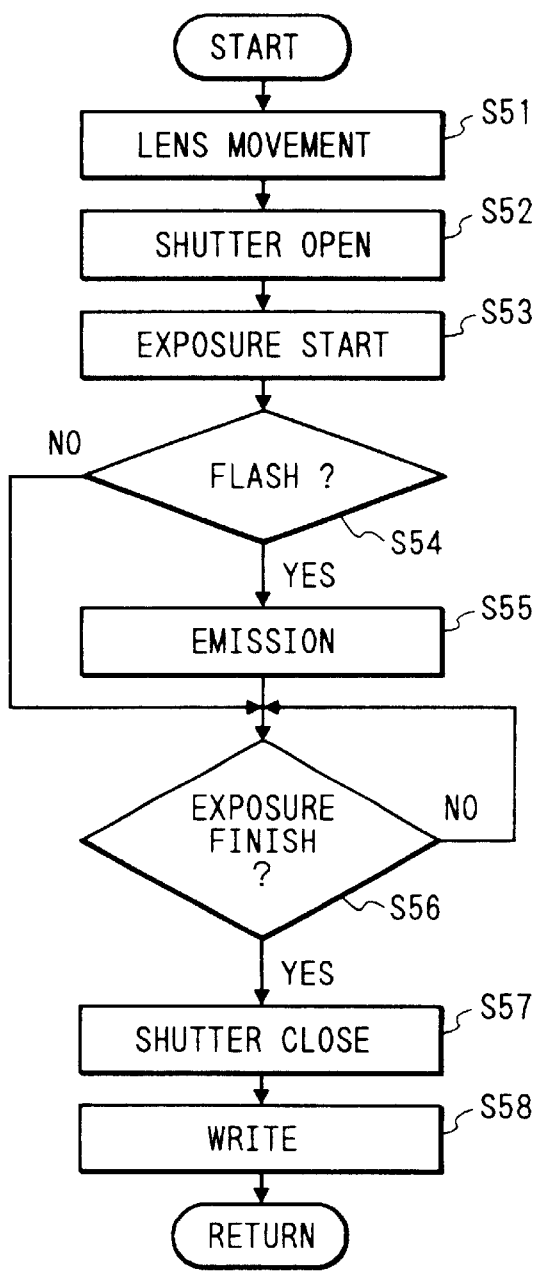
FIG. 5 is a flowchart of a photography routine in this embodiment.

FIG. 5 is a detailed flowchart of the photography to be executed at the step S31 in FIG. 3B.

The image pickup control circuit 40 reads the data of a distance to an object from the internal memory thereof, and allows the lens drive circuit 32 to drive the focusing lens in the lens array 10. The lens array 10 is thus focused at the object (S51). Based on the photometry data stored in the internal memory of the image pickup control circuit 40, the shutter drive circuit 30 causes the shutter 12 to open (S52). The image pickup element 14 is then exposed to light (S53). The flash flag is checked to see if the flash 38 is needed (S54). If the flash 38 is needed, the flash 38 is actuated to generate flashlight (S55). The image pickup control circuit 40 waits until exposure of the image pickup element 14 to light is completed (S56). The image pickup control circuit 40 then closes the shutter 12 (S57), reads a charged signal from the image pickup element 14, and writes the data of an photographed image in the image memory 24 using the A/D converter 16 and memory control circuit 20 (S58).

Another Embodiment

The second embodiment of the present invention will be described below.

Figure 6B:
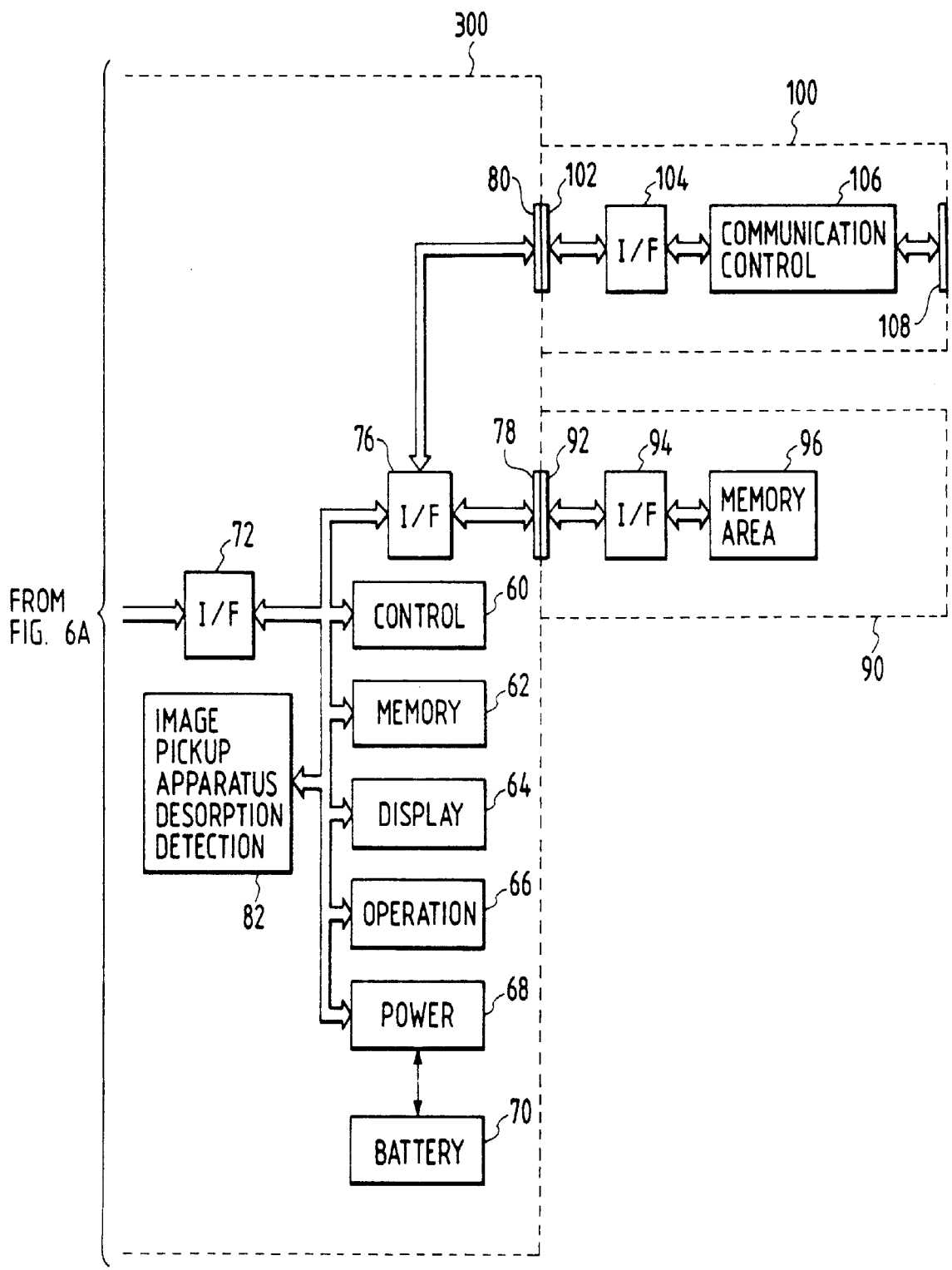
FIG. 6 is comprised of FIGS. 6A and 6B showing block diagrams of a configuration of the second embodiment of the present invention.

FIGS. 6A and 6B are a block diagram of the second embodiment of the present invention.

In FIG. 6A, reference numeral 400' denotes an image pickup apparatus. Differences of FIGS. 6A and 6B from FIGS. 1A and 1B will be described.

The image pickup apparatus 400' comprises an image pickup means 402, a recording medium 426, a program storage means 405, an interface 452, and a connector 454.

Reference numeral 450 denotes program storage means for storing programs each describing imaging for the image pickup means 402. The stored programs are run by the information processing apparatus 300.

The recording medium 426 may be a semiconductor memory, a magnetic tape, a magnetic disk, a magneto-optical disk, or the like. The recording medium 426 may be fixed to or demountable from the image pickup apparatus 400. The recording medium 426 may comprise a plurality of recording media or a plurality of types of recording media. Some of the recording media may be fixed to the image pickup apparatus 400, while the remaining recording media may be demountable therefrom.

The image pickup means 402 has components 410 to 424, and 430 to 446. These components are equivalent to the components 10 to 24, and 30 to 46 in the first embodiment, of which description will therefore be omitted from the description of the second embodiment.

Referring to FIGS. 2A, 2B, 4, 5, 7A and 7B, the operation of the second embodiment will be described. The main routine in the second embodiment is identical to that in the first embodiment described in conjunction with the flowchart of FIGS. 2A and 2B, of which description will therefore be omitted.

Figure 7:
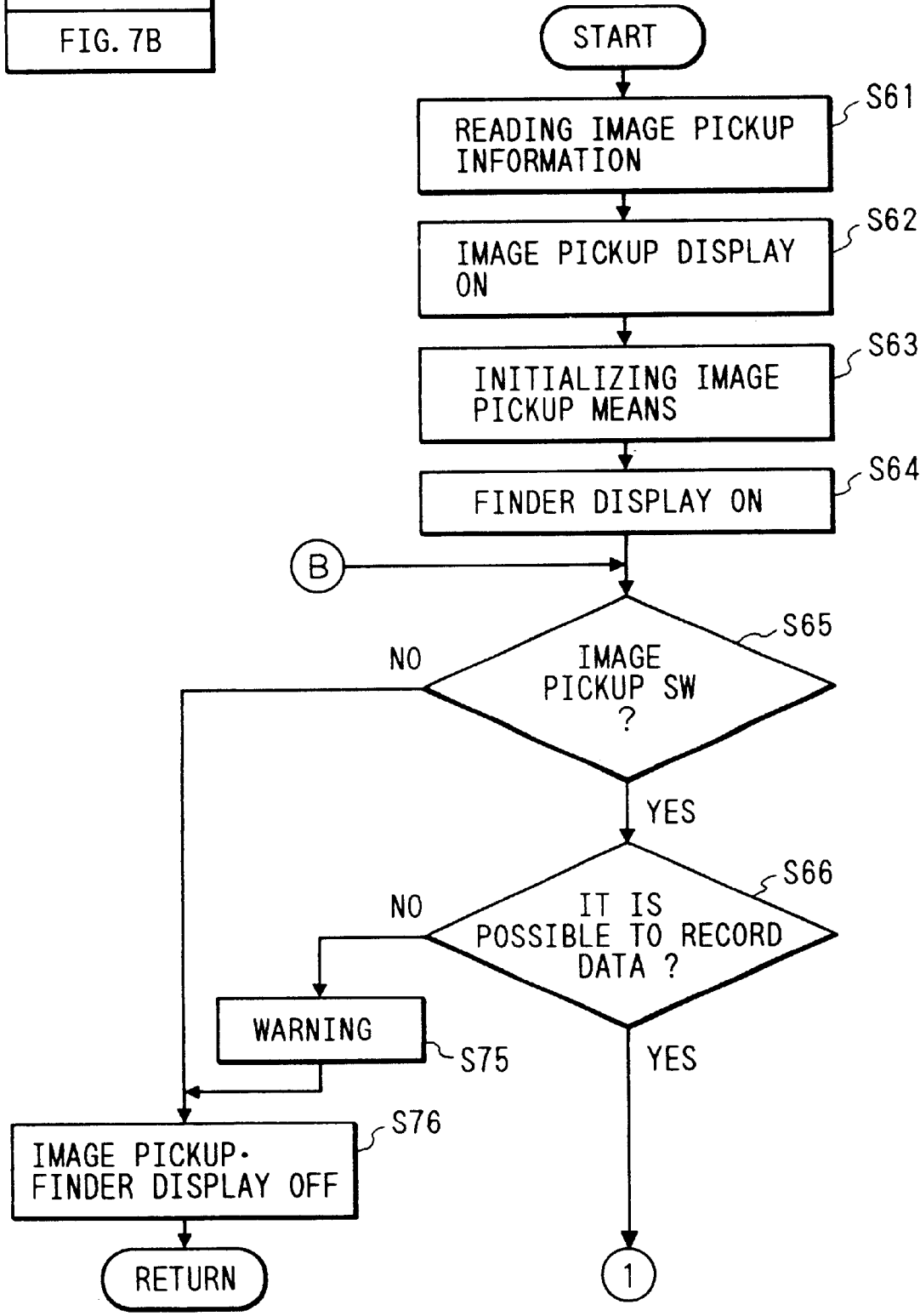
FIG. 7 is comprised of FIGS. 7A and 7B showing flowcharts of an imaging program running routine in the second embodiment.
Figure 7B:
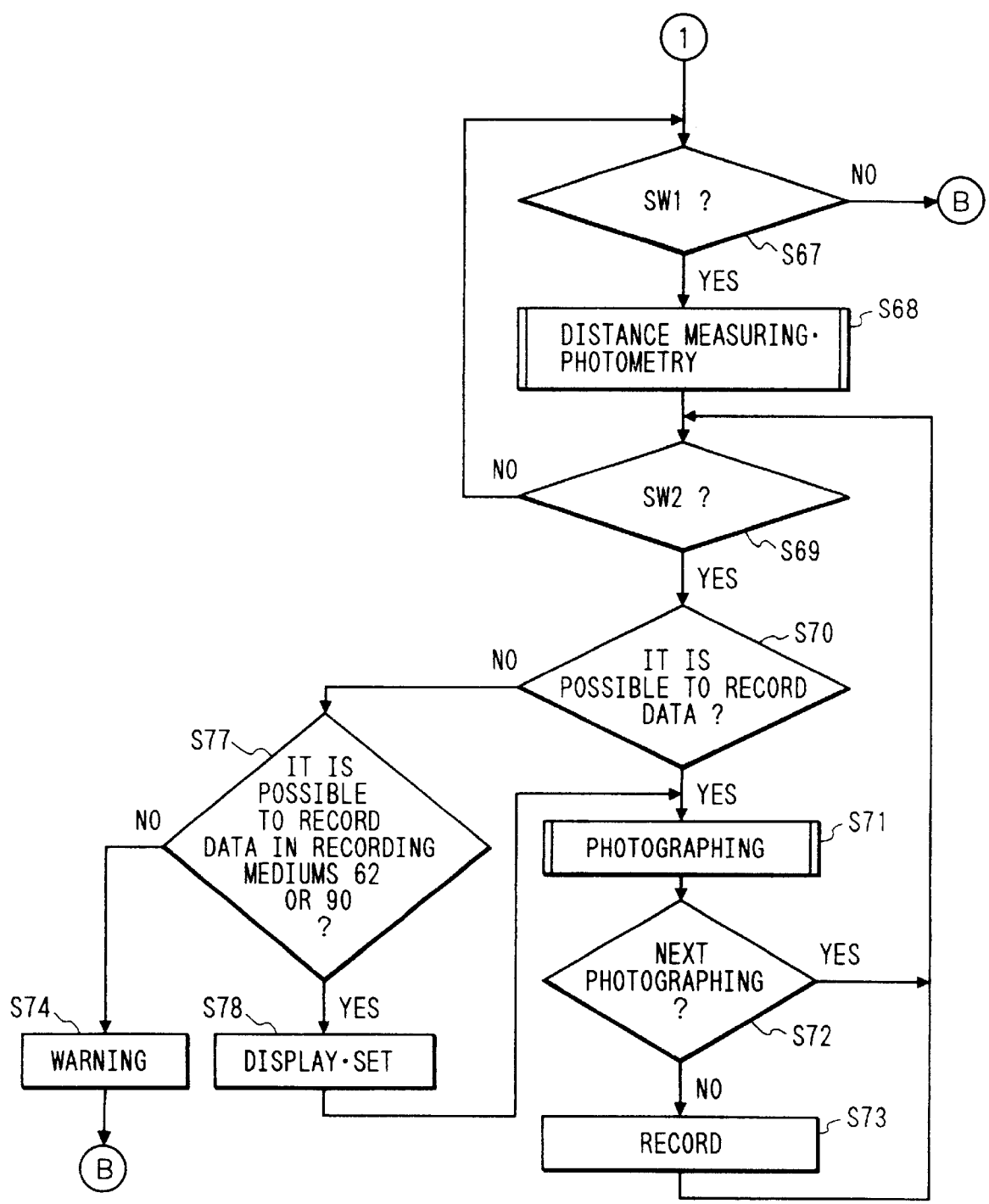

FIGS. 7A and 7B are a detailed flowchart of the imaging program to be run at the step S13 in FIG. 2B. The description below will proceed on the assumption that a data signal and a control signal are transferred between the control means 60 and image pickup control circuit 440 via the interface 72, connector 74, connector 454, and interface 452.

The control means 60 reads data (image pickup information) inherent to the mounted image pickup apparatus 400 from a program stored in an area of the memory means 62 at the step S12 in FIG. 2B and written to operate the image pickup apparatus 400 (S61), and produces a display screen necessary for imaging on the display means 64 according to the read imaging information (S62).

The contents of the "display screen necessary for imaging" such as a position, a color, a frame, and other items have already been displayed. At the step S9 in FIG. 2B, therefore, items and numerical values dependent on the specifications and performance of the image pickup apparatus 400 are indicated with characters, numerals, and pictures such as an icon.

The control means 60 in the information processing apparatus 300 instructs the image pickup control circuit 400 to initialize the image pickup means 402. In response to the instruction, the image pickup control circuit 440 resets flags and variables, turns on the power circuit 442, and initializes the components of the image pickup means (S63).

The control means 60 instructs the image pickup control circuit 440 to produce a through-mode display screen. In response to the instruction, the image pickup control circuit 440 transmits an image formed on the image pickup element 412 to the information processing apparatus 300 via the A/D converter 416, memory control circuit 420, image memory 424, memory control circuit 420 again, interface 452, and connector 454. The control means 60 writes the acquired image data in the internal video memory of the display means 64 via the connector 74 and interface 72, reads the image data to display it as a view finder display screen on the display means 64 (S64).

If the imaging switch in the operating means 66 is off (S65), the control means 60 in the information processing apparatus completes the image pickup display on the display means 64 and the viewfinder display (S76), and terminates the execution of the image pickup program (S13).

The control means 60 determines whether the image data acquired by the image pickup apparatus 400 can be recorded in the memory means 62 or the recording medium 90 (S66). If recording cannot be done because a recordable empty area is unavailable or no recording medium is connected, the control means 60 display a warning on the display means 64 (S75), quits the viewfinder display screen (S76), and terminates the run of the image pickup program (S13). When terminating the run of the image pickup program, the control means 60 instructs the image pickup control circuit 440 to terminate the operation of the image pickup means 402. The image pickup control circuit 440 executes the termination processing necessary for the components of the image pickup means 402, and turns off the power circuit 442.

When a recordable area is available (S66), if the distance measurement/photometry switch (SW1) is turned on (S67), the control means 60 instructs the image pickup control circuit 440 to execute distance measurement and photometry. The image pickup control circuit 440 allows the distance measuring circuit 434 and photometry circuit 436 to execute distance measurement and photometry, focuses the lens array 410 at an object, and determines a shutter speed (S68).

The control means 60 repeats the distance measurement and photometry (S68) until the distance measurement/photometry switch (SW1) and imaging switch (SW2) are turned on one after another using the operating means 66.

When the imaging switch (SW2) is turned on using the operating means 66 (S69), the control means 60 determines whether the image data acquired by the image pickup apparatus 400 can be recorded in the recording medium 426 (S70). If the recording medium 426 has no recordable area, it is determined whether the image data can be recorded in the memory means 62 in the information processing apparatus or the recording medium 90 connected to the information processing apparatus (S77). If recording cannot be done because the memory means 62 or recording medium 90 has no empty area or the recording medium 90 is disconnected, the control means 60 displays a warning on the display means 64 (S74), and waits until the imaging switch in the operating means 66 is pressed (S65).

If the memory means 62 or recording medium 90 has a recordable empty area (S77), the control means 60 performs the setting of changing a medium in which acquired image data is recorded from the recording medium 426 to the memory means 62 or recording medium 90, and displays Setting Changed (S78).

If the recording medium 426 (S70) or the memory means 62 or recording medium 90 has a recordable area (S77 and S78), the control means 60 intstructs the image pickup control circuit 440 to execute photography. The image pickup control circuit 440 executes photography and writes image data in the image memory 424 (S71).

If the next photography is executed soon (572), control is returned to the step S69. The aforesaid sequence is repeated.

If continuous photography is not executed or the next photography is not performed because the image memory 424 is full (S72), the control means 60 instructs the image pickup control circuit 440 to execute recording. When the recording medium 426 is specified as a recording medium, the image pickup control circuit 440 reads image data from the image memory 424, and writes the image data in the recording medium 426 via the memory control circuit 420 and the interface 452. When the memory means 62 or recording medium 90 is specified as a recording medium, image data is read from the image memory 424, and sent to the information processing apparatus 300 via the memory control circuit 420, interface 452, and connector 454. The control means 60 writes the received image data in the memory means 62 via the connector 74 and interface 72. The control means 60 may also write the receive image data in the recording medium 90 via the interface 76 and connector 78 (S73). Control is then returned to the step S69.

The recording at the step S73 and the photography at the step S71 may be executed in parallel with each other. If the distance measurement/photometry switch (SW1) is turned off using the control means 60 (S67), the control means 60 waits until the imaging switch in the operating means 66 is pressed (S65).

The sequences of the distance measurement and photometry to be executed at the step S68 in FIG. 7B and of the photography to be executed at the step S71 therein are identical to those in the first embodiment described in conjunction with FIGS. 4 and 5, of which description will therefore be omitted.

The third embodiment of the present invention will be described later.

Figures 8, 8A:
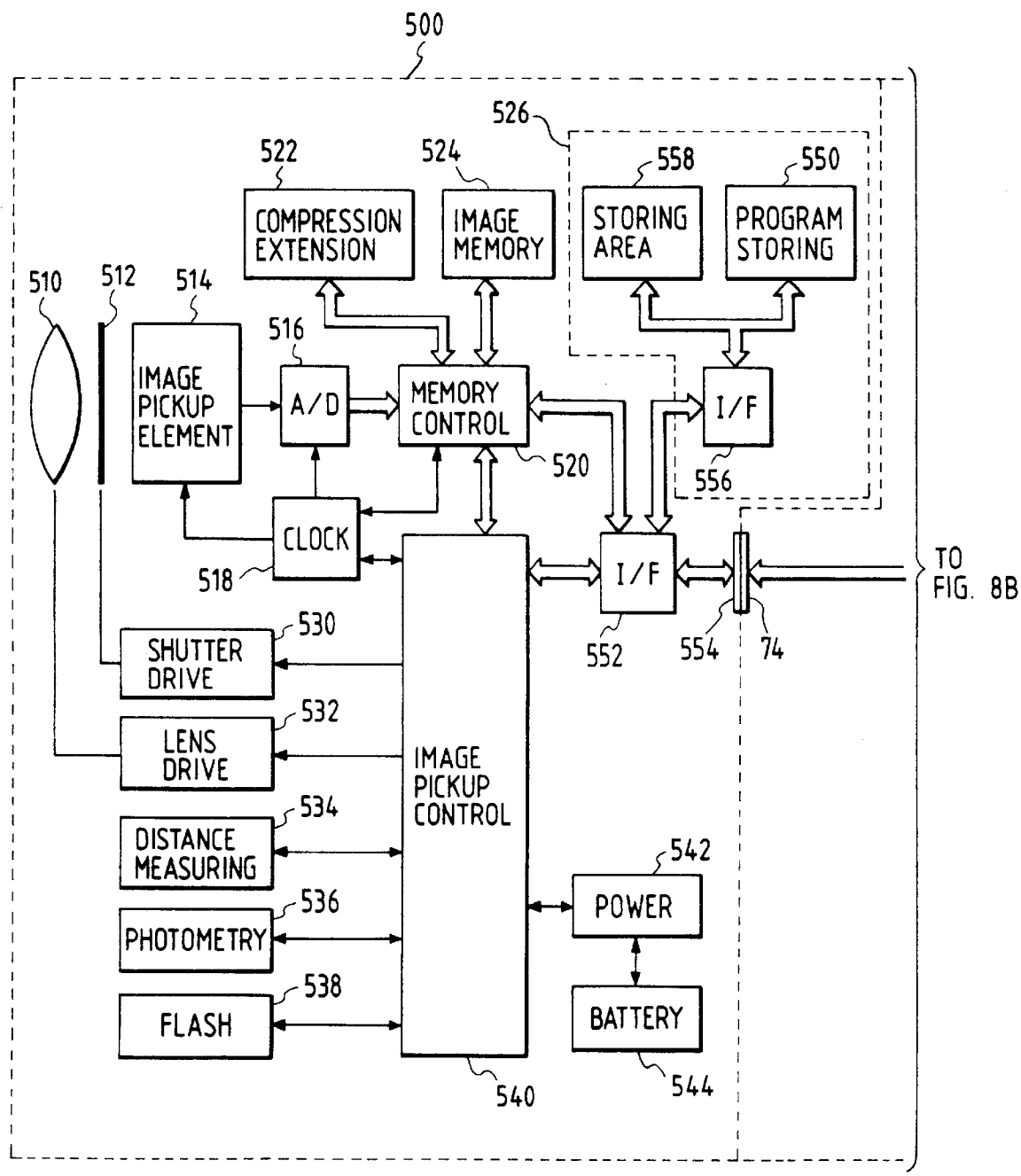
FIG. 8 is comprised of FIGS. 8A and 8B showing block diagrams of a configuration of the third or fourth embodiment of the present invention.
Figure 8B:
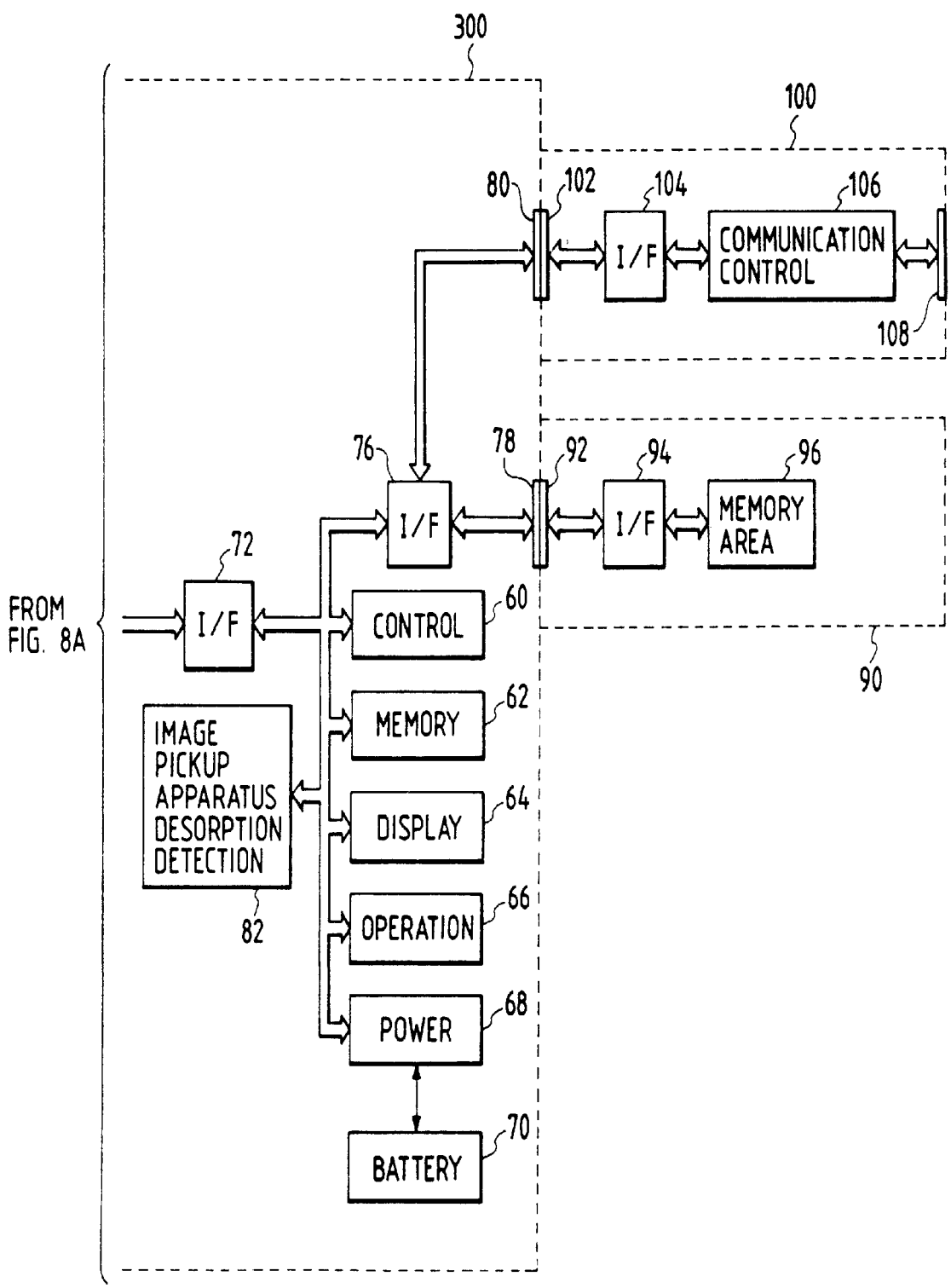

FIGS. 8A and 8B are block diagrams showing the third embodiment of the present invention.

In FIG. 8A, reference numeral 500 denotes an image pickup apparatus.

The image pickup apparatus 500 comprises an image pickup means 502, a recording medium 526, an interface 552, and a connector 554.

The recording medium 526 is a semiconductor memory, magnetic tape, magnetic disk, magneto-optical disk, or the like. The recording medium 526 may be fixed to or demountable from the image pickup apparatus 500. Alternatively, the recording medium 526 may comprise a plurality of recording media or a plurality of types of recording media. Some of the recording media may be fixed to the image pickup apparatus 500 and the remaining recording media may be demountable therefrom.

The recording medium 526 comprises a recording area 558 and a program storage means 550.

Reference numeral 550 denotes a program storage means for storing programs each describing imaging for the image pickup means 502. The stored programs are run by the information processing apparatus 300.

Reference numeral 558 denotes a recording area in the recording medium 526. Acquired image data and information concerning imaging are recorded in the recording area 526.

The recording area 558 and program storage means 550 are independent of each other in the recording medium 526. Alternatively, the recording area 558 and program storage means 550 may be provided as a single unit. Part of the unit may be assigned to recording of image data, and the other part thereof may be assigned to storage of an imaging program. This alternative poses no problem.

The image pickup means 502 has components 510 to 524 and 530 to 546. The components are equivalent to those 10 to 24 and 30 to 46 in the first embodiment, of which description will be omitted from the description of the third embodiment.

Referring to FIGS. 2A, 2B, 4, 5, 9A and 9B, the operation of the third embodiment will be described. The sequence of a main routine in the third embodiment is identical to that in the first embodiment described in conjunction with the flowchart of FIGS. 2A and 2B, of which description will be omitted.

Figure 9B:
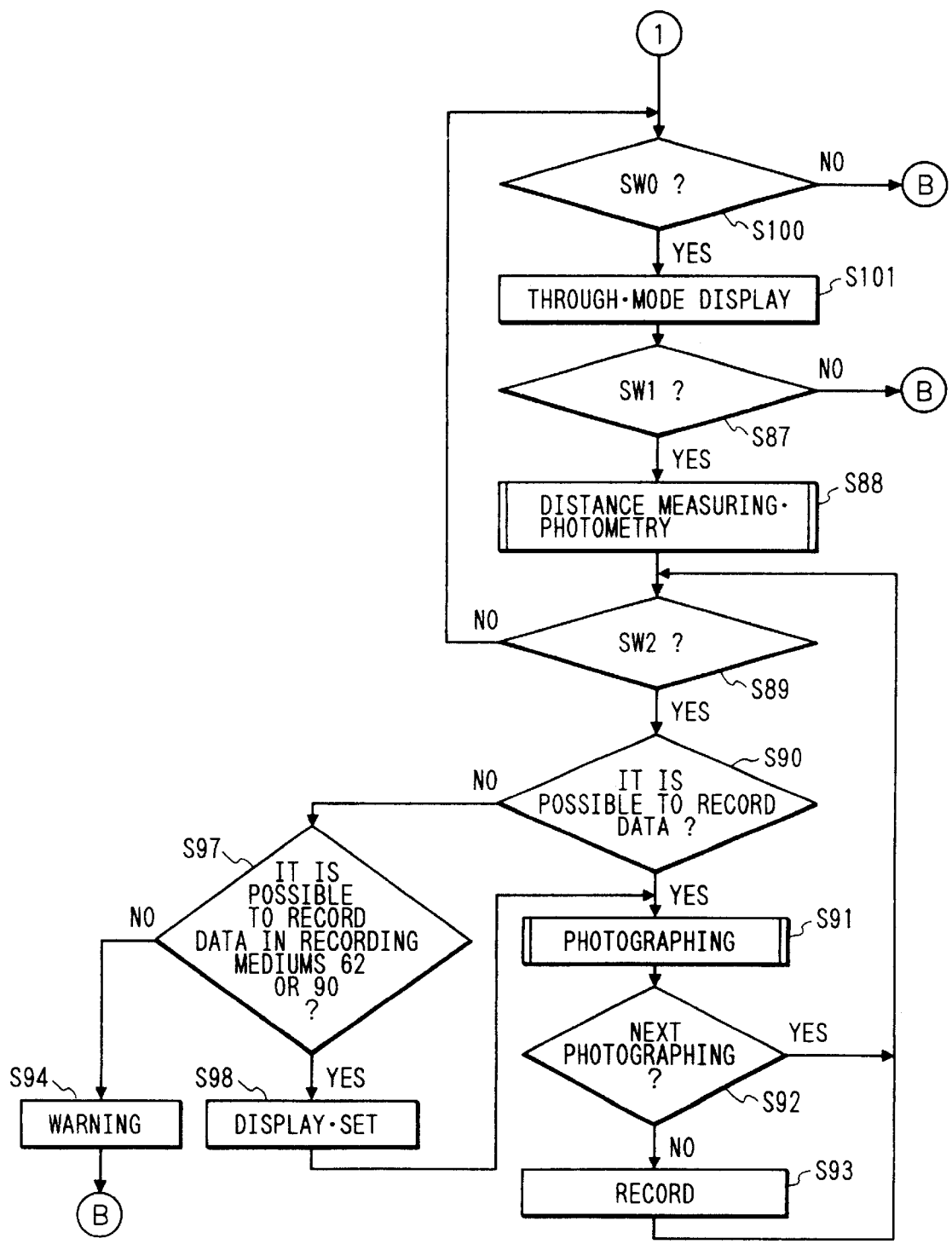
FIG. 9 is comprised of FIGS. 9A and 9B showing flowcharts of an imaging program running routine in the third embodiment.

FIGS. 9A and 9B are detailed flowcharts of the imaging program to be run at the step S13 in FIG. 2B. The description below will proceed on the assumption that a data signal and a control signal will be transferred between the control means 60 and image pickup control circuit 540 via the interface 72, connector 74, connector 75, and interface 552.

The control means 60 reads data (imaging information) inherent to the mounted image pickup apparatus 500 from a program stored in an area of the memory means 62 at the step S12 in FIG. 2B and written to operate the image pickup apparatus 500 (S81), and produces a display screen necessary for imaging on the display means 64 according to the read imaging information (S82).

The contents of the "display screen necessary for imaging" such as a position, a color, a frame and other items have already been displayed. At the step S9 in FIG. 2B, therefore, items and numerical values dependent on the specifications and performance of the mounted image pickup apparatus 500; that is, the aforesaid information are displayed using characters, numerals, and pictures such as an icon.

The control means 60 instructs the image pickup control circuit 540 to initialize the image pickup means 502. In response to the instruction, the image pickup control circuit 540 resets flags and variables, turns on the power circuit 542, and initializes the components of the image pickup means 502 (S83).

The control means 60 instructs the image pickup control circuit 540 to produce a through-mode display screen. In response to the instruction, the image pickup control circuit 540 transmits an image formed on the image pickup element 512 to the information processing apparatus 300 through the A/D converter 516, memory control circuit 520, image memory 524, memory control circuit 520 again, interface 552, and connector 554. The control means 60 writes acquired image data in the internal video memory of the display means 64 via the connector 74 and interface 72, reads the image data, and displays it as a viewfinder display screen on the display means 64 (S84).

If the imaging switch in the operating means 66 is off (S85), the control means 60 quits the imaging display screen and viewfinder display screen on the display means 64 (S96), and terminates the run of the image pickup program (S13).

The control means 60 determines whether the image data acquired by the image pickup apparatus 500 can be recorded in the memory means 62 or recording medium 90 (S86). If recording cannot be done because a recordable empty area is unavailable or no recording medium is connected, the control means 60 displays a warning on the display means 64 (S95), quits the imaging and viewfinder display screens on the display means 64 (S96), and terminates the run of the imaging program (S13). When terminating the run of the imaging program, the control circuit 60 instructs the image pickup control circuit 540 to terminate the operation of the image pickup means 502. The image pickup control circuit 540 executes the termination processing required for the components of the image pickup means 502, and turns off the power circuit 542.

When a recordable area is available (S86), if an active switch (SW0) is turned on using the operating means 66 (S100), the control means 60 sets the viewfinder display screen to the through mode (S101). When a distance measurement/photometry switch (SW1) is turned on using the operating means 66 (S87), the control means 60 instructs the image pickup control circuit 540 to execute distance measurement and photometry. The image pickup control circuit 540 allows the distance measuring circuit 534 and photometry circuit 536 to execute distance measurement and photometry, focuses the lens array 510 at an object, and determines a shutter speed (S88).

The control means 60 repeats the distance measurement and photometry (S88) until the active switch (SW0), the distance measurement/photometry switch (SW1) and imaging switch (SW2) are turned on one after another using the operating means 66 (S89).

When the imaging switch (SW2) is turned on using the operating means 66 (S89), the control means 60 determines whether the image data acquired by the image pickup apparatus 500 can be recorded in the recording medium 526 (S90). If the recording medium 526 has no recordable area, the control means 60 determines whether the image data can be recorded in the memory means 62 or recording medium 90 (S97). If recording cannot be done because the memory means 62 or recording medium 90 has no empty area or the recording medium 90 is disconnected, the control means 60 displays a warning on the display means 64 (S94), sets the viewfinder display screen to the monitor mode (S99), and waits until the imaging switch in the operating means 66 is pressed (S85).

If the memory means 62 or recording medium 90 has a recordable empty area (S97), the control means 60 performs the setting of changing a medium in which acquired image data is stored from the recording medium 526 to the memory means 62 or recording medium 90, and displays Setting Changed (S98).

If the recording medium 526 has a recordable area (S90), or the memory means 62 or recording medium 90 has a recordable area (S97 and S98), the control means 60 instructs the image pickup control circuit 540 executes photography. The image pickup control circuit 540 executes photography and writes image data in the image memory 524 (S91).

If the next photography is executed soon (S92), control is returned to the step S89. The aforesaid sequence is repeated.

If continuous photography is not executed or the next photography is not performed soon because the image memory 524 is full (S92), the control means 60 instructs the image pickup control circuit 540 to execute recording. When the recording medium 526 is specified as a recording medium, the image pickup control circuit 540 reads image data from the image memory 524, and writes the image data in the recording medium 526 via the memory control circuit 520 and interface 552. When the memory means 62 or recording medium 90 is specified as a recording medium, the control means 60 reads the image data from the image memory 524 and sends it to the information processing apparatus 300 via the memory control circuit 520, interface 552, and connector 554. The control means 60 writes the received image data in the memory means 62 via the connector 74 and interface 72. The control means 60 may also write the received image data in the recording medium 90 via the interface 76 and connector 78 (S93). Control is then returned to the step S89.

When the active switch (SW0) is turned off using the operating means 66 (S100) or the distance measurement/photometry switch (SW1) is turned off using the operating means 66 (S87), the control means 60 sets the viewfinder display screen to the monitor mode (S99), and waits until the imaging switch in the operating means 66 is pressed (S85). In this embodiment, when the active switch is turned on, the monitor mode is set up.

The sequences of the distance measurement/photometry and imaging to be executed at the steps S88 and S91 in FIG. 9B are identical to those in the first embodiment described in conjunction with the detailed flowcharts of FIGS. 4 and 5, of which description will therefore be omitted.

The fourth embodiment of the present invention will be described below.

Referring to FIGS. 2A, 2B, 4, 5, 10A and 10B, the operation of the fourth embodiment will be described. In the fourth embodiment, a system having the configuration shown in FIGS. 8A and 8B operates differently from that in the third embodiment. The sequence of a main routine in this embodiment representing the operation of this embodiment is identical to that in the first embodiment described in conjunction with FIGS. 2A and 2B, of which description will therefore be omitted.

Figure 10B:
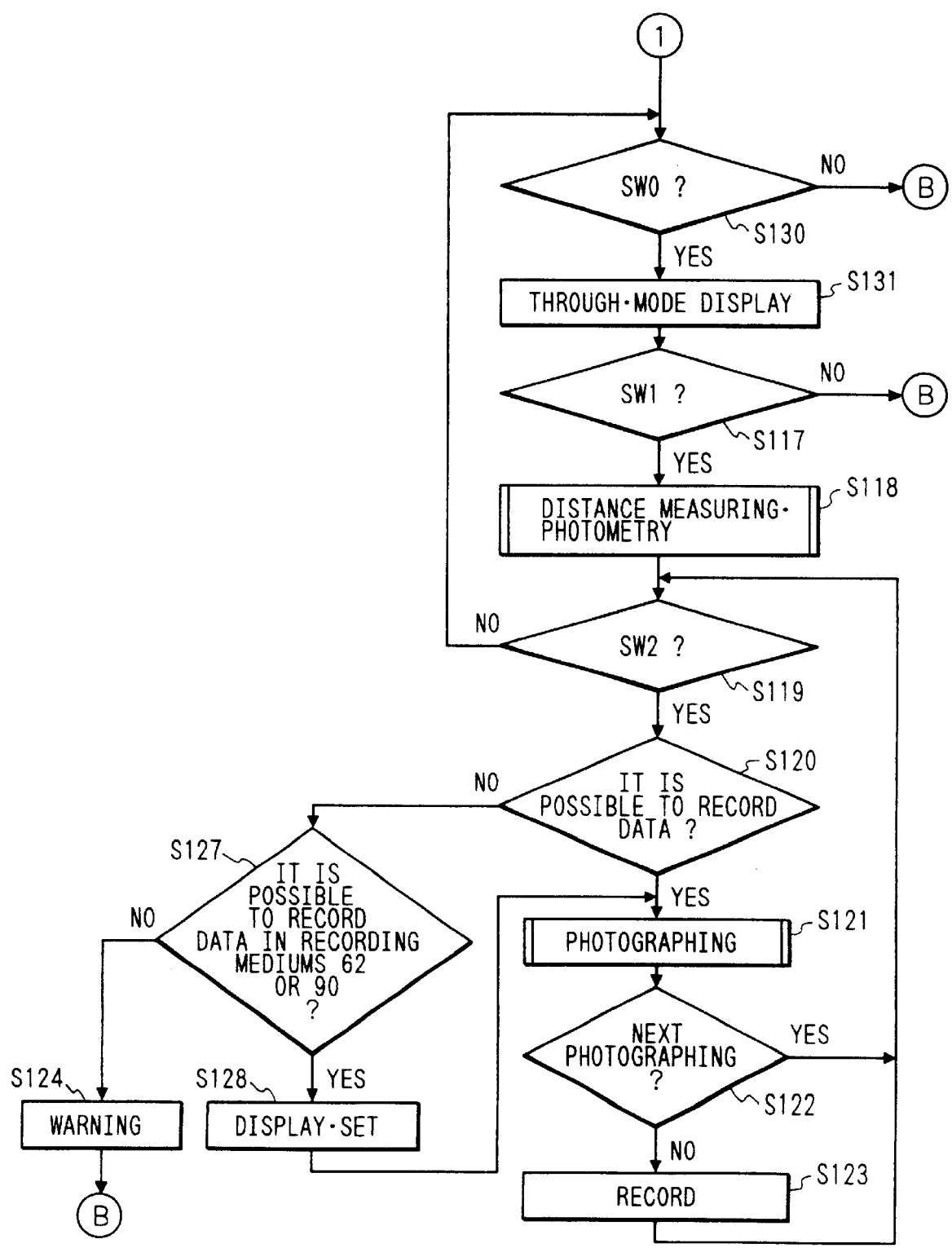
FIG. 10 is comprised of FIGS. 10A and 10B showing flowcharts of an imaging program running routine in the fourth embodiment.

FIGS. 10A and 10B are a detailed flowchart showing the imaging program to be run at the step S13 in FIG. 2B. The description below will proceed on the consumption that a data signal and a control signal will be transferred between the control means 60 and image pickup control circuit 540 via the interface 72, connector 74, connector 554, and interface 552.

The control means 60 reads data (imaging information) inherent to the mounted image pickup apparatus 500 from a program stored in an area of the memory means 62 at the step S12 in FIG. 2B and written to operate the image pickup apparatus 500 (S111), and produces a display screen necessary for imaging on the display means 64 according to the read imaging information (S112).

The contents of the "display screen necessary for imaging" such as a position, a color, a frame, and other items have already been display. At the step S9 in FIG. 2B, therefore, items and numerical values dependent on the specifications and performance of the mounted image pickup apparatus 500 are displayed using characters, numerals, and pictures such as an icon.

The control means 60 instructs the image pickup control circuit 540 to initialize the image pickup means 502. In response to the instruction, the image pickup control circuit 540 resets flags and variables, turns on the power circuit 542, and initializes the components of the image pickup means 502 (S113).

The control means 60 instructs the image pickup control circuit 540 to produce a through-mode display screen. In response to the instruction, the image pickup control circuit 540 transmits an image formed on the image pickup element 512 to the information processing apparatus 300 through the A/D converter 516, memory control circuit 520, image memory 524, memory control circuit 520 again, interface 552, and connector 554. The control means 60 writes the acquired image data in the internal video memory of the display means 64 via the connector 74 and interface 72, and reads the image data to display it as a viewfinder display screen on the display means 64 (S114).

When the imaging switch in the operating means 66 is off (S115), the control means 60 quits the imaging and viewfinder display screens on the display means 64 (S126), and terminates the run of the imaging program (S13).

The control means 60 determines whether the image data acquired by the image pickup apparatus 500 can be recorded in the memory means 62 or recording medium 90 (S116). If recording cannot be done because a recordable empty area is unavailable or no recording medium is connected, the control means 60 displays a warning on the display means 64 (S125), quits the imaging and viewfinder display screens on the display means 64 (S126), and terminates the run of the imaging program (S13). When terminating the run of the image pickup program, the control means 60 instructs the image pickup control circuit 540 to terminate the operation of the image pickup means 502. The image pickup control circuit 540 executes the termination processing required for the components of the image pickup means 502, and turns off the power circuit 542.

When a recordable area is available (S116), if the active switch (SW0) is turned on using the operating means 66 (S130), the control means 60 sets the viewfinder display screen to the through mode (S131). When the distance measurement/photometry switch (SW1) is turned on using the operating means 66 (S117), the control means 60 instructs the image pickup control circuit 540 to execute distance measurement and photometry. The image pickup control circuit 540 allows the distance measuring circuit 534 and photometry circuit 536 to execute distance measurement and photometry, focuses the lens array 510 at an object, and determines a shutter speed (S118).

The control means 60 repeats distance measurement and photometry (S118) until the active switch (SW0), distance measurement/photometry switch (SW1), and imaging switch (SW2) are turned on one after another using the operating means 66 (S119).

When the imaging switch (SW2) is turned on using the operating means 66 (S119), the control means 60 determines whether the image data acquired by the image pickup apparatus 500 can be recorded in the recording medium 526 (S120). If the recording medium 526 has no recordable area, the control means 60 determines whether the image data can be recorded in the memory means 62 or recording medium 90 (S127). If recording cannot be done because the memory means 62 or recording medium 90 has no recordable empty area or the recording medium 90 is disconnected, the control means 60 displays a warning on the display means 64 (S124), produces a through-mode display screen (S133) or a monitor-mode display screen (S129) according to the setting of the viewfinder display mode select switch in the operating means 66 (S132), and waits until the imaging switch in the operating means 66 is pressed (S115).

Either the through-mode display screen or monitor-mode display screen may be selected and displayed, or both thereof may be displayed according to the setting of the select switch. While both the through-mode display screen and monitor-mode display screen are being displayed, a selected one of them may be enlarged or located in the upper window.

When the memory means 62 or recording medium 90 has a recordable empty area (S127), the control means 60 performs the setting of changing a medium for use in storing acquired image data from the recording medium 526 to the memory means 62 or recording medium 90, and displays Setting Changed (S128).

When the recording medium 526 has a recordable area (S120) or the memory means 62 or recording medium 90 has a recordable area (S127 and S128), the control means 60 instructs the image pickup control circuit 540 to execute photography. The image pickup control circuit 540 executes photography and writes image data in the image memory 524 (S121).

If the next photography is executed soon (S122), control is returned to the step S119. The aforesaid processing is repeated.

If continuous photography is not executed or the next photography is not performed soon because the image memory 524 is full (S122), the control means 60 instructs the image pickup control circuit 540 to execute recording. When the recording medium 526 is specified as a recording medium, the image pickup control circuit 540 reads image data from the image memory 524 and writes the image data in the recording medium 526 via the memory control circuit 520 and interface 552. When the memory means 62 or recording medium 90 is specified as a recording medium, image data is read from the image memory 524, and sent to the information processing apparatus 300 via the memory control circuit 520, interface 552, and connector 554. The control means 60 writes the received image data in the memory means 62 via the connector 74 and interface 72. The control means 60 may also write the received image data in the recording medium 90 via the interface 76 and connector 78 (S123). Control is then returned to the step S119.

When the active switch (SW0) is turned off using the operating means 66 (S130) or the distance measurement/photometry switch (SW1) is turned off using the operating means 66 (S117), the control means 60 produces a through-mode display screen (S133) or a monitor-mode display screen (S129) according to the setting of the viewfinder display mode select switch in the operating means 66 (S132), and waits until the imaging switch in the operating means 66 is pressed (S115)

The sequences of the distance measurement and photometry and of the imaging to be executed at the steps S118 and S121 in FIGS. 10A and 10B are identical to those in the first embodiment described in conjunction with FIGS. 4 and 5, of which description will therefore be omitted.

Figure 11:
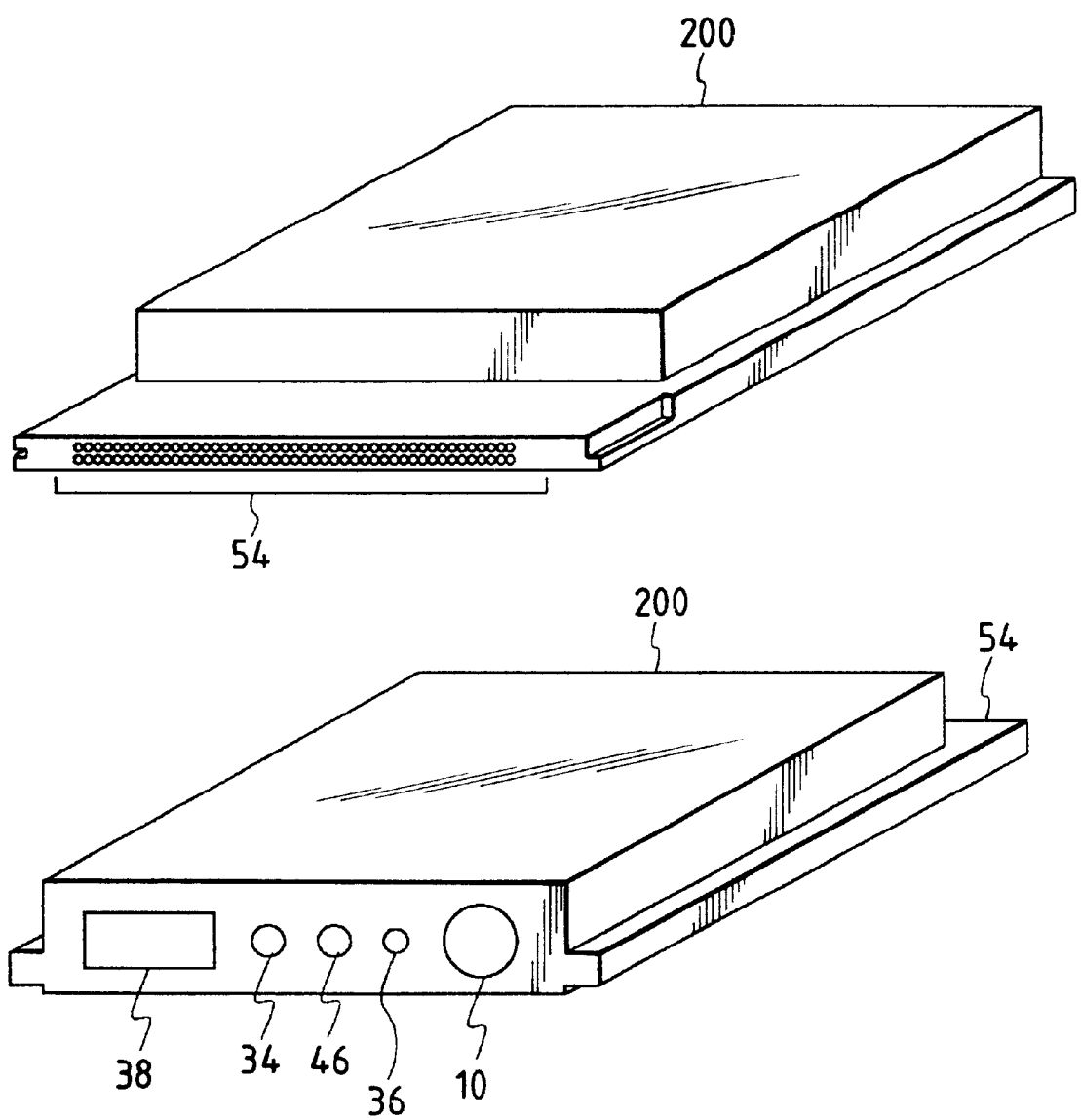
FIG. 11 shows an example of an image pickup apparatus 200 according to the present invention.

FIG. 11 is an oblique view showing the appearance of an embodiment of the image pickup apparatus 200 according to the present invention.

In the image pickup apparatus 200, the component elements necessary for the image pickup means 202 to effect imaging; such as, the lens array 10, distance measuring circuit 34, photometry circuit 36, white balance metering circuit 46, and flash 38 are arranged in the opposite side of the connector 54. The apparatus of this embodiment of the present invention is characterized by the layout that when the image pickup apparatus 200 is mounted on the information processing apparatus 300, the component elements required for imaging; such as, the lens array 10, distance measuring circuit 34, photometry circuit 36, white balance metering circuit 46, and flash 38 come out of the information processing apparatus 300.

Figure 12:
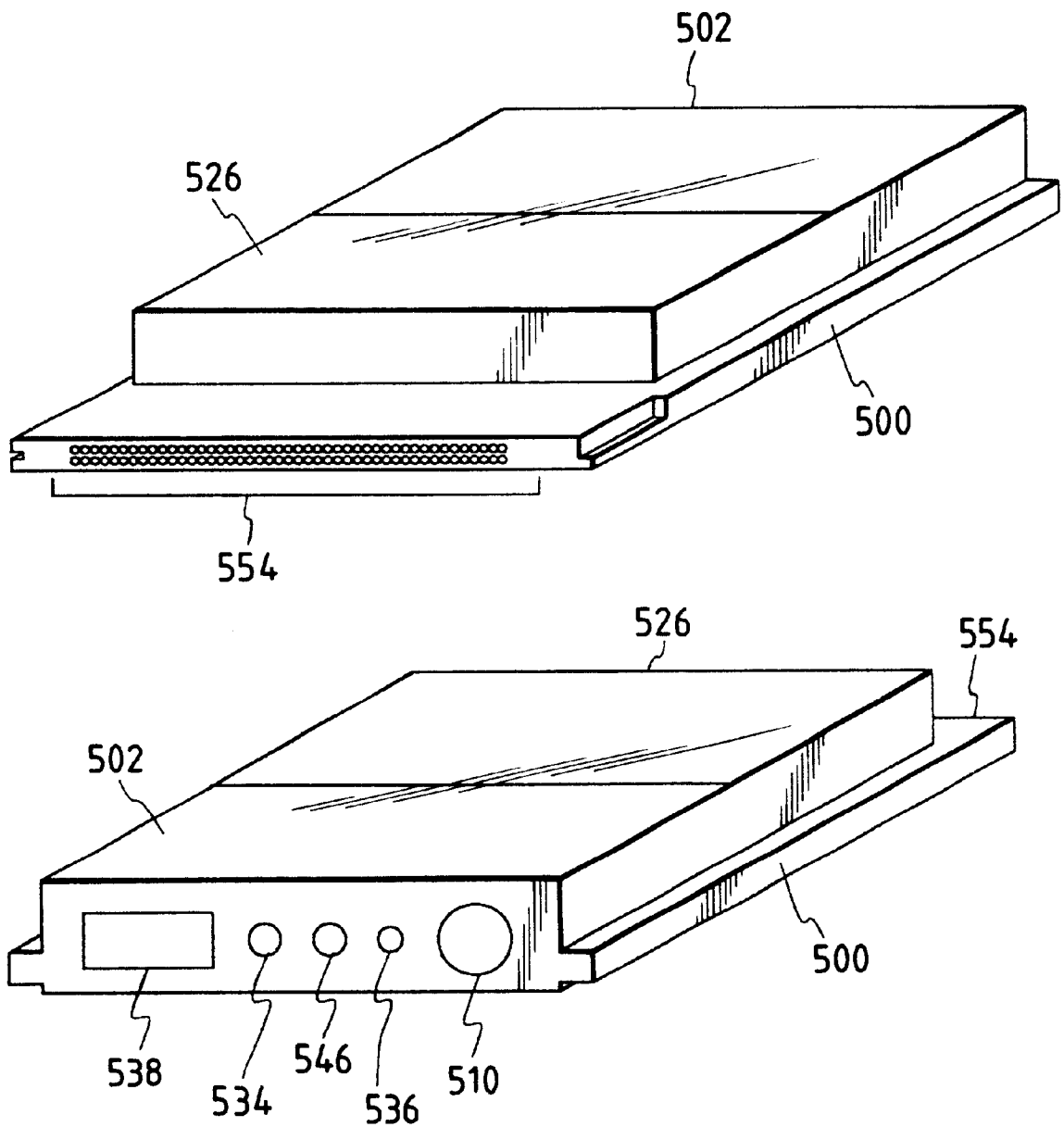
FIG. 12 shows an example of an image pickup apparatus 500 according to the present invention.

FIG. 12 is an oblique view showing the appearance of an embodiment of the image pickup apparatus 500 according to the present invention.

In the image pickup apparatus 500, the recording medium 526 is located near the connector 554 and the image pickup means 502 is located on the opposite side of the connector 554. In this embodiment of the present invention, when the image pickup apparatus 500 is mounted on the information processing apparatus 300, the component elements required for imaging such as, the lens array 510, distance measuring circuit 534, photometry circuit 536, white balance metering circuit 546, and flash 538 come out of the information processing apparatus 300.

Figure 13:
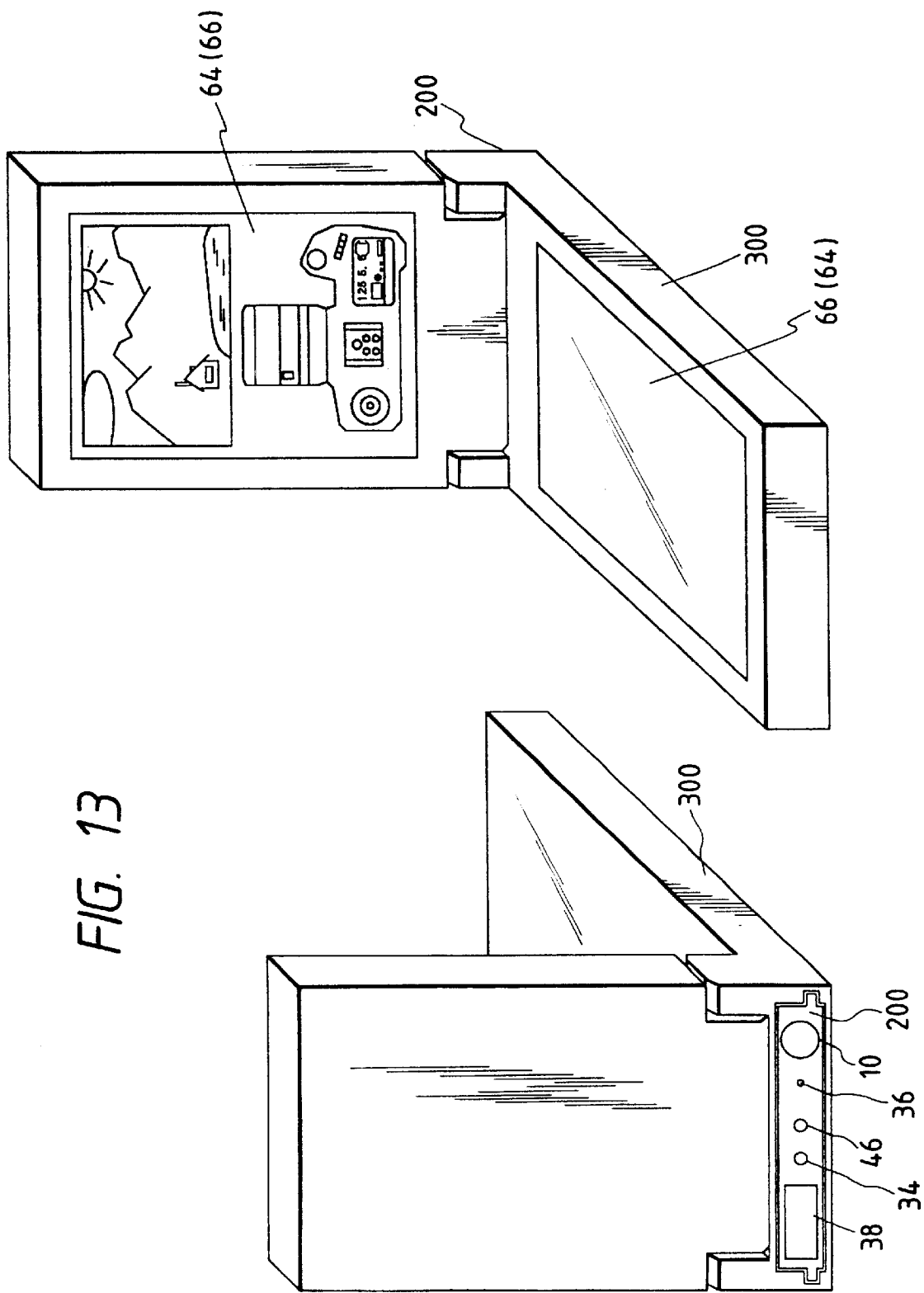
FIG. 13 shows an embodiment of an imaging system of the present invention.
Figure 14:
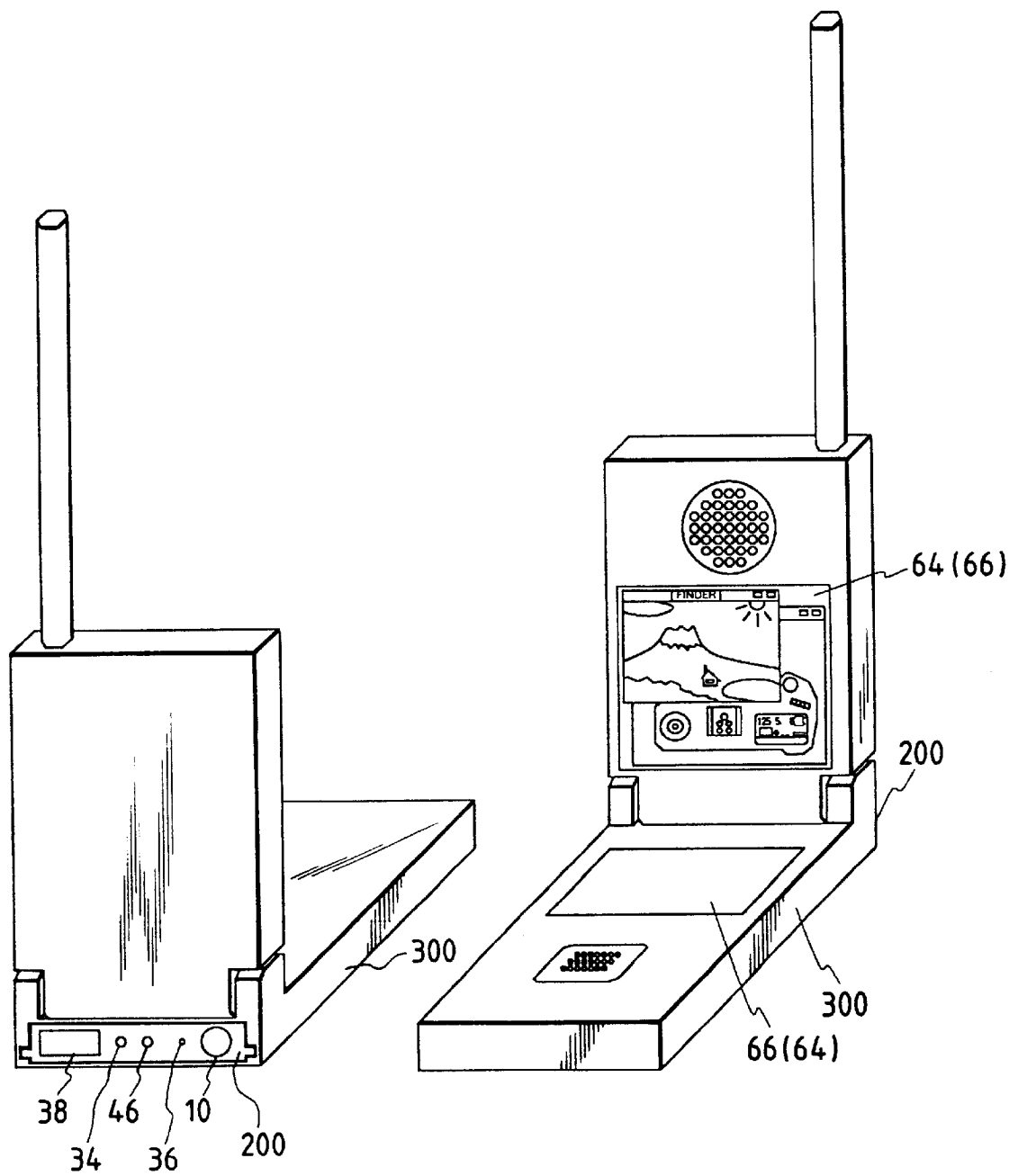
FIG. 14 shows an embodiment of an imaging system of the present invention.

FIGS. 13 and 14 are oblique views showing the appearances of embodiments of the imaging system of the present invention.

In FIG. 13, a portable computer is used as the information processing apparatus 300.

In the apparatus of this embodiment, the display means 64 displays a screen showing a state of the image pickup means 202 and an operating procedure and a screen showing a viewfinder in the through mode and/or monitor mode. The operating means 66 independent of or united with the display means 64 is used to operate the image pickup means; 202 and achieve imaging. In general, information is entered at the operating means 66 using keys or switches. Information in a display screen on the display means 64 may be selected using a pointing device such as a pen, mouse, trackball, touch-sensitive panel, or line-of-sight sensor, and provided as information entered at the operating means 66.

In FIG. 14, a portable wireless telephone is used as the information processing apparatus 300.

The display means 64 displays a screen showing a state of the image pickup means 202 and an operating procedure and a screen showing a viewfinder in the through mode and/or monitor mode. In this embodiment, the display screen showing a state and an operating procedure appears in the lower window, and the viewfinder display screen appears in the upper window. In addition to these two windows, another window may be created to show both the through-mode and monitor-mode display screens simultaneously. The operating means 66 independent of or united with the display means 64 is used to operate the image pickup means 202 and achieve imaging. In general, information is entered at the operating means 66 using keys and switches. Information in a display screen on the display means 64 may be selected using a pointing device such as a pen, mouse, trackball, touch-sensitive panel, or line-of-sight sensor, and supplied as information entered at the operating means 66.

When the information processing apparatus 300 is set to a state suitable for imaging, the imaging switch may be turned on. When the information processing apparatus 300 is set to a state suitable for communication such as telephoning, the imaging switch may be turned off. For example, in FIG. 14, when the information processing apparatus 300 is angled by more than 90° and postured so as to lie close to a user's face for convenient speech, it is determined that the system is used as a telephone and the imaging switch is turned off. On the other hand, when the information processing apparatus 300 is angled by about 90° and postured so as to be convenient for a user to perform imaging by looking at the viewfinder display screen, it is determined that the system is used for imaging and the imaging switch is turned on. The imaging switch should be located near the hinge of the information processing apparatus 300 and designed to be on or off according to the open angle of the information processing apparatus 300. This enables more effective use of the system of this embodiment.

Using FIGS. 1A, 1B, 6A, 6B, 8A and 8B, the embodiments of the present invention have been described. The recording medium 90 or recording medium 526 may be any of a semiconductor memory, a magnetic disk, a micro-digital audio tape, a magneto-optical disk, and an optical disk, which causes no problem.

The recording medium 90 and recording medium 526 may be formed as a composite medium made by uniting a semiconductor memory with a magnetic disk, which poses no problem. Moreover, the semiconductor of the composite medium memory may be detachable from and freely connectable to the main unit of the composite medium. This causes no problem, either. On the contrary, the magnet disk of the composite may be detachable from and freely connectable to the main unit of the composite medium. This causes no problem. Needless to say, the composite medium may be composed not only of a semiconductor memory and a magnetic disk but also of two or more of a semiconductor memory, a magnetic disk, a micro-digital audio tape, a magneto-optical disk, and an optical disk, which causes no problem.

The description of the embodiments has proceeded on the assumption that the recording medium 90 is independent of and freely connectable to the main unit of the information processing apparatus. Alternatively, the recording medium 90 may be fixed to the main unit. This causes no problem.

Two or more recording media 90 may be connected to the information processing apparatus, which poses no problem. One or more recording media 90 may be fixed to the main unit of the information processing apparatus, and one or more recording media 90 may be freely connectable thereto. This poses no problem, either.

The communication means 100 lies independently of and freely connectable to the main unit of the information processing unit. Alternatively, the communication means 100 may be fixed to the main unit thereof. Needless to say, no problem occurs.

A configuration in which two or more communication means 100 are connected to the information processing apparatus poses no problem. A configuration, in which one or more communication means 100 are fixed to the main unit of the information processing apparatus and one or more communication means 100 are freely connectable to the main unit thereof, is also acceptable.

The image pickup apparatus 200 comprises the image pickup means 202 and the program storage means 50 for storing programs each describing imaging for the image pickup means 202. The image pickup apparatus 200 may further includes a sound recording means and program storage means for storing programs written for sound recording. This causes no problem. In this case, when a program for imaging is read from the program storage means 50, a program for sound recording is also read at the same time. Both the programs are run by the information processing apparatus 300 so that both imaging and sound recording are carried out simultaneously. The same applies to the image pickup apparatus 400 and image pickup apparatus 500.

The operating and displaying facilities of the information processing apparatus 300 can be modified according to a mounted image pickup apparatus. A need for an image pickup apparatus having higher performance and better specifications can be satisfied merely by replacing an image pickup apparatus with a new one. Thus, imaging can be achieved without replacing the information processing apparatus 300. Even if an image pickup apparatus to be mounted differs from a previous one in terms of the lens zoom facility, flash, shutter, distance measurement/photometry facility, color reproducibility, resolution, dynamic range, photographic speed, storage capacity of the image memory 24, capability of the compression/extension circuit 22, capacity of a battery, the operating and displaying facilities of the information processing apparatus 300 should be modified merely by running a program stored in the program storage means and associated with the image pickup apparatus.

As easily understood from the above description, according to the present embodiment, an image pickup apparatus having an image pickup means and a program storage means is demountable from an information processing apparatus having operating means, display means, memory means, control means, and an image pickup apparatus detachment detecting means. This results in an image processing system offering excellent portability and enabling easy photography.

A facility for determining the contents of a display screen on display means according to the output of the image pickup apparatus detachment detecting means may be included in a system. This results in an image processing system offering excellent portability and enabling easy photography.

The output of the image pickup apparatus detachment detecting means is a signal indicating that the image pickup apparatus is unconnected. The facility for determining the contents of a display screen on the display means is a facility for disabling the display of an image currently being picked up by the image pickup means. This results in an image processing system offering excellent portability and enabling easy photography.

Photography can be enabled when an image pickup apparatus having an image pickup means and a program storage means is mounted on an information processing apparatus having an operating means, a display means, a memory means, and a control means. This results in an image processing system offering excellent portability and enabling easy photography.

While an image pickup means is executing photography, an output image of the image pickup means is displayed on the display means. When the image pickup means has stopped photography, an output image of the memory means is displayed on the display means. This results in an image processing system offering excellent portability and enabling easy photography.

While an image pickup means is executing photography, an output image of the image pickup means is displayed on the display means. When the image pickup means has stopped photography, an output image of the image pickup means and/or an output image of an image memory is displayed on the display means automatically or according to information entered at an operating means. This results in an image processing system offering excellent portability and enabling easy photography.

When an image pickup apparatus is mounted in an information processing apparatus, the facilities of the image pickup means employed for photography come out of the information processing apparatus. This results in an image processing system offering excellent portability and enabling easy photography.

According to this embodiment, a user-friendly image processing system can be provided.

Another embodiment of the present invention will be described with reference to the drawings.

Figures 15, 15A:
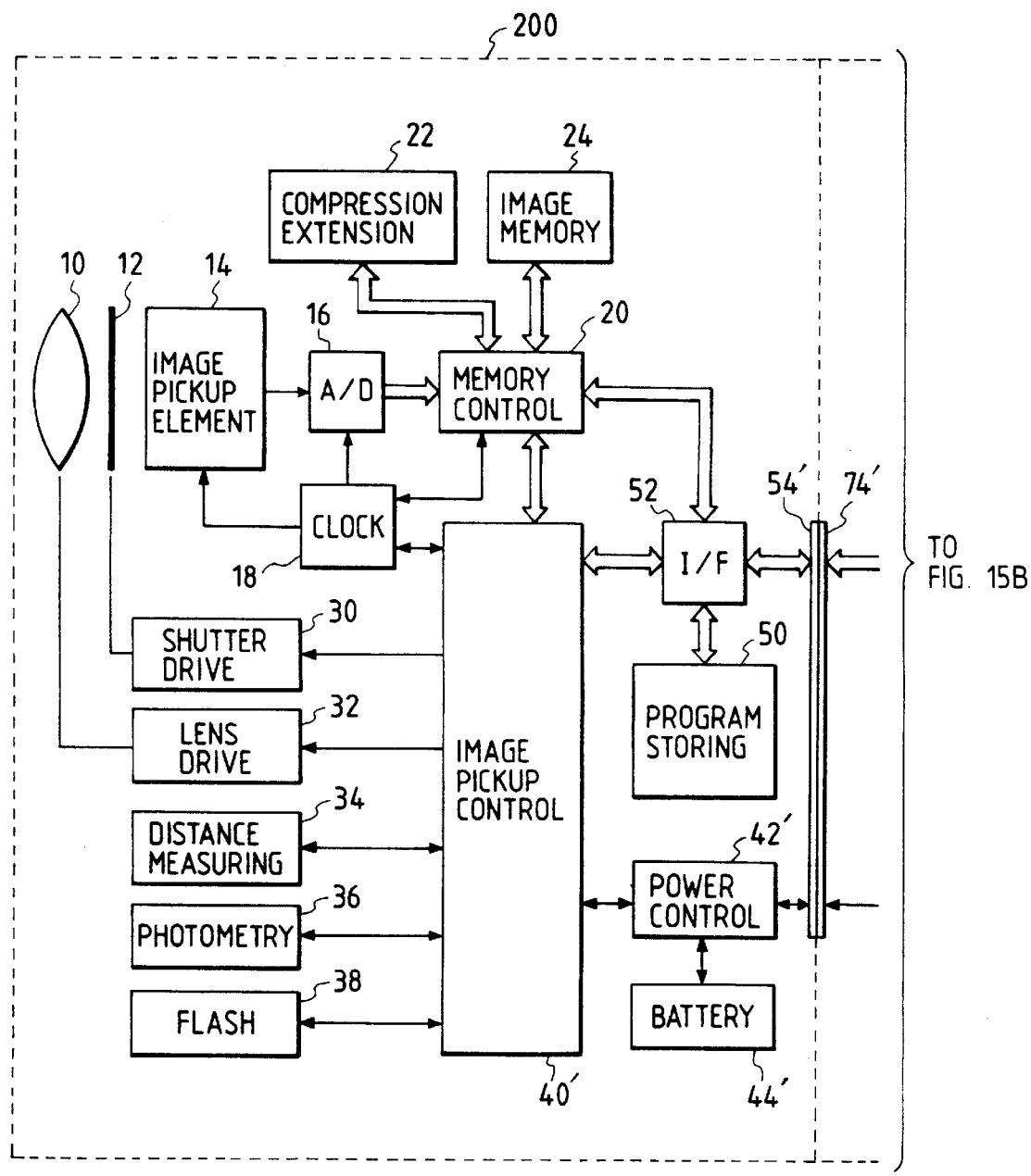
FIG. 15 is comprised of FIGS. 15A and 15B showing block diagrams of a configuration of the sixth embodiment of the present invention.
Figure 15B:
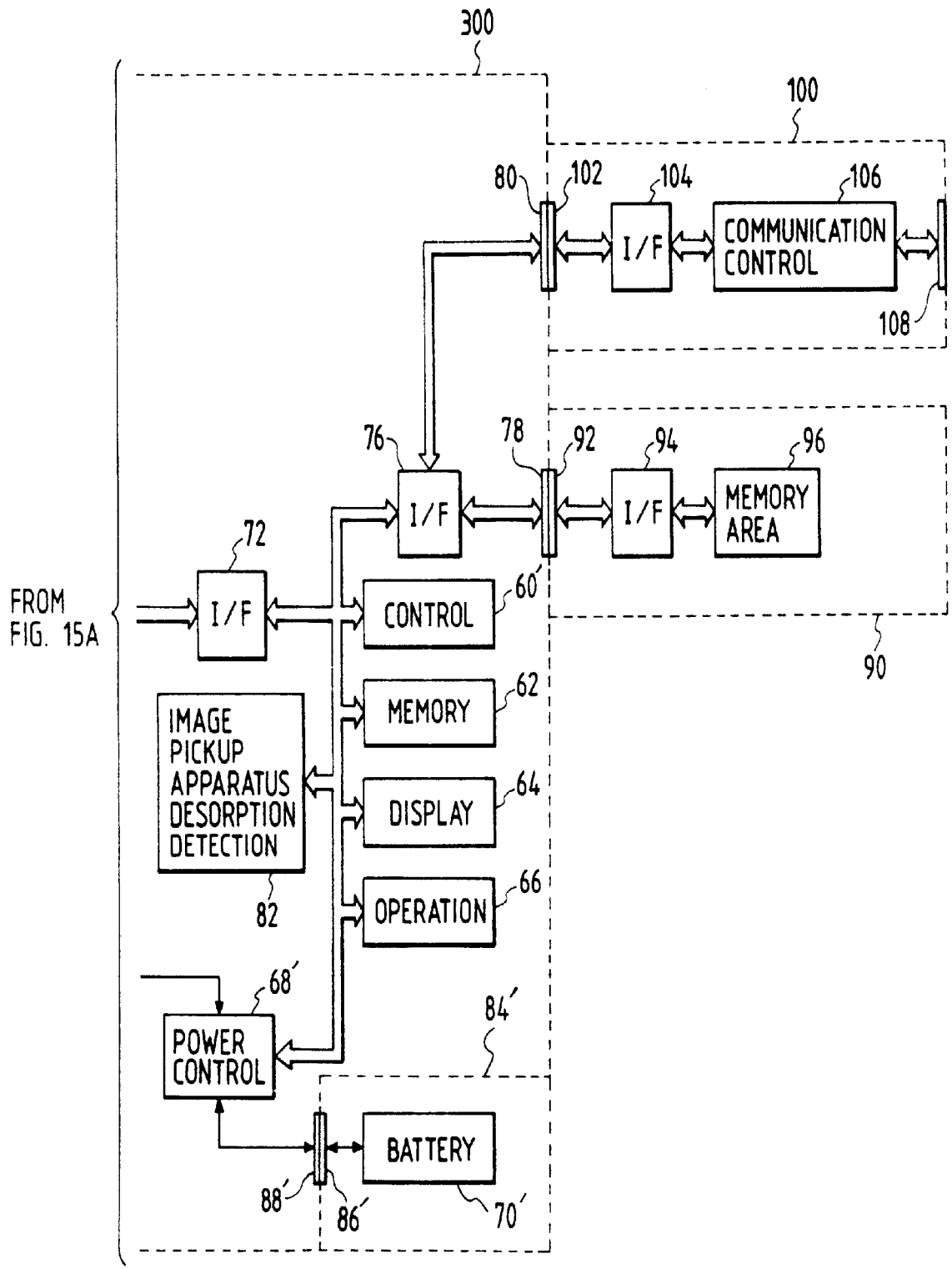

In FIGS. 15A and 15B, no mention will be made of component elements identical to those in FIGS. 1A and 1B.

Reference numeral 54' denotes a connector for use in transferring a data signal and a control signal to or from the information processing apparatus 300 and supplying power to the interface 52 and program storage means 50.

Reference numeral 42' denotes a power control circuit. 44' denotes a battery. The power control circuit 42' comprises a battery load detector, a battery voltage detector, a DC—DC converter, and a switch or the like for selecting a block to be energized. The power control circuit 42' detects the presence or absence of the battery 44', the type of the battery 44', and an amount of power remaining in the battery 44'. Based on the result of the detection and an instruction sent from an image pickup control circuit 40', the power control circuit 42' controls the DC—DC converter and supplies required voltages to the components of the image pickup apparatus 200 for a required time interval. The power control circuit 42' is connected to a power control circuit 68' in the information processing apparatus 300 via a connector 54' and a connector 74'. A control signal, various voltages, and various currents are transferred between the power control circuit 42' and the power control circuit 68'. The battery 44' is a chargeable secondary battery and charged with a current supplied by the information processing apparatus 300 via the connector 54'. On the contrary, the battery 44' may supply a current to the information processing apparatus via the connector 54'. The battery 44' is designed to cope with a peak current occurring in charging a flash 38' of the image pickup apparatus 200, and driving a motor for the shutter drive circuit 30 and lens drive circuit 32. The battery 44' may be a primary or secondary battery, or composed of primary and secondary batteries. The battery 44' may be provided in an exchangeable style, a style in which the battery 44' is fixed to the image pickup apparatus 200, or in a style in which part of the battery 44' is fixed and the remaining part thereof is exchangeable.

The image pickup control circuit 40' controls, similarly to the one in the previous embodiment, the lens array 10 by driving the focusing lens in the lens array 10 using the lens drive circuit 32 according to the result of measurement provided by the distance measuring circuit 34, thus bringing the lens array 10 into focus. Based on the result of photometry provided by the photometry circuit 36, the image pickup control circuit 40' determines a shutter speed or a time interval for keeping the shutter 13 open using the shutter drive circuit 30 so as to optimize an exposure value.

Reference numeral 84' denotes a detachable power supply. 68' denotes a power control circuit. 70' denotes a battery. The power control circuit 68' comprises a battery load detector, a battery voltage detector, a DC—DC converter, and a switch or the like for selecting a block to be energized. The power control circuit 68' detects the presence or absence of the power supply 84, the type of the battery 70', and an amount of power remaining in the battery 70'. Based on the result of detection and an instruction sent from a control means 60', the power control circuit 68' controls the DC—DC converter, and supplies required voltages to all components for a required time interval. The power control circuit 68' is connected to the power control circuit 42' in the image pickup apparatus 200 via the connectors 74' and 54'. A control signal, various voltages, and various currents are transferred between the power control circuit 68' and power control circuit 42'. 86 and 88 denote connectors for linking the power supply 84 and information processing apparatus 300 and for use in transferring a control signal and various voltages and currents.

Reference numeral 80 denotes a connector for use in transferring a data signal and a control signal to or from the communication means 100 and supplying power to the communication means 100.

Figure 16B:
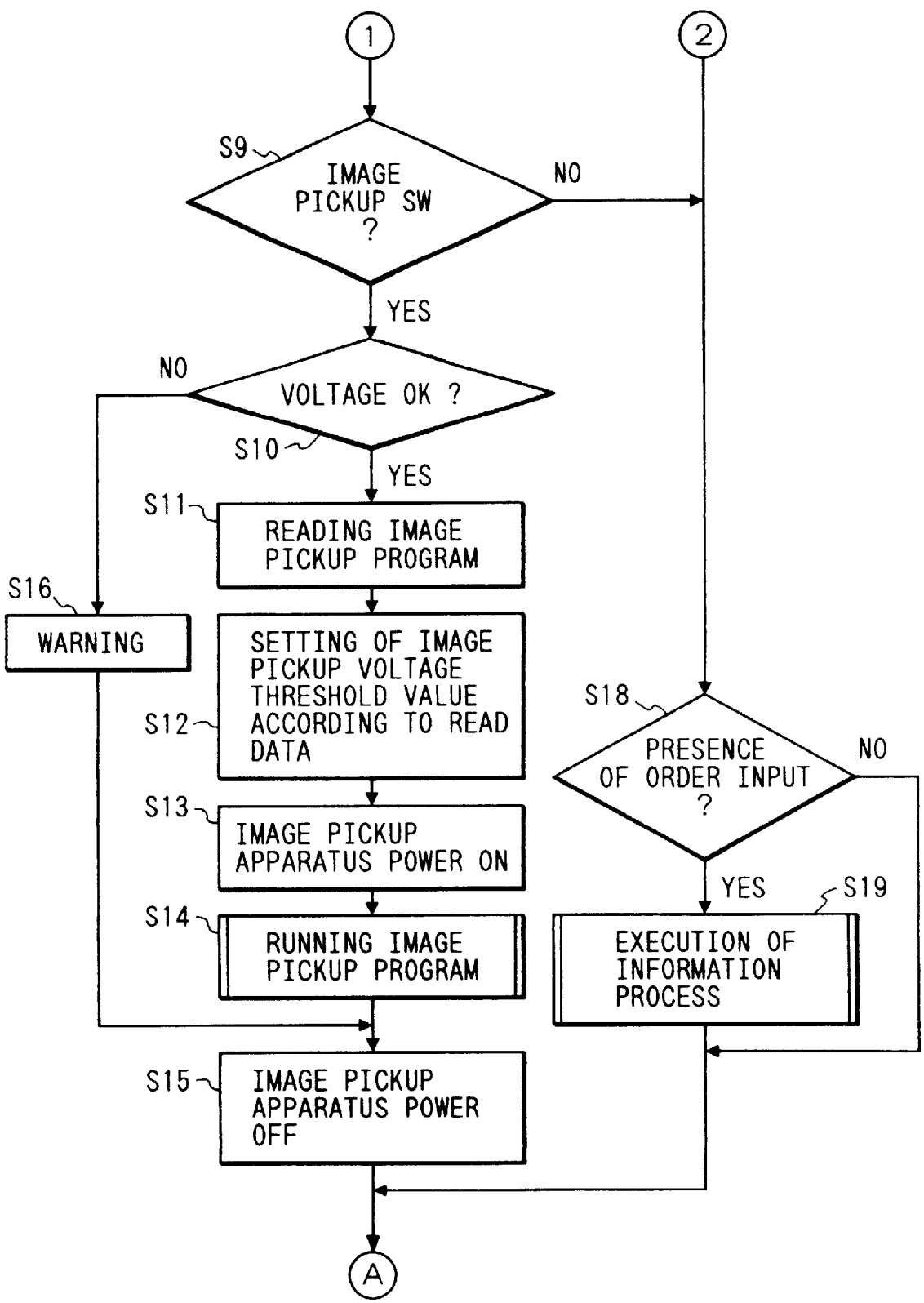
FIG. 16 is comprised of FIGS. 16A and 16B showing flowcharts of a main routine in the embodiment shown in FIGS. 15A and 15B.

Referring to FIGS. 16A, 16B, 17A, 17B and 18, the operation of the fifth embodiment will be described. FIGS. 16A and 16B are flowcharts of a main routine representing the operation of this embodiment.

When the power supply of the information processing apparatus 300 is turned on or a new battery is loaded in the information processing apparatus 300, the control means 60' resets flags and control variables, and runs a control program stored in an area of the memory means 62; such as, an operating system. The control means 60' also resets a threshold level for use in detecting a voltage (S1).

The control means 60' instructs the power control circuit 68' to determine whether the voltage of the power supply 84' is high enough for the information processing apparatus 300 to operate (S2). For voltage detection, the control means 60' may set a value as the threshold level used for voltage detection in the power control circuit 68, and check the result of detection provided by the power control circuit 68' to make determination. Alternatively, the control means 60' may compare the value of a voltage measured by the power control circuit 68' with the value of the threshold level.

When the voltage of the power supply 84' is high enough (S2), if the main switch in the operating means 66 is on (S3), the control means 60' places the power control circuit 68' in a power-on state (S4).

If the voltage of the power supply 84' is not high enough for the information processing apparatus 300 to operate (S2), the control means 60' displays a warning on the display means 64 (S5), executes the termination processing required for the components of the information processing apparatus 300, for example, quitting of the display screen on the display means 64, places the power control circuit 68' in a power-off state (S6), and then returns control to the step S2. If the main switch in the operating means 66 is off (S3), the control means 60' executes the termination processing required for the components of the information processing apparatus 300, for example, quitting of the display screen on the display means 64, places the power control circuit 68' in the power-off state (S6),.and then returns control to the step S2.

The control means 60' instructs the image pickup apparatus detachment detecting means 82 to determine whether the image pickup apparatus 200 is connected to the information processing apparatus 300 (S7). Depending on whether the image pickup apparatus 200 is connected or not, the threshold level used for voltage detection is set to a value for the image pickup mode (S8) or a value for the information processing mode (S17). The threshold level value is stored in the internal register of the control means 60 or part of the memory means 62.

When the image pickup apparatus is connected, the threshold level is set to a higher value than that when the image pickup apparatus is unconnected. This is because when the image pickup apparatus is connected, power may be supplied to the image pickup apparatus from the battery 70'. The threshold level is therefore set to a higher value.

When the imaging switch in the operating means 66 is off (S9) or the threshold level used for voltage detection is set to the value for the information processing mode (S17), the control means 60' produces a predetermined necessary display screen on the display means 64 using characters, numerals, and pictures such as an icon so as to receive information entered at the operating means 66.

When a command is entered at the operating means 66 (S18), the control means 60' executes predetermined processing associated with the command for the information processing apparatus 300 (S19). When the predetermined processing terminates, the control means 60' produces a predetermined necessary display screen on the display means 64 using characters, numerals, and pictures including an icon so as to receive information entered at the operating means 66. Control is then returned to the step S2.

When the imaging switch in the operating means 66 is on (S9), the control means 60' instructs the power control circuit 68' to determine whether the voltage of the power supply 84' is high enough for the information processing apparatus 300 and image pickup apparatus 200 to operate (S10).

If the voltage of the power supply 84' is not high enough for the information processing apparatus 300 and image pickup apparatus 200 to operate (S10), the control means 60' displays a warning on the display means 64 (S16), and then passes control to the step S15.

If the voltage of the power supply 84' is high enough for the information processing apparatus 300 and image pickup apparatus 200 to operate (S10), the control means 60 reads a program describing how to operate the image pickup apparatus 200 from the program storage means 50, and stores the program in an area of the memory means 62 via the interface 52, connector 64, connector 74, and interface 72 (S11).

The control means 60 sets a value as the threshold levels used for voltage detection in the power control circuit 42' according to the data inherent to the image pickup apparatus 200 read together with the program (S12). The threshold level is used to determine whether the voltage of the battery 44' is high enough for the image pickup apparatus 200 to operate in various image pickup modes. The threshold level is set to a plurality of values associated with the modes.

The control means 60' places the power control circuit 42' in the image pickup apparatus 200 in the power-on state (S13), reads a program describing how to operate the image pickup apparatus 200 from the memory means 62, and runs the program (S14). With the run of the program, the control means 60' produces a predetermined display screen necessary for imaging on the display means 64, sequentially actuates the components of the image pickup apparatus 200 according to commands entered at the operating means 66, and thus achieves imaging.

When all imaging operations are completed, the control means 60' terminates the execution of the image pickup mode, places the power control circuit 42' in the image pickup apparatus 200 in the power-off state (S15), produces a predetermined necessary display screen on the display means 64 using characters, numerals, and pictures including an icon so as to receive information entered at the operating means 66, and then returns control the step S2.

Figure 17B:
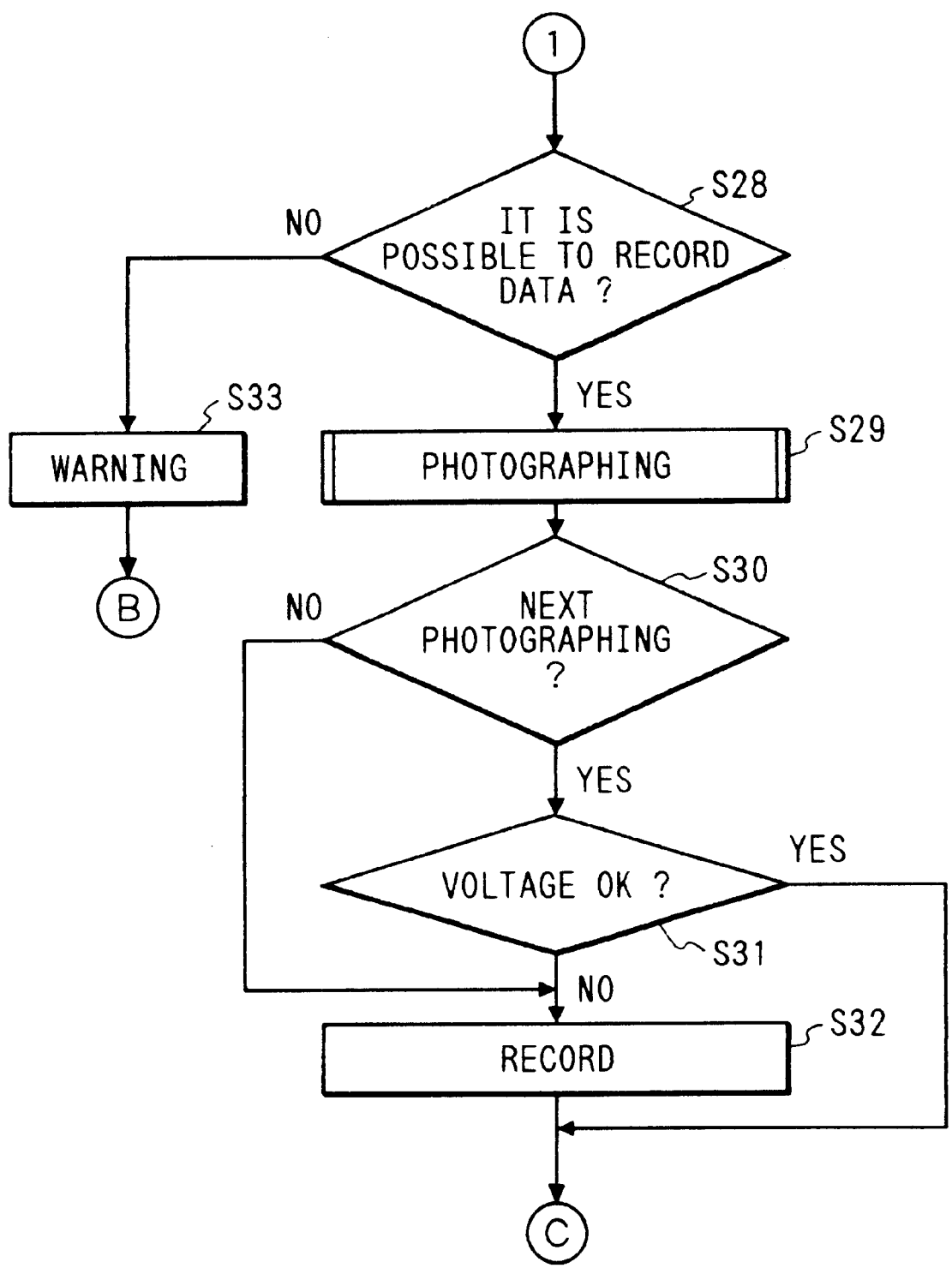
FIG. 17 is comprised of FIGS. 17A and 17B showing flowcharts of an imaging program running routine in this embodiment.

FIGS. 17A and 17B are detailed flowcharts of the imaging program to be run at the step S14 in FIGS. 16B. The description below will proceed on the assumption that a data signal and a control signal will be transferred between the control means 60' and image pickup control circuit 40' via the interface 72, connector 74', connector 54', and interface 52.

The control means 60' produces a predetermined display screen necessary for imaging on the display means 64, and instructs the image pickup control circuit 40 to execute predetermined necessary start processing, for example, start processing of initializing the components of the image pickup means 202 (S21).

In the "predetermined display screen necessary for imaging" produced on the display means 64, as mentioned previously, for example, an operation mode of the image pickup apparatus 200 such as a single photography mode, a continuous photography mode, a self-timer photography mode, information concerning distance measurement and photometry, an operating state of the flash 38, an amount of power remaining in the battery 44', a shutter speed, an f-number, an exposure correction value, a gain-up state for improving the sensitivity of the image pickup element, a use state of the image memory 24, an operating state of the compression/extension circuit 22, a recording state of the recording medium 90, the number of exposed frames, a storage capacity for exposed image data, the number of remaining frames, and a storage capacity for remaining image data are displayed using characters, numerals, and pictures including an icon. The facilities of the image pickup apparatus 200 may be displayed on the display means 64 as pictures showing a release button, an electronic dial, and a mode select dial in the operating unit of an ordinary camera. The pictures of the components of the operating unit of a camera displayed on the display means 64 may be selectively provided as information entered at the operating means 66 using a pointing device such as a pen, a mouse, a trackball, a touch-sensitive panel, or a line-of-sight sensor. The display means 64 includes a viewfinder in which a through-mode display screen showing signals sent from the image pickup element continuously and a monitor-mode display screen showing an image pickup or recorded are displayed side by side or alternately. Owing to these facilities, the information processing apparatus 300 can be handled to achieve photography in the same manner as a camera without unnaturalness.

When the imaging switch in the operating means 66 is off (S22), the control means 60' instructs the image pickup control circuit 40' to execute the predetermined termination processing necessary for the image pickup apparatus 200 (S35), quits the imaging and viewfinder display screens on the display means 64, and terminates the run of the imaging program (S14).

When the imaging switch in the operating means is on (S22), the control means 60' instructs the image pickup control circuit 40' to execute voltage detection. The image pickup control circuit 40 instructs the power control circuit 42' to check if the voltage of the battery 44' is high enough for the image pickup apparatus 200 to operate, and informs the control means 60' of the finding (S23). In the voltage detection at the step S23, it must be determined whether the voltage is high enough for distance measurement and photometry which will be described later (S25).

If the power control circuit 42' detects that the voltage of the battery 44' is not high enough for the image pickup apparatus 200 to operate (S23), the control means 60' displays a warning on the display means 64 (S34), instructs the image pickup control circuit 40' to execute the predetermined termination processing necessary for the image pickup apparatus 200 (S35), quits the imaging and viewfinder display screens on the display means 64, and terminates the run of the imaging program (S14).

When the voltage of the battery 44' is high enough for the image pickup apparatus 200 to operate (S23), if the distance measurement/photometry switch (SW1) is turned on using the operating means 66 (S24), the control means 60' instructs the image pickup control circuit 40' to execute distance measurement and photometry. The image pickup control circuit 40' allows the distance measuring circuit 34 and photometry circuit 36 to execute distance measurement and photometry, focuses the lens array 10 at an object, and determines a shutter speed (S25). The distance measurement and photometry are identical to those described in detail previously.

The control means 60' repeats the distance measurement and photometry (S25) until the distance measurement/ photometry switch (SW1) is turned on using the operating means 66, the voltage of the battery 44' is high enough for the image pickup apparatus 200 to operate (S26), and then the imaging switch (SW2) is turned on using the operating means 66 (S27). In the voltage detection at the step S26, it must be checked if the voltage of the battery 44' is high enough for photography which will be described later (S29). The voltage detection at the step S26 is achieved when the control means 60' instructs the image pickup control circuit 40' to execute voltage detection, and the image pickup control circuit 40' instructs the power control circuit 42' to check if the voltage of the battery 44' is high enough for the image pickup apparatus 200 to operate and informs the control means 60' of the finding.

If the voltage of the battery 44' is not high enough for the image pickup apparatus 200 to operate (S26), the control means 60' displays a warning on the display means 64 (S34), instructs the image pickup control circuit 40' to execute the predetermined termination processing necessary for the image pickup apparatus 200 (S35), quits the imaging and viewfinder display screens on the display means 64, and terminates the run of the imaging program (S14).

When the voltage of the battery 44' is high enough for the image pickup apparatus 200 to operate (S26), if the imaging switch (SW2) is turned on using the operating means 66 (S27), the control means 60' determines whether the image data acquired by the image pickup apparatus 200 can be recorded in the memory means 62 or recording medium 90 (S28). If recording cannot be done because a recordable empty area is unavailable or the recording medium is disconnected, the control means 60 displays a warning on the display means 64 (S33) and waits until the imaging switch in the operating means 66 is pressed (S22).

If a recordable area is available (S28), the control means 60' instructs the image pickup control circuit 40' to execute photography. The image pickup control circuit 40' executes photography and writes image data in the image memory 24 (S29). The photography will be described in detail later.

When the next photography is executed soon (S30), if the voltage of the battery 44' is high enough for the image pickup apparatus 200 to operate (S31), control is returned to the step S26. The aforesaid processing is repeated. In the voltage detection at the step S31, it must be determined at least whether the voltage of the battery 44' is high enough for recording which will be described later (S32). The voltage detection at the step S31 is achieved when the control means 60' instructs the image pickup control circuit 40' to execute voltage detection, and the image pickup control circuit 40' instructs the power control circuit 42' to check if the voltage of the battery 44' is high enough for the image pickup apparatus 200 to operate and informs the control means 60' of the finding.

When continuous photography is not executed or the next photography is not performed soon because the image memory 24 is full (S30), or when the voltage of the battery 44' is not high enough for the image pickup apparatus 200 to operate (S31), the control means 60' instructs the image pickup control circuit 40' to execute recording. The image pickup control circuit 40' reads image data from the image memory 24, and sends the image data to the information processing apparatus 300 via the memory control circuit 20, interface 52, and connector 54. The control means 60' writes the received image data in the memory means 62 via the connector 74 and interface 72. The control means 60' may also write the received image data in the recording medium 90 via the interface 76 and connector 78 (S32). Control is then returned to the step S26.

After the distance measurement/photometry switch (SW1) is turned off using the operating means 66, the control means 60' waits until the imaging switch in the operating means 66 is pressed (S22).

The sequences of distance measurement and photometry to be executed in the step S25 in FIG. 17B are identical to those described in detail in conjunction with FIGS. 4 and 5.

Figure 18:
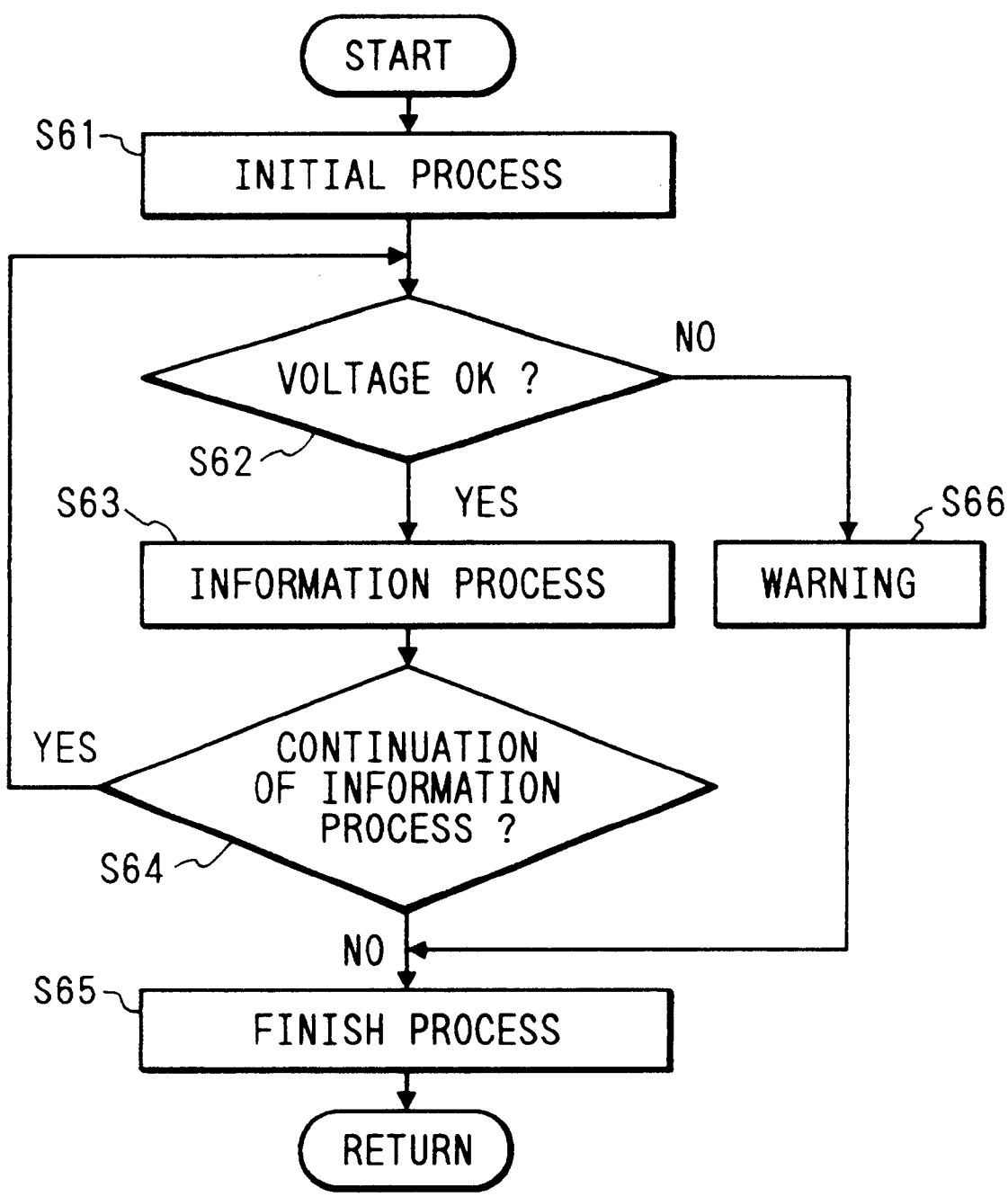
FIG. 18 is a flowchart of an information processing execution routine in this embodiment.

FIG. 18 is a detailed flowchart of information processing to be executed at the step S19 in FIG. 16B.

The control means 60' executes predetermined start processing required for executing instructed information processing; such as, initialization (S61), and instructs the power control circuit 68' to determine whether the voltage of the power supply 84' is high enough for the information processing apparatus 300 to execute information processing (S62). For detection of a voltage, the control means 60' may set a value as a threshold level used for voltage detection in the power control circuit 68', and check the result of the voltage detection to made determination. Alternatively, the control means 60' may compare the value of a voltage measured by the power control circuit 68' with the value of the threshold level.

If the voltage of the power supply 84' is not high enough to execute the instructed information processing (S62), the control means 60' displays a warning on the display means 64 (S66), executes the termination processing required for the components of the information processing apparatus 300, for example, quitting of the display screen on the display means 64 (S65), and then terminates the execution of the information processing (S19).

If the voltage of the power supply 84' is high enough to execute the instructed information processing (S62), the control means 60' executes the instructed information processing (S63). When the information processing is executed continuously (S64), control is returned to the step S62.

If the information processing is discontinued (S64), the control means 60' executes the termination processing required for the components of the information processing apparatus 300, for example, quitting of the display screen on the display means 64 (S65), and then terminates the execution of the information processing (S19).

Another Embodiment

The sixth embodiment of the present invention will be described below.

Figure 19:
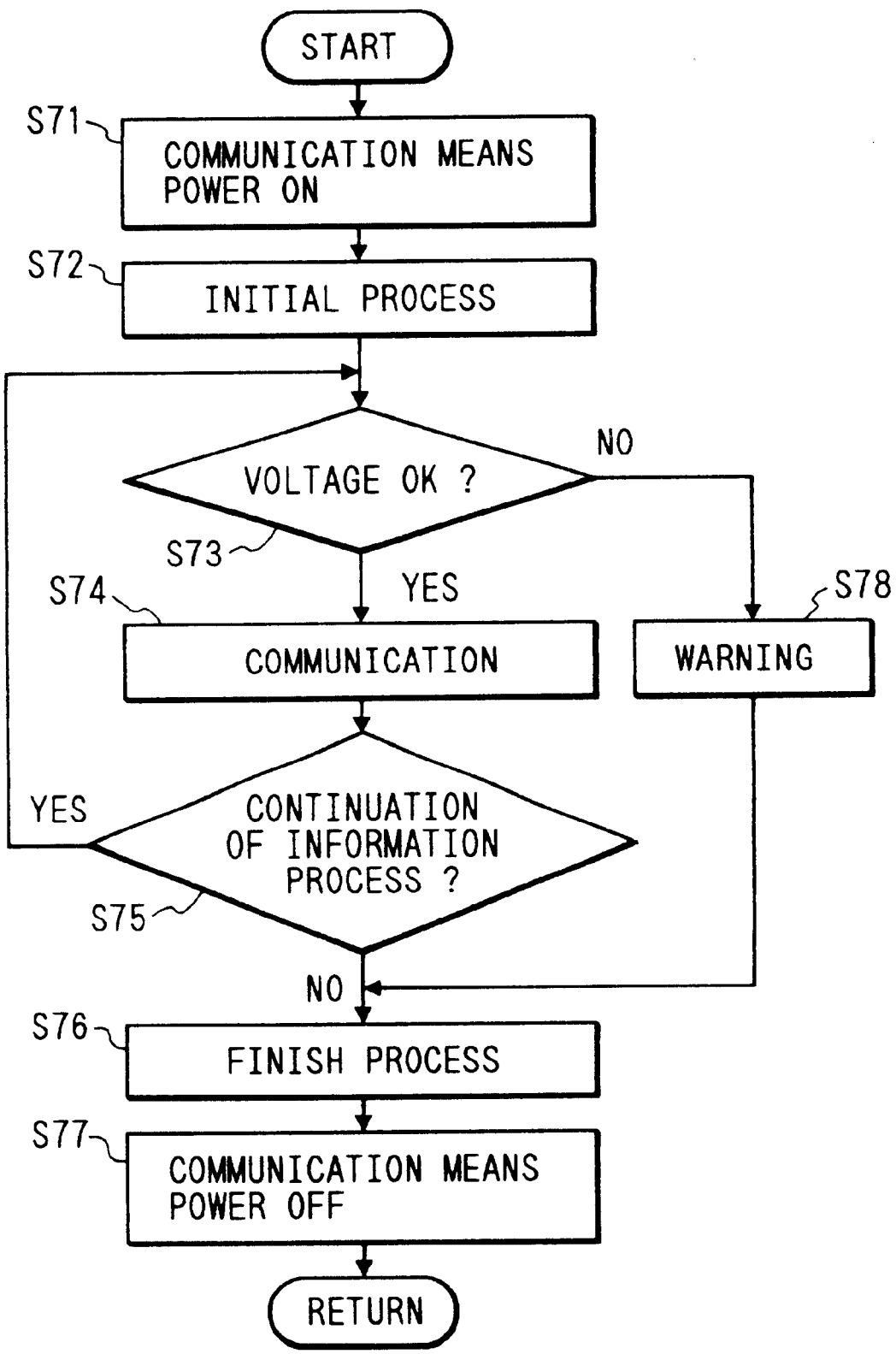
FIG. 19 is a flowchart of a communication processing execution routine in this embodiment.
Figure 20B:
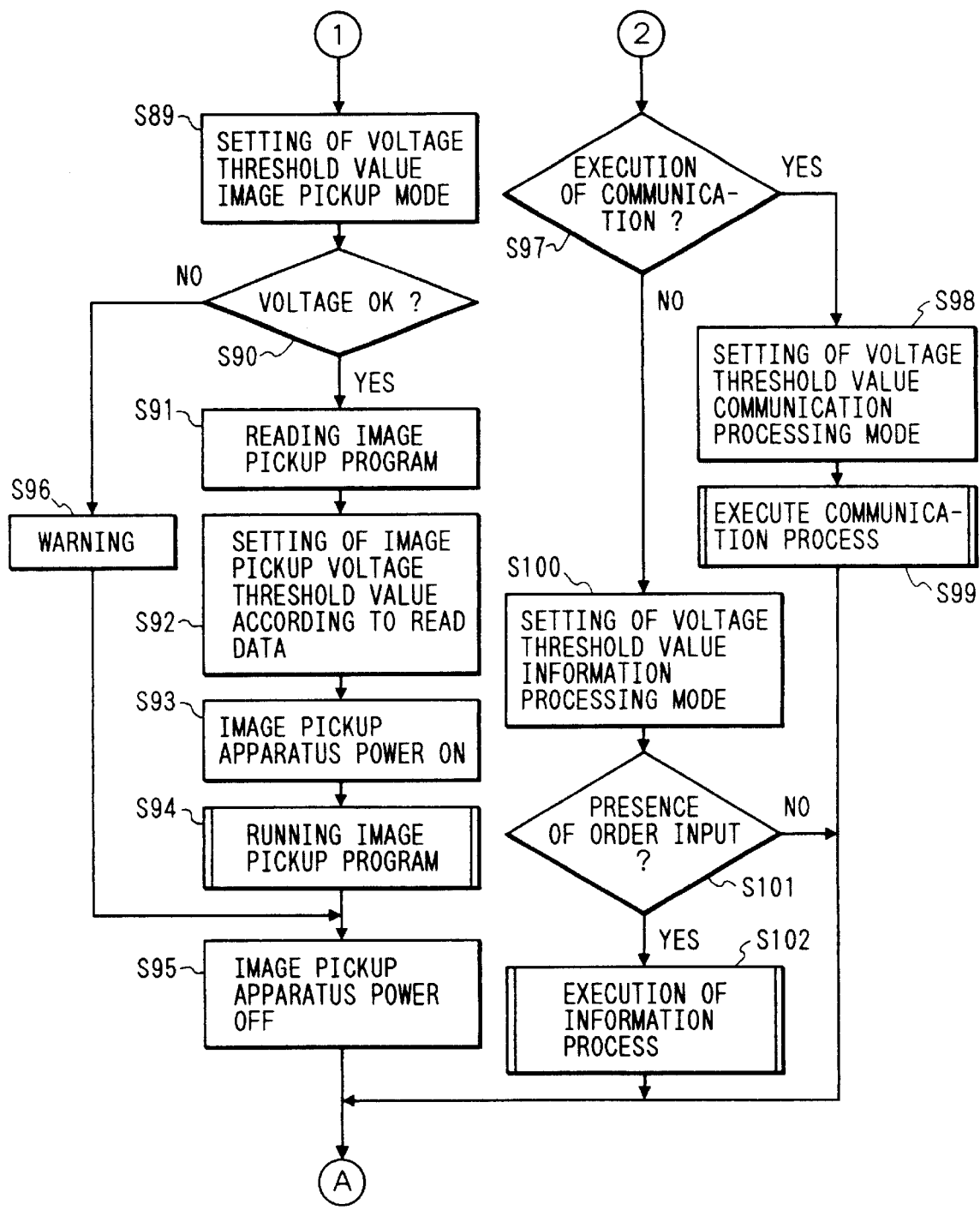
FIG. 20 is comprised of FIGS. 20A and 20B showing flowcharts of a main routine in another embodiment.

Referring to FIGS. 19, 20A and 20B, the operation of the sixth embodiment will be described. FIGS. 20A and 20B are a flowchart of a main routine in the sixth embodiment.

In FIGS. 20A and 20B, when the power supply of the information processing apparatus 300 is turned on or a new battery is loaded in the information processing apparatus 300, the control means 60' resets flags and control variables, runs a control program stored in an area of the memory means 62; such as, an operating system, and resets a threshold level (S81).

The control means 60' instructs the power control circuit 68' to determine whether the voltage of the power supply 84' is high enough for the information processing apparatus 300 to operate (S82). For detection of a voltage, the control means 60' may set a value as the threshold level used for voltage detection in the power control circuit 68' and check the result of the voltage detection provided by the power control circuit 68' to make determination. Alternatively, the control means 60' may compare the value of a voltage measured by the power control circuit 68 with the value of the threshold level.

When the voltage of the power supply 84' is high enough (S82), if the main switch in the operating means 66 is on (S83), the control means 60' places the power control circuit 68' in a power-on state (S84).

If the voltage of the power supply 84' is not high enough for the information processing apparatus 300 to operate (S82), the control means 60' displays a warning on the display means 64 (S85), executes the termination processing required for the components of the information processing apparatus 300, for example, quitting of the display screen on the display means 64, places the power control circuit 68 in a power-off state (S86), and then returns control to the step S82. When the main switch in the operating means 66 is off (S83), the control means 60' executes the termination processing required for the components of the information processing apparatus 300, for example, quitting of the display screen on the display means 64, places the power control circuit 68 in the power-off state (S86), and then returns control to the step S82.

When the image pickup apparatus detachment detecting means determines that the image pickup apparatus 200 is connected to the information processing apparatus 300 (S87), if the imaging switch in the operating means 66 is on (S88), the control means 60' sets the threshold level used for voltage detection to a value for an imaging mode (S89). The threshold level value is stored in the internal register of the control means 60' or part of the memory means 62.

When the image pickup apparatus detachment detecting means 82 determines that the image pickup apparatus 200 is not connected to the information processing apparatus 300 (S87) or the imaging switch in the operating means is off (S88), the control means 60' produces a predetermined necessary display screen on the display means 64 using characters, numerals, and pictures including an icon so as to receive information entered at the operating means 66.

When a communication switch is turned on using the operating means 66 (S97), the control means 60' sets the threshold level used for voltage detection to a value for a communication mode (S98), and executes predetermined communication processing for the information processing apparatus 300 (S99). When the predetermined communication processing terminates, the control means 60' produces a predetermined necessary display screen on the display means 64 using characters, numerals, and pictures including an icon so as to receive information entered at the operating means 66, and then returns control to the step S82. The communication processing will be described in detail later.

When the communication switch is not turned on using the operating means 66 (S97), the control means 60' sets the threshold level for voltage detection to a value for an information processing mode (S100). When a command is entered at the operating means 66 (S101), the predetermined processing associated with the command is executed for the information processing apparatus 300 (S102). When the predetermined processing terminates, a predetermined necessary display screen is produced on the display means 64 using characters, numerals, and pictures including an icon so that information entered at the operating means 66 can be received. Control is then returned to the step S82.

When the threshold level for voltage detection is set to the value for the imaging mode (S89), the control means 60' instructs the power control circuit 68' to determine whether the voltage of the power supply 84' is high enough for the information processing apparatus 300 and image pickup apparatus 200 to operate (S90)

If the voltage of the power supply 84' is not high enough for the information processing apparatus 300 and image pickup apparatus 200 to operate (S90), a warning is displayed on the display means 64 (S96) and control is passed to the step S95. The control means 60' then reads a program describing how to operate the image pickup apparatus 200 from the program storage means 50, and stores the program in an area of the memory means 62 via the interface 52, connector 54, connector 74, and interface 72 (S91).

The control means 60' sets a value as the threshold level for voltage detection in the power control circuit 42' according to the data inherent to the image pickup apparatus 200 read together with the program (S92). The threshold level is used to determine whether the voltage of the battery 44' is high enough for image pickup apparatus 200 to operate in various modes. The threshold level is therefore set to a plurality of values associated with the modes.

The control means 60' places the power control circuit 42' in the image pickup apparatus 200 in the power-on state (S93), reads the program describing how to operate the image pickup apparatus 200 from the memory means 62, and runs the program (S94). With the run of the program, the control means 60' produces a predetermined display screen necessary for imaging on the display means 64, sequentially actuates the components of the image pickup apparatus 200 according to commands entered at the operating means 66, and thus achieves imaging.

When all the image pickup operations are completed, the control means 60' terminates the execution of the image pickup mode, places the power control circuit 42' in the image pickup apparatus 200 in the power-off state (S95), produces a predetermined necessary display screen on the display means 64 using characters, numerals, and pictures including an icon so as to receive information entered at the operating means 66, and then returns control to the step S82.

The sequences of the image pickup programs to be run at the step S94 in FIG. 20B, the communication processing to be executed at the step S99, and the information processing to be executed at the step S102 are identical to those in the first embodiment described in conjunction with FIGS. 17A, 17B and 18, of which description will therefore be omitted.

FIG. 19 is a detailed flowchart of the communication processing to be executed at the step S99 in FIG. 20B.

The control means 60' places the power control circuit 68' in a communication power-on state to supply required voltages and currents to the communication means 100 (S71).

The control means 60' executes predetermined start processing required to execute communication processing; such as, initialization (S72), and instructs the power control circuit 68' to determine whether the voltage of the power supply 84' is high enough for the information processing apparatus 300 to execute the communication processing (S73). For detection of a voltage, the control means 60' may set a value as a threshold level used for voltage detection in the power control circuit 68' and check the result of the voltage detection provided by the power control circuit 68 to made determination. Alternatively, the control means 60' may compare the value of a voltage measured by the power control circuit 68' with the value of the threshold level.

If the voltage of the power supply 84' is not high enough to execute communication processing (S73), the control means 60' displays a warning on the display means 64 (S78), executes the termination processing required for the components of the information processing apparatus 300; such as, quitting of the display screen on the display means 64 (S77), and then terminates the execution of the communication processing (S99).

If the voltage of the power supply 84' is high enough to execute communication processing (S73), the control means 60' executes the communication processing (S74). For continuous execution of the communication processing (S75), control is returned to the step S73.

When the communication processing is discontinued (S75), the control means 60' executes the termination processing required for the components of the information processing apparatus 300; such as, quitting of the display screen on the display means 64, places the power control circuit 68' in a communication power-off state to stop the supply of voltages and currents to the communication means 100 (S77), and terminates the execution of the communication processing (S99).

The third embodiment of the present invention will be described below.

Figure 21:
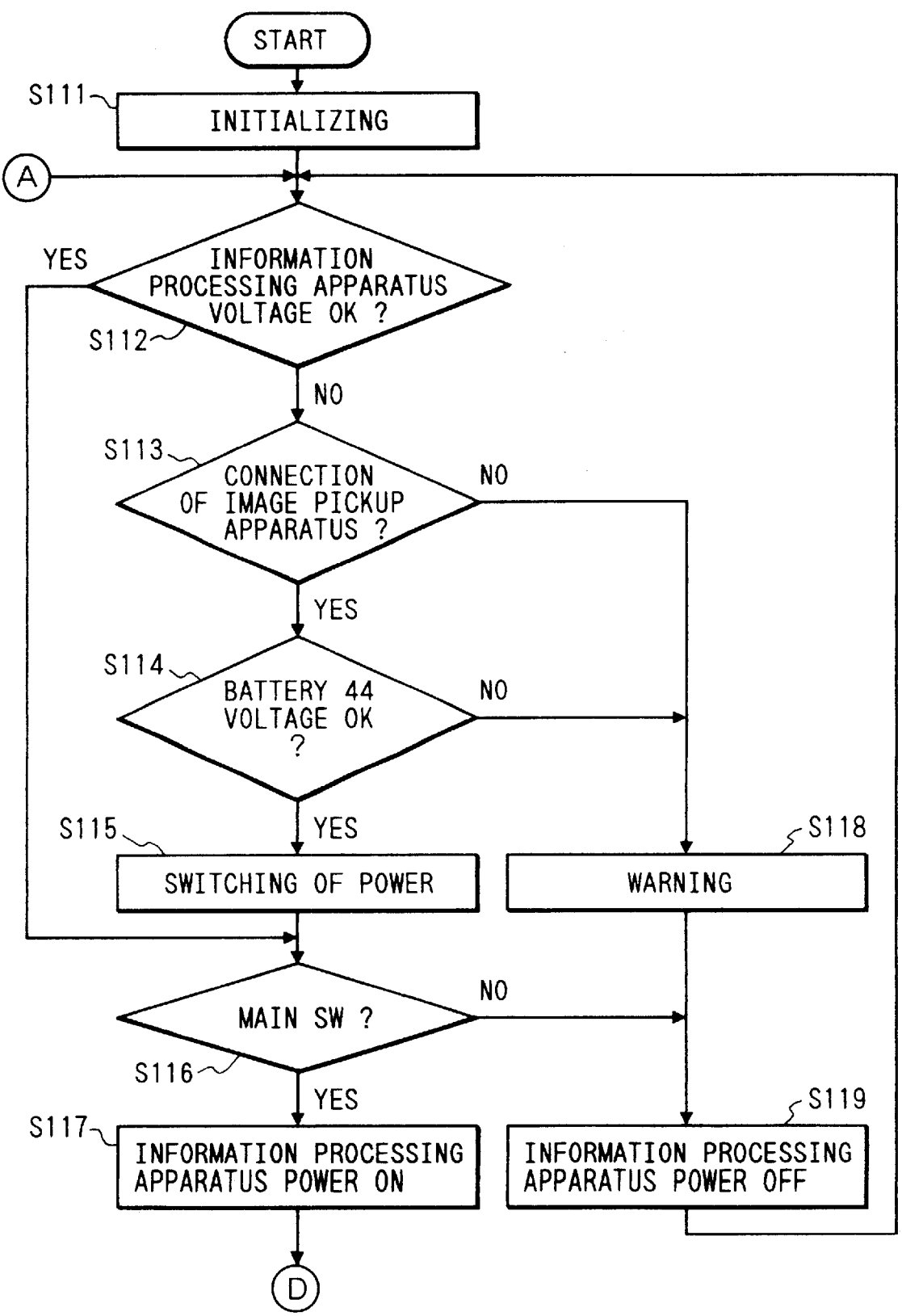
FIG. 21 is a part of the flowchart of the main routine in another embodiment.
Figure 22:
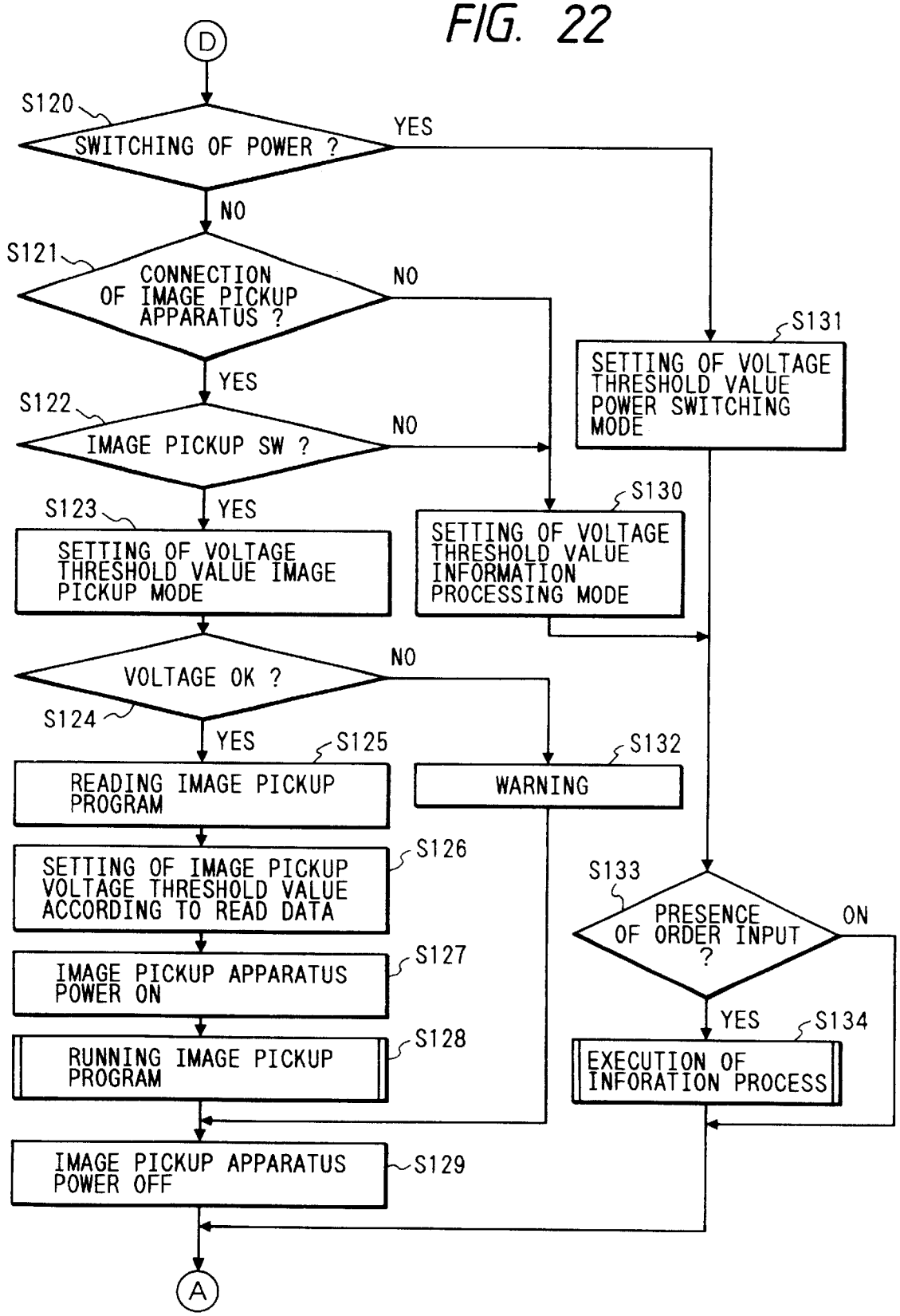
FIG. 22 is a part of the flowchart of the main routine in another embodiment.

Referring to FIGS. 21 and 22, the operation of the seventh embodiment will be described. FIGS. 21 and 22 are flowcharts of a main routine in the seventh embodiment.

When the power supply of the information processing apparatus 300 is turned on or a new battery is loaded in the information processing apparatus 300, the control means 60' resets flags and control variables, and runs a control program stored in an area of the memory means 62; such as, an operating program. The control means 60' resets a threshold level used for voltage detection (S111).

The control means 60' instructs the power control circuit 68' to determine whether the voltage of the power supply 84' is high enough for the information processing apparatus 300 to operate (S112). For detection of a voltage, the control means 60' may set a value as a threshold level for voltage detection in the power control circuit 68' and check the result of detection provided by the power control circuit 68' to make determination. Alternatively, the control means 60' may compare the value of a voltage measured by the power control circuit 68' with the value of the threshold level.

If the voltage of the power supply 84' is high enough for the information processing apparatus 300 to operate (S112), control is passed to a step S116.

If the voltage of the power supply 84' is not high enough for the information processing apparatus 300 to operate (S112), the control means 60' instructs the image pickup apparatus detachment detecting means 82 to determine whether the image pickup apparatus 200 is connected to the information processing apparatus 300 (S113). If it is determined that the image pickup apparatus 200 is connected to the information processing apparatus 300, the power control circuit 42' detects the voltage of the battery 44' in the image pickup apparatus.200 (S114).

If the voltage of the battery 44' is high enough for the information processing apparatus 300 to operate (S114), the control means 60 switches power supplies to select the battery 44 so that required voltages and currents are supplied to the components of the information processing apparatus 300 via the power control circuit 42, connector 54, connector 74, and power control circuit 68' (S115).

If the image pickup apparatus 200 is not connected to the information processing apparatus 300 (S113) or the voltage of the battery 44' is not high enough for the information processing apparatus 300 to operate (S114), the control means 60' displays a warning on the display means 64 (S115), executes the termination processing required for the components of the information processing apparatus 300, for example, quitting of the display screen on the display means 64, places the power control circuits 68' and 42' in the power-off state (S119), and then returns control to the step S112.

If the voltage of the power supply 84' is high enough (S112) or power supplies are switched (S115), the control means 60' waits until the main switch in the operating means 66 is pressed (S116).

When the main switch in the operating means 66 is on (S116), the control means 60' places the power control circuit 68' in the power-on state (S117). On the contrary, when the main switch in the operating means 66 is off (S116), the control means 60' places the power control circuit 68' in the power-off state (S119) and returns control to the step S112.

In the sequence of FIG. 22, when the voltage of the power supply 84' is high enough if it is determined that power supplies are not switched to select the power supply 84' to the battery 44' (S120), the control means 60' instructs the image pickup apparatus detachment detecting means 82 to determine whether the image pickup apparatus 200 is connected to the information processing apparatus 300 (S121).

When the image pickup apparatus detachment detecting means 82 determines that the image pickup apparatus 200 is connected to the information processing apparatus 300 (S121), if the imaging switch in the operating means 66 is on (S122), the control means 60' sets the threshold level for voltage detection to a value for an imaging mode (S123).

When the image pickup apparatus detachment detecting means 82 determines that the image pickup apparatus 200 is not connected to the information processing apparatus 300 (S121), or when the imaging switch in the operating means 66 is off (S122), the control means 60' sets the threshold level for voltage detection to a value for an information processing mode (S130).

When the voltage of the power supply 84' is not high enough, if it is determined that power supplies have been switched to select the battery 44' (S120), the control means 60' sets the threshold level for voltage detection to a value for a power supply switching mode (S131).

The threshold level values are stored in the internal register of the control means 60' or part of the memory means 62.

When setting the threshold level for voltage detection to the value for the information processing mode (S130) or the power supply switching mode (S131), the control means 60' produces a predetermined necessary display screen on the display means 64 using characters, numerals, and pictures including an icon so as to receive information entered at the operating means-66. When a command is entered at the operating means 66 (S133), the control means 60' executes the predetermined processing associated with the command for the information processing apparatus 300 (S134). When the predetermined processing terminates, the control means 60' produces a predetermined necessary display screen on the display means 64 using characters, numerals, and pictures including an icon so as to receive information entered at the operating means 66, and then returns control to the step S112.

When the threshold level for voltage detection is set to the value for the imaging mode (S123), the control means 60' instructs the power control circuit 68' to determine whether the voltage of the power supply 84' is high enough for the information processing apparatus 300 and image pickup apparatus 200 to operate (S124).

If the voltage of the power supply 84' is not high enough for the information processing apparatus 300 or image pickup apparatus 200 to operate (S124), a warning is displayed on the display means 64 (S132) and control is passed to the step S129. The control means 60' then reads a program describing how to operate the image pickup apparatus 200 from the program storage means 50, and stores the program in an area of the memory means 62 via the interface 52, connector 54, connector 74, and interface 72 (S125).

Based on the data inherent to the image pickup apparatus 200 read together with the program, the control means 60' sets a value as the threshold level for voltage detection in the power control circuit 42' (S126). The threshold level is used to determine whether the voltage of the power supply 44 is high enough for the image pickup apparatus 200 to operate in various modes. The threshold level is therefore set to a plurality of values associated with the modes.

The control means 60' places the power control circuit 42' in the image pickup apparatus 200 to the power-on state (S127), reads a program describing how to operate the image pickup apparatus 200 from the memory means 62, and runs the program (S128). With the run of the program, the control means 60' produces a predetermined display screen necessary for imaging on the display means 64, sequentially actuates the components of the image pickup apparatus 200 according to the commmands entered at the operating means 66, and thus achieves imaging.

When all the image pickup operations are completed, the control means 60' terminates the execution of the imaging mode, places the power control circuit 42' in the image pickup apparatus 200 in the power-off state (S129), produces a predetermined necessary display screen on the display means 64 using characters, numerals, and pictures including an icon so as to receive information entered at the operating means 66, and returns control to the step S112.

The sequences of the image pickup program to be run at the step S128 in FIG. 10B and the information processing to be executed at the step S134 are identical to those in the first embodiment described in conjunction with the flowcharts of FIGS. 3A, 3B, 6A and 6B, of which description will therefore be omitted.

Another embodiment of the present invention will be described with reference to the drawings.

Figure 23B:
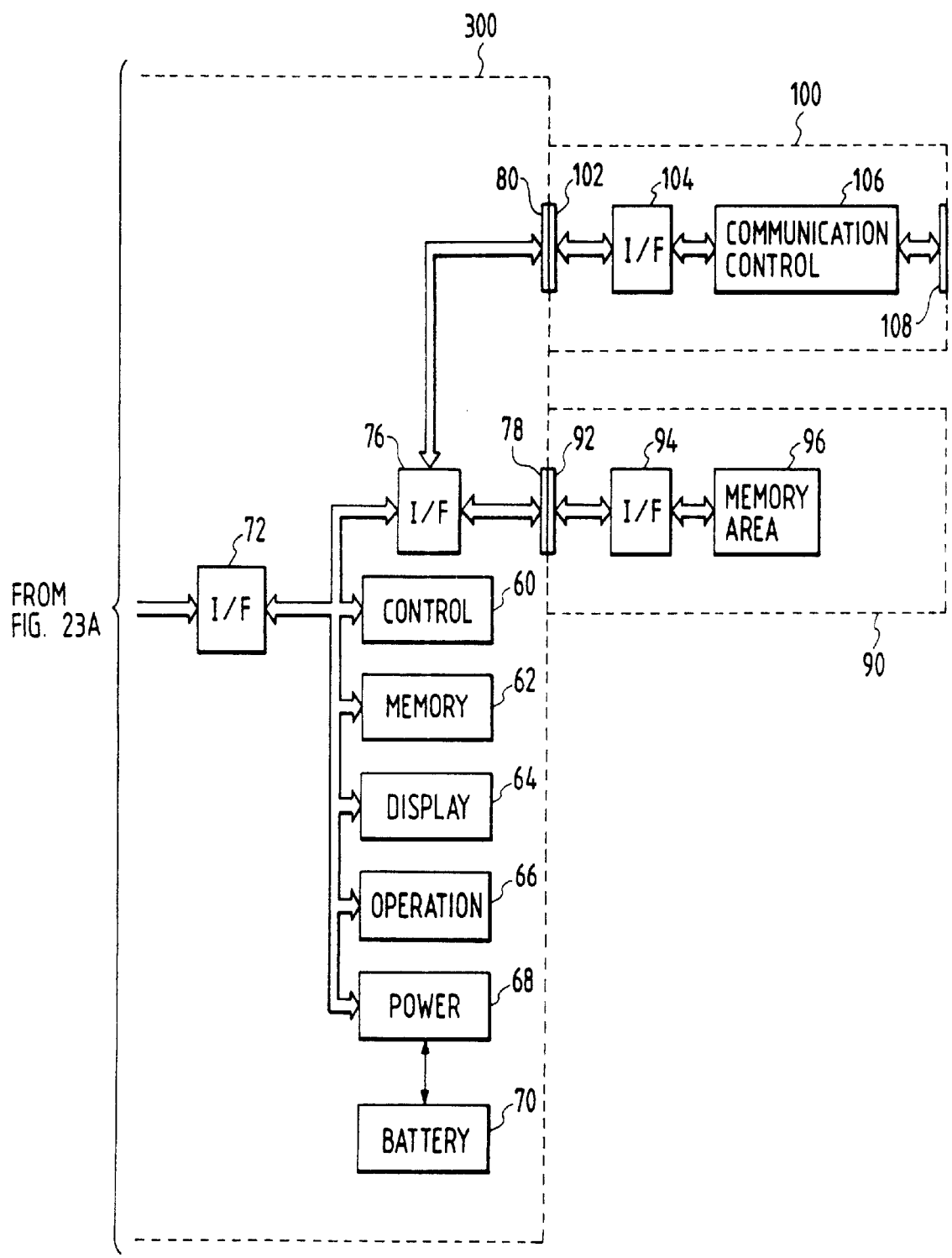
FIG. 23 is comprised of FIGS. 23A and 23B showing block diagrams of a configuration of another embodiment of the present invention.

In FIGS. 23A and 23B, component elements having the same capabilities as those in FIGS. 1A and 1B are assigned the same reference numerals. The description will be omitted.

The configuration in FIGS. 23A and 23B differs from that in FIGS. 1A and 1B in a point that the image pickup apparatus detachment detecting circuit 82 is excluded.

The operation of the embodiment having the configuration shown in FIGS. 23A and 23B will be described in conjunction with FIGS. 24 and later.

Figure 24:
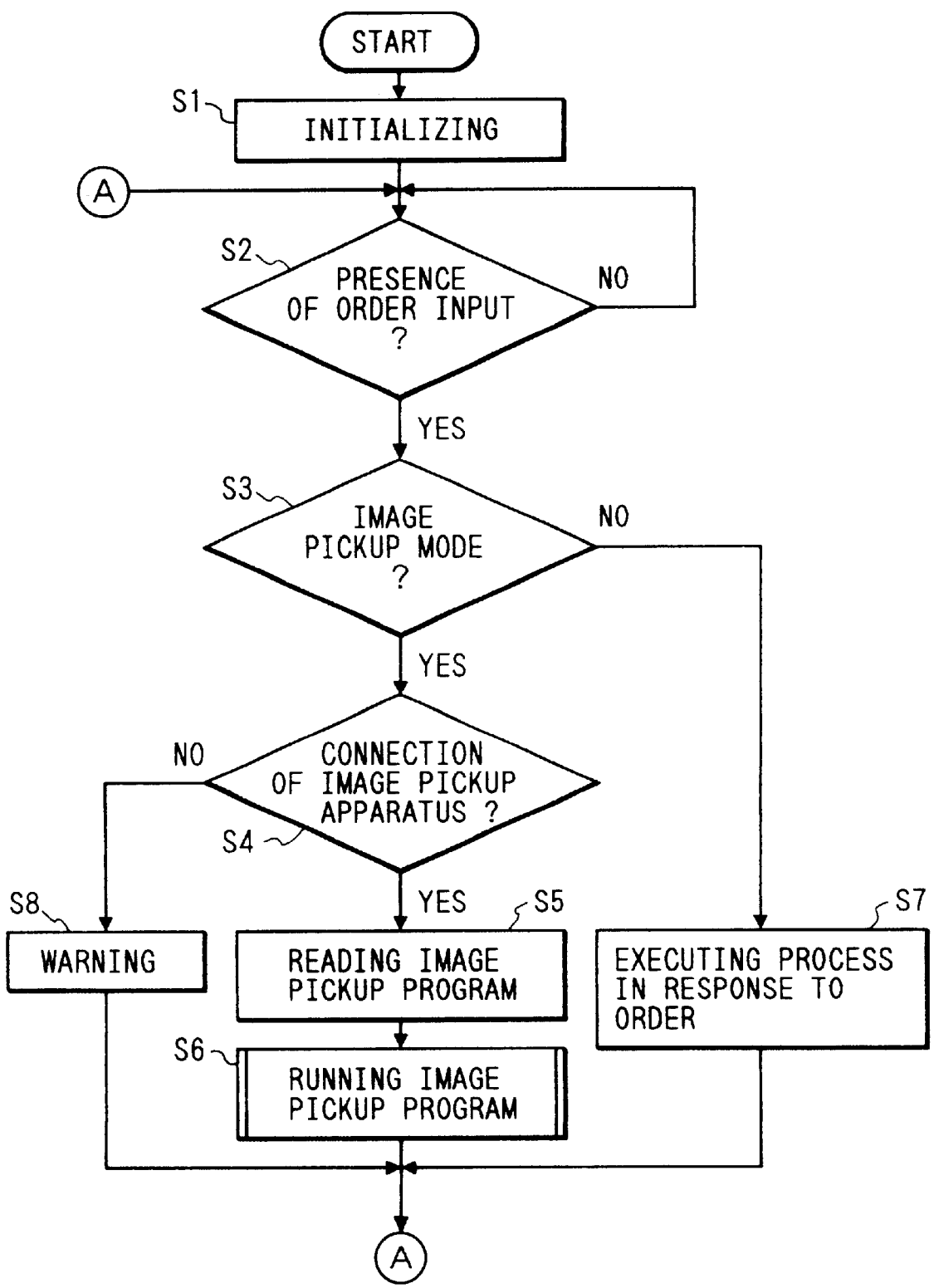
FIG. 24 is a flowchart of a main routine in this embodiment.
Figure 25:
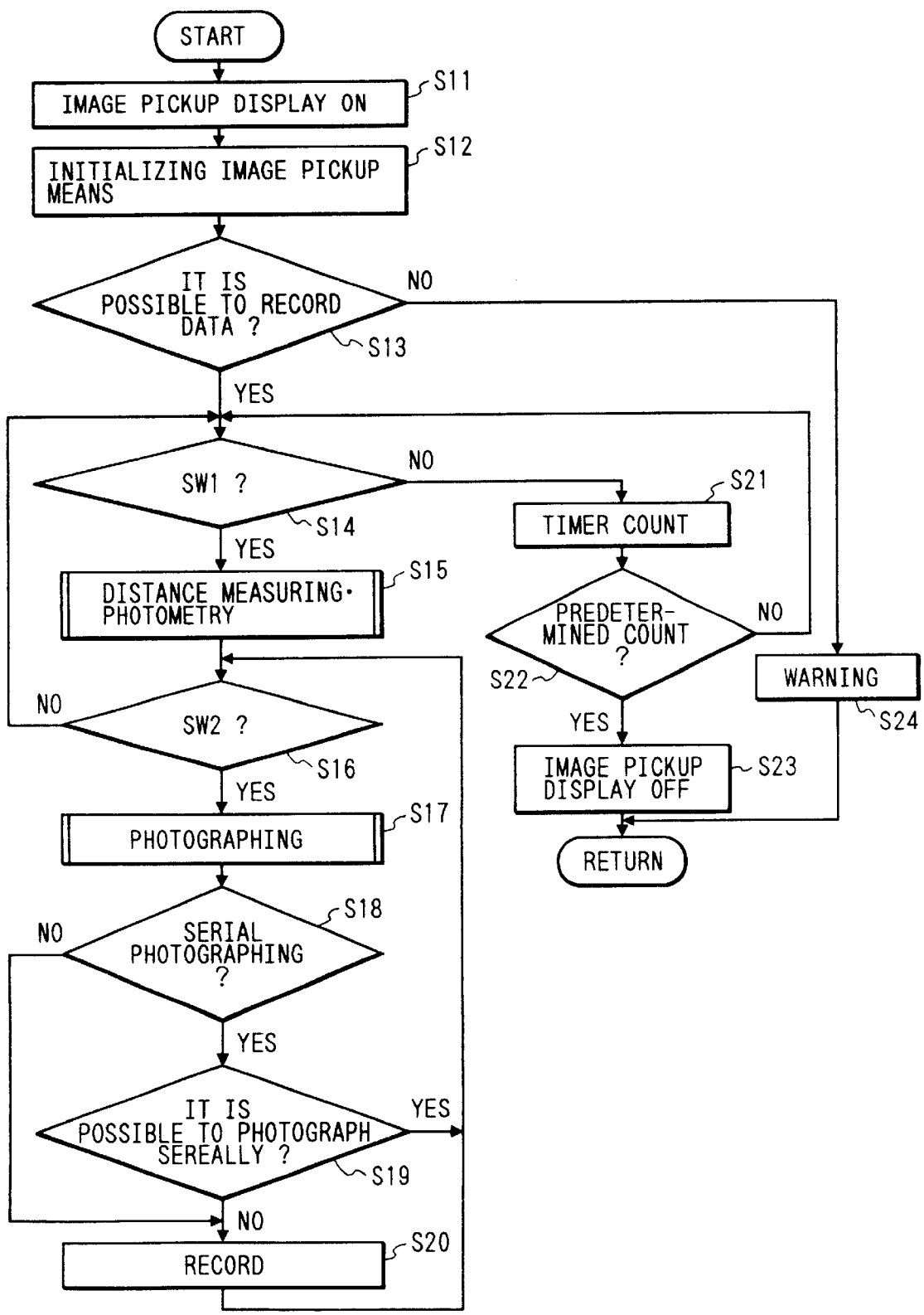
FIG. 25 is a flowchart of an imaging program running routine in this embodiment.

Referring to FIGS. 24 and 25, the operation of the embodiment will be described. FIG. 24 is a flowchart of a main routine in this embodiment.

When the power supply of the information processing apparatus 300 is turned on or a new battery is loaded in the information processing apparatus 300, the control means 60 resets flags and control variables, and runs a control program stored in an area of the memory means 62; such as, an operating system (S1). With the run of the control program, the control means 60 produces a predetermined necessary display screen on the display means 64 using characters, numerals, and pictures including an icon so as to receive information entered at the operating means 66.

When a command is entered at the operating means 66 (S2), the control means 60 determines whether the command indicates that the image pickup apparatus 200 should execute the imaging mode (S3). If the command does not indicate the execution of the imaging mode, the predetermined processing associated with the command is executed for the information processing apparatus 300 (S7). When the predetermined processing terminates, the control means 60 produces a predetermined necessary display screen on the display means 64 using characters, numerals, and pictures including an icon so as to receive information entered at the operating means 66, and waits for the next command (S2).

If the command indicates the execution of the imaging mode (S3), the control means 60 determines whether the image pickup apparatus 200 is connected to the information processing apparatus 300 (S4). If the image pickup apparatus 200 is not connected, the control means 60 displays a predetermined warning on the display means 64 (S8) and waits for the input of the next command (S2).

If the image pickup apparatus 200 is connected to the information processing apparatus 300, the control means 60 reads a program describing how to operate the image pickup apparatus 200 from the program storage means 50, and stores the program in an area of the memory means 62 via the interface 52, connector 54, connector 74, and interface 72 (S5).

The control means 60 reads a program describing how to operate the image pickup apparatus 200 from the memory means 62 and runs the program (S6). With the run of the program, the control means 60 produces a predetermined display screen necessary for imaging on the display means 64, sequentially actuates the components of the image pickup apparatus 200 according to the commands entered at the operating means 66, and thus achieves imaging.

When all the image pickup operations are completed, the control means 60 terminates the execution of the imaging mode, produces a predetermined required display screen on the display means 64 using characters, numerals, and pictures including an icon so as to receive information entered at the operating means 66, and then waits for the input of the next command (S2).

FIG. 25 is a detailed flowchart of the image pickup program to be run at the step S6 in FIG. 24.

The description below will proceed on the assumption that a data signal and a control signal are transferred between the control means 60 and image pickup control circuit 40 via the interface 72, connector 74, connector 54, and interface 52.

The control means 60 produces a predetermined display screen necessary for imaging on the display means 64 (S11). For example, as described previously, an operation mode of the image pickup apparatus 200 such as a single photography mode, a continuous photography mode, or a self-timer photography mode, information concerning distance measurement and photometry, an operating state of the flash 38, an amount of power remaining in the battery 44, a shutter speed, an f-number, an exposure correction value, a state of gain-up operation for improving the sensitivity of the image pickup element, a use state of the image memory 24, an operating state of the compression/extension circuit 22, a recording state of the recording medium 90, the number of exposed frames, a storage capacity for exposed image data, the number of remaining frames, and a storage capacity for remaining image data are displayed on the display means 64 using characters, numerals, and pictures including an icon. The facilities of the image pickup apparatus 200 may be displayed on the display means 64 as pictures of a release button, an electronic dial, a mode select dial, and other components in an operation unit of an ordinary camera. The pictures of the components of the operation unit may be selectively provided as information entered at the operating means 66 using a pointing device such as a pen, mouse, trackball, or touch-sensitive panel. Owing to these facilities, the information processing apparatus 300 can be handled to achieve photography in the same manner as a camera without unnaturalness.

The control means 60 instructs the image pickup control circuit 40 to initialize the image pickup means 210. In response to the instruction,.the image pickup control circuit 40 resets flags and variables, turns on the power circuit 42, and initializes the components of the image pickup means 210 (S12).

The control means 60 determines whether image data acquired by the image pickup apparatus 200 can be recorded in the memory means 62 or recording medium 90 (S13). If recording cannot be done because a recordable empty area is unavailable or no recording medium is connected, the control means 60 displays a warning on the display means 64 (S24) and terminates the run of the imaging program (S6). When terminating the run of the imaging program, the control means 60 instructs the image pickup control circuit 40 to terminate the operation of the image pickup means 210. The image pickup control circuit 40 executes the termination processing required for the components of the image pickup means 210, and turns off the power circuit 42.

When the distance measurement/photometry switch (SW1) is turned on using the operating means 66 (S14), the control means 60 instructs the image pickup control circuit 40 to execute distance measurement and photometry. The image pickup control circuit 40 allows the distance measuring circuit 34 and photometry circuit 36 to execute distance measurement and photometry, focuses the lens array 10 at an object, and determines a shutter speed (S15). The distance measurement and photometry are identical to those described in conjunction with FIGS. 4 and 5.

The control means 60 repeats distance measurement and photometry (S15) until the distance measurement/ photometry switch (SW1) and imaging switch (SW2) are turned on one after another using the operating means 66 (S16).

When the imaging switch (SW2) is turned on using the operating means 66 (S16), the control means 60 instructs the image pickup control circuit 40 to execute photography. The image pickup control circuit 40 executes photography and writes image data in the image memory 24 (S17). The photography will be described in detail later.

When continuous photography is executed (S18), if the image memory 24 has an area in which image data can be written (S19), control is returned to the step S16. The aforesaid processing is repeated.

When continuous photography is not executed (S18) or the image memory 24 has no area in which image data can be written (S19), the control means 60 instructs the image pickup control circuit 40 to execute recording. The image pickup control circuit 40 reads image data from the image memory 24, and sends the image data to the information processing apparatus 300 via the memory control circuit 20, interface 52, and connector 54. The control means 60 writes the received image data in the memory means 62 via the connector 74 and interface 72. The control means 60 may also write the receive image data in the recording medium 90 via the interface 76 connector 78. Control is then returned to the step S16.

When the distance measurement/photometry switch (SW1) is turned on using the operating means 66 (S14), the control means 60 checks the timer for a count (S21), and waits for the distance measurement/photometry switch (SW1) to be turned on by the time instant at which the timer indicates a predetermined count (S14). Although the distance measurement/photometry switch. (SW1) is not turned on (S14), when the timer indicates the predetermined count (S22), the display screen for imaging on the display means 64 is aborted (S23) and the run of the imaging program is terminated (S6). When terminating the run of the imaging program, the control means 60 instructs the image pickup control circuit 40 to terminate the operation of the image pickup means 210. The image pickup control means 40 executes the termination processing required for the components of the image pickup means 210 and turns off the power circuit 42.

Yet another embodiment of the present invention will be described below.

Figure 26:
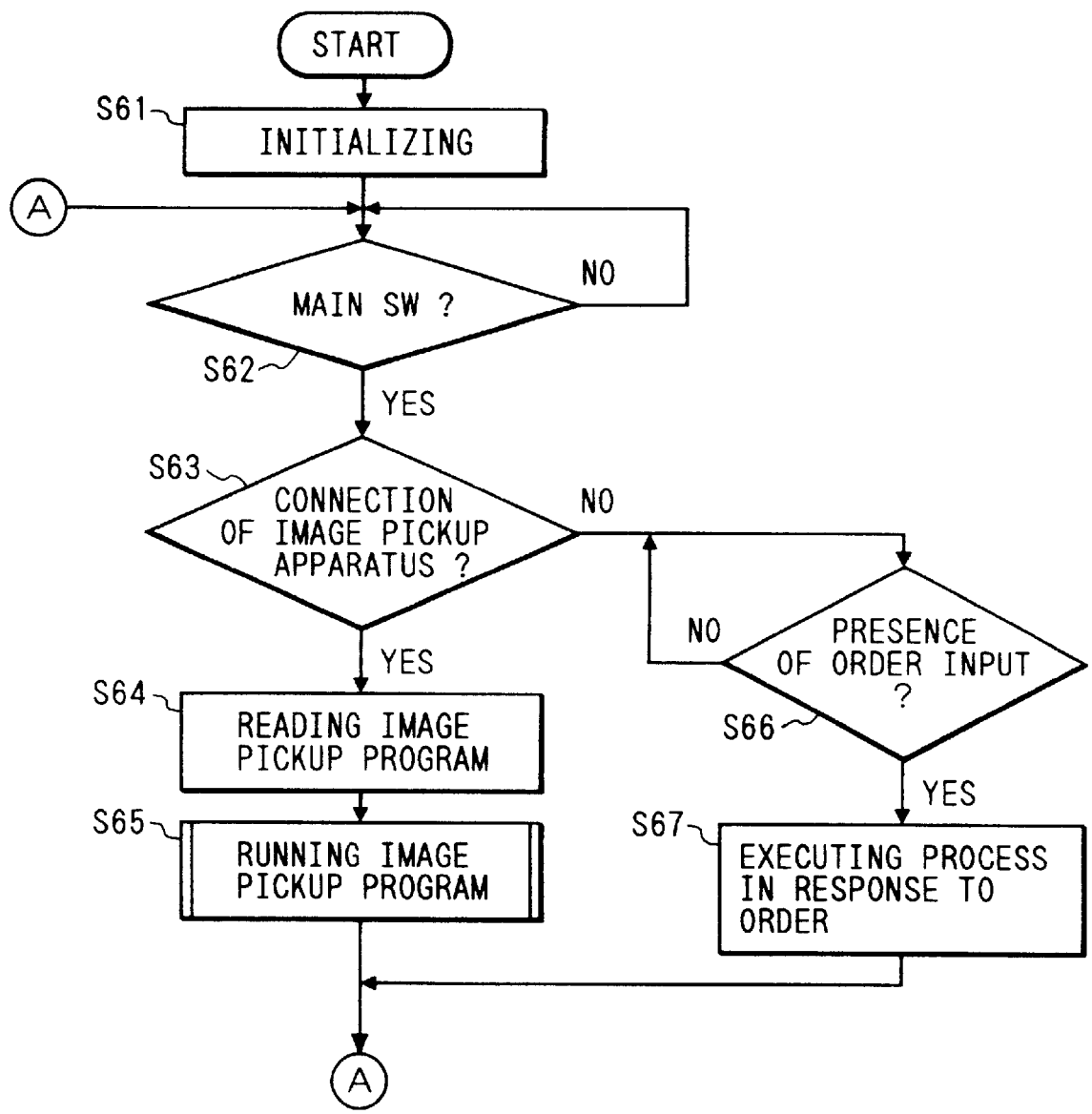
FIG. 26 is a flowchart of a main routine in yet another embodiment.

This embodiment has the same configuration as the one shown in FIGS. 23A and 23B but operates differently. FIG. 26 is a flowchart of a main routine in this embodiment.

When the power supply of the information processing apparatus 300 is turned on or a new battery is loaded in the information processing apparatus 300, the control means 60 resets flags and control variables, and runs a control program stored in an area of the memory means 62; such as, an operating system (S61).

When the main switch in the operating means 66 is turned on (S62), the control means 60 determines whether the image pickup apparatus 200 is connected to the information processing apparatus 300 (S63). If the image pickup apparatus 200 is not connected to the information processing apparatus 300, the control means 60 runs the control program for the information processing apparatus 300, produces a predetermined necessary display screen using characters, numerals, and pictures including an icon so as to receive information entered at the operating means 66, and executes predetermined processing for the information processing apparatus 300 (S67) according to the information entered at the operating means 66 (S66). When the predetermined processing terminates, the control means 60 produces a predetermined necessary display screen on the display means 64 using characters, numerals, and pictures including an icon and waits until the main switch in the operating means 66 is pressed (S62).

When the image pickup apparatus 200 is connected to the information processing apparatus 300, the control means 60 reads a program describing how to operate the image pickup apparatus 200 from the program storage means 50, and stores the program in an area of the memory means 62 via the interface 52, connector 54, connector 74, and interface 72 (S64).

The control means 60 reads the program describing how to operate the image pickup apparatus 200 from the memory means 62, and runs it (S65). With the run of the program, the control means 60 produces a predetermined display screen necessary for imaging on the display means 64, sequentially actuates the components of the image pickup apparatus 200 according to the commands entered at the operating means 66, and thus achieves imaging.

When all the image pickup operations are completed, the control means 60 terminates the execution of the imaging mode, produces a predetermined necessary display screen on the display means 64 using characters, numerals, and pictures including an icon, and waits until the main switch in the operating means 66 is pressed (S62).

The sequence of the image pickup program to be run at the step S65 in FIG. 26 is identical to that in any of the aforesaid embodiments, of which description will be omitted.

Yet another embodiment of the present invention will be described below.

FIG. 27 is a flowchart of a main routine in this embodiment.

When the power supply of the information processing apparatus 300 is turned on or a new battery is loaded in the information processing apparatus 300, the control means 60 resets flags and control variables, and runs a control program stored in an area of the memory means; such as, an operating system (S71).

When the imaging-mode switch in the operating means 66 is on (S72), the control means 60 determines whether the image pickup apparatus 200 is connected to the information processing apparatus 300 (S73). If the image pickup apparatus 200 is not connected to the information processing apparatus 300 (S73), the control means 60 displays a predetermined warning on the display means 64 (S77), and waits until the imaging-mode switch is pressed (S72).

If the imaging-mode switch is off, the control means 60 runs the control program. With the run of the control program, a predetermined necessary display screen is produced on the display means using characters, numerals, and pictures including an icon so that information entered at the operating means 66 is received. The control means 60 then executes the predetermined processing associated with a command entered at the operating means 66 for the information processing apparatus 300 (S76). When the predetermined processing terminates, the control means 60 produces a predetermined necessary display screen on the display means 64 using characters, numerals, and pictures including an icon so as to receive information entered at the operating means 66, and waits until the imaging-mode switch is pressed (S72).

When the image pickup apparatus 200 is connected to the information processing apparatus 300 (S73), the control means 60 reads a program describing how to operate the image pickup apparatus 200 from the program storage means 50, and stores the program in an area of the memory means 62 via the interface 52, connector 54, connector 74, and interface 72.

The control means 60 reads a program describing how to operate the image pickup apparatus 200 from the memory means 62 and runs it (S75). With the run of the program, the control means 60 produces a predetermined display screen necessary for imaging on the display means 64, sequentially actuates the components of the image pickup apparatus 200 according to commands entered at the operating means 66, and achieve imaging.

When all the image pickup operations are completed, the control means 60 terminates the execution of the imaging mode, produces a predetermined necessary display screen on the display means 64 using characters, numerals, and pictures including an icon so as to receive information entered at the operating means 66, and waits until the imaging-mode switch is pressed (S72).

The sequence of the image pickup program to be run at the step S75 in FIG. 27 is identical to that in the first embodiment described in conjunction with FIGS. 3A, 3B, 4 and 5, of which description will be omitted.

The embodiments have been described so far. The recording medium 90 may be any of a memory card, a hard disk, a micro-digital audio tape, and a magneto-optical disk, an optical disk.

The recording medium 90 may be a composite medium made up of a memory card and a hard disk, which poses no problem. In the composite medium, the memory card may be independent of and freely connectable to the main unit of the composite medium. This causes no problem. On the contrary, the hard disk of the composite medium may be independent of and freely connectable to the main unit of the composite medium, which poses no problem, either. The composite medium may be composed not only of a memory card and a hard disk but also of two or more of a memory card, a hard disk, a micro-digital audio tape, a magneto-optical disk, and an optical disk.

The embodiments have been described on the assumption that the recording medium 90 is independent of and freely connectable to the main unit of the information processing apparatus. Alternatively, the recording medium 90 may be fixed to the main unit of the information processing apparatus.

Two or more recording media 90 may be connected to the information processing apparatus, which poses no problem. One or more recording media 10 may be fixed to the main unit of the information processing apparatus, and one or more recording media 90 may be freely connectable to the main unit thereof. This poses no problem, either.

The communication means 100 is independent of and freely connectable to the main unit of the information processing apparatus. Alternatively, the communication means 100 may be fixed to the main unit of the information processing apparatus.

Two or more communication means 100 may be connected to the information processing apparatus, which poses no problem. One or more communication means 100 may be fixed to the main unit of the information processing apparatus, and one or more communication means 100 may be freely connectable to the main unit thereof. This poses no problem, either.

The image pickup apparatus 200 comprises the image pickup means 210 and the program storage means 50 for storing programs each describing imaging for the image pickup means 210. In addition, sound recording means and program storage means for storing programs each describing sound recording may be included. In this case, when a program describing imaging is read from the program storage means 50, a program describing sound recording is read at the same time and both the programs are run in the information processing apparatus 300 to effect imaging and sound recording.

Programs may not be read into the main unit of the information processing apparatus but may be allocated to an address space in the main unit.

The information processing apparatus according to the present invention may include neither display means nor memory means.

As easily understood from the above description, according to the present invention, an image pickup apparatus including image pick up means and program storage means for storing programs to be run by control means is demountable from an information processing apparatus including operating means and control means. This results in an image pickup system offering excellent portability.

Imaging can be achieved in a state in which an image pickup apparatus having image pickup means and program storage means for storing programs to be run by control means is mounted on an information processing apparatus having operating means and the control means. This results in an imaging system offering excellent portability.

What is claimed is:

1. An information processing apparatus, comprising:
   an attachment part adapted to attach an image pickup apparatus;
   a foldable housing;
   a posture detector adapted to detect a posture of a foldable part of the foldable housing; and
   a controller adapted to reversibly switch, according to a detecting output of said posture detector, between a first mode, in which image pickup is performed by the image pickup apparatus, and a second mode, in which any of plural processes other than the, image pickup is performed.

2. An image processing apparatus according to claim 1, wherein said foldable housing has a hinge.

3. An information processing apparatus according to claim 1, wherein said controller controls a power of said image pickup apparatus according to the detecting output of said posture detector.

4. An apparatus according to claim 1, wherein a card-shaped insertion part of said image pickup apparatus is inserted into said attachment part.

5. An apparatus according to claim 4, wherein said attachment part includes a slot into which the card-shaped insertion part is inserted.

6. An apparatus according to claim 4, wherein said image pickup apparatus includes a light receiving part and wherein the light receiving part is exposed, so as to be able to receive light from outside said information processing apparatus, in a state wherein said insertion part of said image pickup apparatus is inserted into the attachment part of said information processing apparatus.

7. An apparatus according to claim 1, further comprising a storage unit adapted to store a program for controlling an image pickup operation of said image pickup apparatus.

8. An apparatus according to claim 1, further comprising an attachment detector adapted to detect that said image pickup apparatus is attached to said attachment part.

9. An apparatus according to claim 8, further comprising a display unit adapted to perform a different display in response to said attachment detector detecting that said image pickup apparatus is attached to said attachment part.

10. An apparatus according to claim 1, further comprising a display unit adapted to display a picture of an operation unit of said image pickup apparatus.

11. An apparatus according to claim 10, further comprising a pointing device adapted to select a part of the picture of the operation unit of the image pickup apparatus.

12. An apparatus according to claim 1, further comprising a storage unit adapted to store a program for transmitting a command for initializing said image pickup apparatus.

13. An apparatus according to claim 1, wherein said information processing apparatus includes a computer.

14. An apparatus according to claim 1, wherein said information processing apparatus includes a portable telephone.

15. An image pickup system comprising:
a) an image pickup apparatus attachable and detachable to/from said information processing apparatus; and
an information processing apparatus including an attachment part adapted to attach said image pickup apparatus, a foldable housing, a posture detector adapted to detect a posture of a foldable part of the foldable housing, and a controller adapted to reversibly switch, according to a detecting output of said posture detector, between a first mode, in which an image pickup is performed by said image pickup apparatus, and a second mode, in which any of plural process other than the image pickup is performed.

16. An Information processing apparatus according to claim 15, wherein said controller controls a start or stop of operation of said image pickup apparatus according to a detecting output of said posture detector.

17. An image processing apparatus according to claim 15, wherein said foldable housing has a hinge.

18. An information processing apparatus according to claim 15, wherein said controller controls power of said image pickup apparatus according to a detecting output of said posture detector.

19. An apparatus according to claim 15, wherein a card-shaped insertion part of said image pickup apparatus is inserted into said attachment part.

20. An apparatus according to claim 19, wherein said attachment part includes a slot into which the card-shaped insertion part is inserted.

21. An apparatus according to claim 19, wherein said image pickup apparatus includes a light receiving part and wherein the light receiving part is exposed, so as to be able to receive light from outside said information processing apparatus, in a state wherein said insertion part of said image pickup apparatus is inserted into the attachment part of said information processing apparatus.

22. An apparatus according to claim 15, further comprising a storage unit adapted to store a program for controlling an image pickup operation of said image pickup apparatus.

23. An apparatus according to claim 15, further comprising an attachment detector adapted to detect that said image pickup apparatus is attached to said attachment part.

24. An apparatus according to claim 23, further comprising a display unit adapted to perform a different display in response to said attachment detector detecting that said image pickup apparatus is attached to said attachment part.

25. An apparatus according to claim 15, further comprising a display unit adapted to display a picture of an operation unit of said image pickup apparatus.

26. An image pickup system according to claim 25, further comprising a pointing device adapted to select a part of the picture of the operation unit of said image pickup apparatus.

27. An apparatus according to claim 15, further comprising a storage unit adapted to store a program for transmitting a command for initializing said image pickup apparatus.

28. An apparatus according to claim 15, wherein said information processing apparatus includes a computer.

29. An apparatus according to claim 15, wherein said information processing apparatus includes a portable telephone.

30. An image pickup apparatus attachable and detachable to/from an information processing apparatus including an attachment part adapted to attach said image pickup apparatus, a foldable body and a posture detector adapted to detect a posture of a foldable part of the foldable body, and a controller adapted to reversibly switch according to a detecting output of said posture detector between a first mode, in which an image pickup is performed by said image pickup apparatus, and a second mode, in which any of plural processes other than the image pickup is performed.

31. An information processing apparatus according to claim 30, wherein said controller controls a start or stop of operation of said image pickup apparatus according to a detecting output of said posture detector.

32. An image processing apparatus according to claim 30, wherein said foldable body has a hinge.

33. An information processing apparatus according to claim 30, wherein said controller controls power of said image pickup apparatus according to a detecting output of said posture detector.

34. An apparatus according to claim 30, wherein a card-shaped insertion part of said image pickup apparatus is inserted into said attachment part.

35. An apparatus according to claim 34, wherein said attachment part includes a slot into which the card-shaped insertion part is inserted.

36. An apparatus according to claim 34, wherein said image pickup apparatus includes a light receiving part and wherein the light receiving part is exposed, so as to be able to receive light from outside said information processing apparatus, in a state wherein said insertion part of said image pickup apparatus is inserted into the attachment part of said information processing apparatus.

37. An apparatus according to claim 30, further comprising a storage unit adapted to store a program for controlling an image pickup operation of said image pickup apparatus.

38. An apparatus according to claim 30, further attachment detector adapted that said image pickup apparatus is attached to said attachment part.

39. An apparatus according to claim 38, further comprising display unit adapted to perform a different display in response to said attachment detector detecting that said image pickup apparatus is attached to said attachment part.

40. An apparatus according to claim 30, further comprising a display unit adapted to display a picture of an operation unit of said image pickup apparatus.

41. An apparatus according to claim 40, further comprising a pointing device adapted to select a part of the picture of the operation unit of said image pickup apparatus.

42. An apparatus according to claim 30, further comprising a storage unit adapted to store a program for transmitting a command for initializing said image pickup apparatus.

43. An apparatus according to claim 30, wherein said information processing apparatus includes a computer.

44. An apparatus according to claim 30, wherein said information processing apparatus includes a portable telephone.

45. A control method of controlling an image pickup apparatus by an information processing apparatus having an attachment part adapted to attach the image pickup apparatus and a foldable body and a posture detector adapted to detect a posture a foldable part of the foldable body, said method comprising the step of:

reversibly switching, according to a detecting output of the posture detector, between a first mode, in which image pickup is performed by the image pickup apparatus, and a second mode, in which any of plural processes other than the image pickup is performed.

46. A control method of controlling an information processing apparatus according to claim 45, including controlling of a start or stop of operation of said image pickup apparatus according to a detecting output of said posture detector.

47. A control method of controlling an image processing apparatus according to claim 45, wherein said foldable housing has a hinge.

48. A control method of controlling an information processing apparatus according to claim 45, wherein said controlling controls power of said image pickup apparatus according to a detecting output of said posture detector.

49. A control method of controlling an apparatus according to claim 45, wherein a card-shaped insertion part of said image pickup apparatus is inserted into said attachment part.

50. A control method of controlling an apparatus according to claim 49, wherein said attachment part includes a slot into which the card-shaped insertion part is inserted.

51. A control method of controlling an apparatus according to claim 49, wherein said image pickup apparatus includes a light receiving part and wherein the light receiving part is exposed, so as to be able to receive light from outside said information processing apparatus, in a state wherein said insertion part of said image pickup apparatus is inserted into the attachment part of said information processing apparatus.

52. A control method of controlling an apparatus according to claim 45, further comprising storing a program for controlling an image pickup operation of said image pickup apparatus.

53. A control method of controlling an apparatus according to claim 45, further comprising detecting that said image pickup apparatus is attached to said attachment part.

54. A control method of controlling an apparatus according to claim 53, including displaying a different display in response to detecting that said image pickup apparatus is attached to said attachment part.

55. A control method of controlling an apparatus according to claim 45, including displaying a picture of an operation unit of said image pickup apparatus.

56. A control method of controlling an apparatus according to claim 55, further comprising selecting a part of the picture of the operation unit of said image pickup apparatus.

57. A control method of controlling an apparatus according to claim 45, further comprising storing a program for transmitting a command for initializing said image pickup apparatus.

58. An apparatus according to claim 45, wherein said information processing apparatus includes a computer.

59. A control method of controlling an apparatus according to claim 45, wherein said information processing apparatus includes a portable telephone.

60. A storage medium which stores a program for controlling an image pickup apparatus by an information processing apparatus having an attachment part adapted to attach an image pickup apparatus and foldable body and a posture detector adapted to detect a posture of foldable a part of the foldable body, said program comprising the step of:

reversibly switching, according to a detecting output of the posture detector, between a first mode, in which image pickup is performed by the image pickup apparatus, and a second mode, in which any of plural processes other than the image pickup is performed.

61. A storage medium according to claim 60, including controlling of a start or stop of operation of said image pickup apparatus according to a detecting output of said posture detector.

62. A storage medium according to claim 60, wherein said foldable body has a hinge.

63. A storage medium according to claim 60, wherein said controlling controls power of said image pickup apparatus according to a detecting output of said posture detector.

64. A storage medium according to claim 60, wherein a card-shaped insertion part of said image pickup apparatus is inserted into said attachment part.

65. A storage medium according to claim 64, wherein said attachment part includes a slot into which the card-shaped insertion part is inserted.

66. A storage medium according to claim 64, wherein said image pickup apparatus includes a light receiving part and wherein the light receiving part is exposed, so as to be able to receive light from outside said information processing apparatus, in a state wherein said insertion part of said image pickup apparatus is inserted the attachment part of said information processing apparatus.

67. A storage medium according to claim 60, further comprising storing a program for controlling an image pickup operation of said image pickup apparatus.

68. A storage medium according to claim 60, further comprising detecting that said image pickup apparatus is attached to said attachment part.

69. A storage medium according to claim 68, including displaying a different display in response to detecting that said image pickup apparatus is attached to said attachment part.

70. A storage medium according to claim 60, including displaying a picture of an operation unit of said image pickup apparatus.

71. A storage medium according to claim 70, further comprising selecting a part of the picture of the operation unit of said image pickup apparatus.

72. An apparatus according to claim 60, further comprising storing a program for transmitting a command for initializing said image pickup apparatus.

73. A storage medium according to claim 60, wherein said information processing apparatus includes a computer.

74. A storage medium according to claim 60, wherein said information processing apparatus includes a portable telephone.

* * * * *

UNITED STATES PATENT AND TRADEMARK OFFICE
CERTIFICATE OF CORRECTION

PATENT NO.    : 6,630,949 B1
DATED         : October 7, 2003
INVENTOR(S)   : Yoichi Yamagishi It is certified that error appears in the above-identified patent and that said Letters Patent is hereby corrected as shown below:

<u>Title page,</u>
Item [56], References Cited, FOREIGN PATENT DOCUMENTS, insert:
-- JP     62-24532       10/1987       G03B/7/26 --; and
"1176168" should read -- 1-176168 --.

<u>Column 1,</u>
Line 28, "bout." should read -- about. --.

<u>Column 2,</u>
Line 1, "FIG. 2," should read -- FIG. 2 --; and
Line 64, "embodiment;" should read -- embodiment; and --.

<u>Column 4,</u>
Line 41, "medium." should read -- medium 90. --.

<u>Column 5,</u>
Line 47, "mean is 82" should read -- means 82 --.

<u>Column 8,</u>
Line 24, "(S29)" should read -- (S29). --; and
Line 53, "receive" should read -- received --.

<u>Column 10,</u>
Line 31, "view finder" should read -- viewfinder --; and
Line 43, "display" should read -- displays --.

<u>Column 14,</u>
Line 55, "consumption" should read -- assumption --.

<u>Column 15,</u>
Line 3, "display." should read -- displayed --.

<u>Column 17,</u>
Lines 37 and 50, "through mode" should read -- though-mode --; and
Line 39, "means;" should read -- means --.

<u>Column 18,</u>
Line 67, "includes" should read -- include --.

UNITED STATES PATENT AND TRADEMARK OFFICE
CERTIFICATE OF CORRECTION

PATENT NO. : 6,630,949 B1
DATED : October 7, 2003
INVENTOR(S) : Yoichi Yamagishi It is certified that error appears in the above-identified patent and that said Letters Patent is hereby corrected as shown below:

Column 19,
Line 5, "Both the" should read -- Both --.

Column 21,
Line 61, "(S6),. and" should read -- (S6), and --;

Column 23,
Line 6, "control" should read -- control to --; and
Line 8, "FIGS." should read -- FIG. --.

Column 25,
Line 46, "made" should read -- make --.

Column 27,
Line 27, "(S90)" should read -- (S90). --.

Column 28,
Line 19, "made" should read -- make --.

Column 29,
Line 12, "apparatus.200" should read -- apparatus 200 --.

Column 30,
Line 10, "means-66." should read -- means 66. --.

Column 32,
Line 38, "instruction,." should read -- instruction, the --.

Column 33,
Line 24, "receive" should read -- received --;
Line 25, "76" should read -- 76, and --; and
Line 33, "switch. (SWI)" should read -- switch (SWI) --.

Column 36,
Line 7, "both the" should read -- both --;
Line 18, "pick up" should read -- pickup --;
Line 30, "apparatus," should read -- apparatus --;
Line 41, "the, image" should read -- the image --; and
Line 43, "image" should read -- information --.

UNITED STATES PATENT AND TRADEMARK OFFICE
CERTIFICATE OF CORRECTION

PATENT NO. : 6,630,949 B1
DATED : October 7, 2003
INVENTOR(S) : Yoichi Yamagishi It is certified that error appears in the above-identified patent and that said Letters Patent is hereby corrected as shown below:

Column 37,
Line 20, "a)" should be deleted;
Line 31, "process" should read -- processes --;
Line 32, "Information" should read -- information --.

Column 38,
Line 1, "system" should read -- apparatus --;
Line 47, "further attach-" should read -- further comprising an attach- --;
Line 48, "that" should read -- so that --; and
Line 50, "ing" should read -- ing a --.

Column 39,
Line 5, "posture" should read -- posture of --;
Lines 13, 46 and 50, "including" should read -- further including --; and
Line 59, "An apparatus" should read -- A control method of controlling an apparatus --.

Column 40,
Line 7, "foldable a" should read -- a foldable --;
Line 33, "inserted the" should read -- inserted into the --; and
Lines 41 and 45, "including" should read -- further including --.

Signed and Sealed this

Sixteenth Day of November, 2004

JON W. DUDAS
*Director of the United States Patent and Trademark Office*